(12) United States Patent
Campbell et al.

(10) Patent No.: US 11,162,856 B2
(45) Date of Patent: *Nov. 2, 2021

(54) INTELLIGENT FIBER ROPE TERMINATION, MODULE, AND NETWORKING TECHNOLOGIES

(71) Applicants: Richard V. Campbell, Havana, FL (US); Philip Bull, Havana, FL (US); John Wiley Horton, Tallahassee, FL (US)

(72) Inventors: Richard V. Campbell, Havana, FL (US); Philip Bull, Havana, FL (US); John Wiley Horton, Tallahassee, FL (US)

(*) Notice: Subject to any disclaimer, the term of this patent is extended or adjusted under 35 U.S.C. 154(b) by 3 days.

This patent is subject to a terminal disclaimer.

(21) Appl. No.: 16/654,097

(22) Filed: Oct. 16, 2019

(65) Prior Publication Data
US 2020/0173875 A1 Jun. 4, 2020

Related U.S. Application Data

(63) Continuation-in-part of application No. 16/255,913, filed on Jan. 24, 2019, which is a continuation-in-part of application No. 15/445,306, filed on Feb. 28, 2017, now Pat. No. 10,451,504.

(60) Provisional application No. 62/300,948, filed on Feb. 29, 2016.

(51) Int. Cl.
*G01L 5/101* (2020.01)
*G01L 1/22* (2006.01)
*H04B 1/02* (2006.01)

(52) U.S. Cl.
CPC ............ *G01L 5/101* (2013.01); *G01L 1/2206* (2013.01); *H04B 1/02* (2013.01)

(58) Field of Classification Search
CPC ......... G01L 5/04; G01C 19/661; G01C 19/66; G01N 2203/0016
See application file for complete search history.

(56) References Cited

U.S. PATENT DOCUMENTS

| | | | | |
|---|---|---|---|---|
| 6,343,515 | B1* | 2/2002 | Dodson | G01L 5/10 73/831 |
| 7,221,619 | B1* | 5/2007 | George | G01V 1/38 367/16 |
| 7,478,563 | B2* | 1/2009 | Weisman | G01L 5/042 73/786 |
| 8,267,031 | B2* | 9/2012 | Austad | G01V 1/38 114/244 |
| 8,371,015 | B2* | 2/2013 | Campbell | F16G 11/042 29/525.01 |

(Continued)

*Primary Examiner* — Freddie Kirkland, III
(74) *Attorney, Agent, or Firm* — J. Wiley Horton

(57) ABSTRACT

An integrated intelligent cable module for use in a tensile fiber strength member. The module preferably includes an integral instrument package. The instrument package may assume many forms and may serve many purposes. The module preferably includes load-monitoring, recording features, and display features. These features act as a "black box" for the tensile fiber strength member, monitoring its performance and reporting (in real-time or at a later time) any exceedances or any deterioration in performance or structural integrity. These features allow an operator to easily monitor the condition of a tensile fiber strength member—preferably while the tensile fiber strength member remains in service.

20 Claims, 65 Drawing Sheets

(56) References Cited

U.S. PATENT DOCUMENTS

| | | | | |
|---|---|---|---|---|
| 9,303,627 B2* | 4/2016 | Romo | .................... | F03D 80/80 |
| 9,389,130 B2* | 7/2016 | Teurlay | .................. | G01L 5/103 |
| 9,791,337 B2* | 10/2017 | Campbell | ................. | G01L 5/04 |
| 9,835,228 B2* | 12/2017 | Campbell | ............... | B25B 25/00 |
| 10,054,505 B2* | 8/2018 | Campbell | ............... | F16G 11/08 |
| 10,451,504 B2* | 10/2019 | Campbell | ............ | G01C 19/661 |
| 10,656,033 B2* | 5/2020 | Campbell | ............. | F16G 11/146 |
| 2014/0137388 A1* | 5/2014 | Campbell | ............... | F16G 11/03 |
| | | | | 29/461 |
| 2015/0259044 A1* | 9/2015 | Lopez | .................... | B63B 35/44 |
| | | | | 114/265 |
| 2015/0315743 A1* | 11/2015 | Campbell | ............... | D07B 9/00 |
| | | | | 57/310 |
| 2017/0299450 A1* | 10/2017 | Campbell | ................ | G01L 5/04 |
| 2020/0173875 A1* | 6/2020 | Campbell | ............... | G01L 5/103 |

\* cited by examiner

INTELLIGENT FIBER ROPE TERMINATION, MODULE, AND NETWORKING TECHNOLOGIES

BACKGROUND OF THE INVENTION

1. Field of the Invention

This invention relates to the field of tensile strength members. More specifically, the invention comprises an intelligent cable module that can be placed in any desired position along a tensile strength member such as a rope or cable. The module preferably includes an instrument package useful for things such as position monitoring and load monitoring, as well as other components that are connected to the instrument package.

2. Description of the Related Art

In this disclosure the over-arching term "tensile strength member" is intended to encompass anything that carries a load primarily in tension. The term "tensile fiber strength member" is intended to encompass any assembly of multiple fibers that is intended to carry a load primarily in tension. A rope and a cable are both examples of tensile fiber strength members. In fact, the terms "rope" and "cable" are used interchangeably in this disclosure. Both are examples of a "tensile fiber strength member." Both are components that readily transmit tensile forces but not compressive forces. Tensile fiber strength members must generally be connected to other components in order to be useful. A flexible cable provides a good example. Most cables include some type of end-fitting configured to transmit a load. For example, a cable used in a hoist generally includes a lifting hook on its free end. This lifting hook may be rigged to a load. The assembly of an end-fitting and the portion of the cable to which it is attached is commonly called a "termination." A termination is a useful point for the addition of the inventive intelligent cable module, though such a module can be added at other points as well.

The present invention has application to many fields where tensile fiber strength members are used. A non-exhaustive listing of applicable fields includes offshore lifting, ship mooring, drag line cranes (in both fixed and moveable rigging), power shovels (in both fixed and moveable rigging), civil structure tendons (suspension bridges and the like), and floating structure moorings (such as offshore oil rigs)

Most high-strength cables are presently made of steel. The cable is a wound or braided assembly of individual steel wires. An end fitting (such as a lifting hook) is often attached to the steel cable by placing a length of the cable within a cavity running through a portion of the end fitting. The wires within the end fitting are splayed apart and a potting compound is then used to lock the wires within the fitting. The term "potting compound" means any substance which transitions from a liquid to a solid over time. Examples include molten lead, thermoplastics, and UV-cured or thermoset resins (such as two-part polyesters or epoxies). Other examples include plasters, ceramics, and cements. The term "solid" is by no means limited to an ordered crystalline structure such as found in most metals. In the context of this invention, the term "solid" means a state in which the material does not flow significantly under the influence of gravity. Thus, a soft but stable wax is yet another example of such a solid.

Molten lead was traditionally used as a potting compound for steel cables. Once the individual wires were splayed within the expanding cavity of an end-fitting, molten lead was poured into the cavity. The lead then solidified and locked a portion of the cable in the cavity. In more recent years lead has been replaced by high-strength epoxies.

Modern cables may still be made of steel, but high-strength synthetic filaments are becoming more common. The term "filament" generally refers to a component having a very small diameter. The term "fiber" is sometimes used to a component having a larger diameter. In this disclosure, however, the term "filament" and "fiber" are used synonymously. Both are tensile elements used in the construction of a larger "tensile fiber strength member."

Filaments used in modern tensile fiber strength members include DYNEEMA (ultra-high-molecular weight polyethylene), SPECTRA (ultra-high-molecular weight polyethylene), TECHNORA (processed terephhthaloyl chloride), TWARON (para-aramid), KEVLAR (para-aramid), VECTRAN (liquid crystal polymer), PBO (polybenzobisoxazole), carbon fiber, and glass fiber (among many others). Modern cables may also be made of older, lower-strength synthetic materials such as NYLON. In the case of high-strength synthetics, the individual filaments have a thickness that is less than that of human hair. The filaments are very strong in tension, but they are not very rigid. They also tend to have low surface friction. These facts make such synthetic filaments difficult to handle during the process of adding a termination and difficult to organize. Hybrid cable designs are also emerging in which traditional materials (such as steel wires) are combined with high-strength synthetic materials. These present additional challenges, since the metal portions may be quite stiff while the synthetic portions will not be.

Those skilled in the art will know that cables made from synthetic filaments have a wide variety of constructions. In many cases a protective jacket will be provided over the exterior of the synthetic filament. This jacket does not carry any significant tensile load and it may therefore be made of a different material.

Most larger cables are made as an organized grouping of smaller cables. The smaller cables are often referred to as "strands." One example is a parallel core of synthetic filaments surrounded by a jacket of braided filaments. In other cases the cable may be braided throughout. In still other examples the cable construction may be: (1) an entirely parallel construction enclosed in a jacket made of different material, (2) a helical "twist" construction, (3) a more complex construction of multiple helices, multiple braids, or some combination of helices and braids, or (4) a hybrid construction including metallic constituents.

The reader is referred to commonly-owned U.S. Pat. No. 8,371,015 for more detailed descriptions regarding the application of an attachment to a sub-component of a larger cable. The '015 Patent explains how individual anchors can be attached to the strands and the anchors can then be attached to a common collector to create a uniform load-bearing structure.

The present invention is not limited to multi-stranded terminations. Any form of termination may be used, such as a single socket for example. The exemplary embodiments depicted all include multi-stranded terminations but this fact should not be viewed as limiting. The embodiments specifically described pertain primarily to larger tensile fiber strength members which tend to use multiple strands. The invention is by no means limited to this tensile strength members having multiple strands, however.

Modern high-performance tensile fiber strength members incorporating synthetic fibers (in pure form or in hybrid form) provide the same strength as steel cables but with a substantial weight reduction. For long hoisting operations the weight of the cable often exceeds the weight of the payload. A reduction in the weight of the cable results in a direct increase in payload. The inventive products described herein will most often be applied to high-strength cables (5 Tons to 2000 Tons or even more). These applications are often critical in nature. Thus, it is useful to incorporate intelligent cable modules that can monitor a cable's condition while it remains in operation. The present invention provides such a capability.

BRIEF SUMMARY OF THE PRESENT INVENTION

The present invention comprises an integrated intelligent cable module for use in a tensile fiber strength member. The module preferably includes an integral instrument package. The instrument package may assume many forms and may serve many purposes.

The module preferably includes load-monitoring, recording features, and display features. These features act as a "black box" for the tensile fiber strength member, monitoring its performance and reporting (in real-time or at a later time) any exceedances or any deterioration in performance or structural integrity. These features allow an operator to easily monitor the condition of a tensile fiber strength member—preferably while the tensile fiber strength member remains in service.

Figure 1:
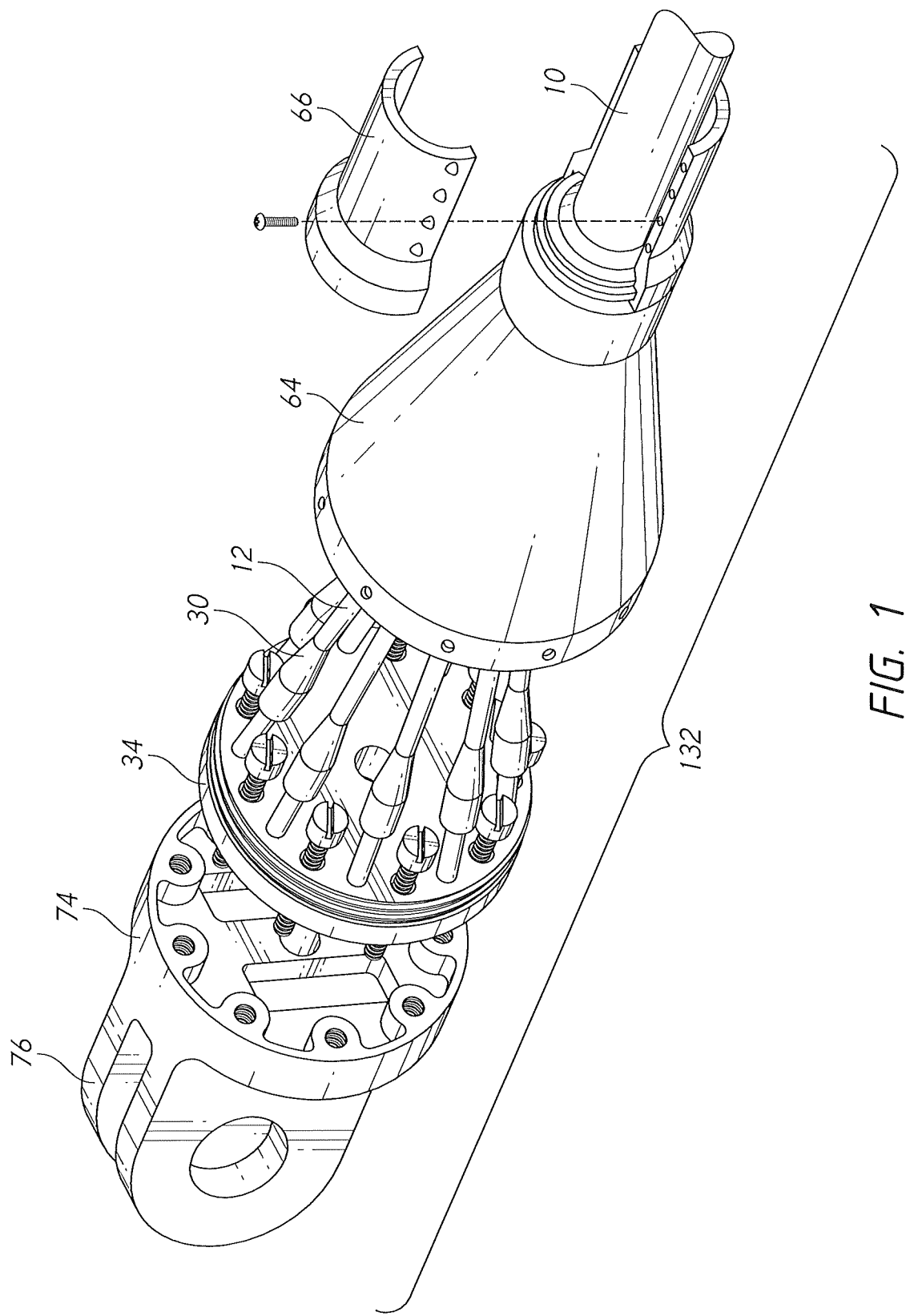
FIG. 1 is an exploded perspective view, showing an exemplary intelligent anchor made according to the present invention.

REFERENCE NUMERALS IN THE DRAWINGS 10 cable
12 strand
18 anchor
20 cavity
22 potted region
24 loading stud
26 male thread
28 threaded engagement
30 strand termination
34 collector
38 receiver
40 nut
44 hemi bearing
46 opening
48 through hole
50 central opening
64 middle strand collector
66 distal strand collector
68 load cell
70 jacket
72 core
74 housing
76 clevis structure
78 transverse hole
80 bolt
82 receiver
84 recess
86 cavity
88 first instrument package
90 second instrument package
92 connection
94 core termination
96 battery
98 power supply
100 inertial measurement system
102 processor
104 memory
106 external power connector
108 external data connector
110 acoustic antenna
112 acoustic transducer
114 I/O port
116 I/O port
118 I/O port
120 load cell
122 load cell
124 load cell
126 I/O port
128 pressure sensor
130 temperature sensor
132 intelligent cable termination
134 thruster controller
136 salinity
138 extended housing
140 thruster
142 trunnion mount
144 sensing/comm element
146 sensor
148 sensor lead
150 sensor lead
160 potting surface
162 payload
164 lifting tang
166 connector
168 cable
170 camera
172 ROV garage
174 ROV
176 ROV garage
178 ROV
180 tether
182 connector
184 cable
186 connector
188 tang
190 sling
192 release mechanism
194 pallet
196 leg
198 central void 200 inter-strand void
202 intelligent cable module
204 communication strand
206 connector
208 module casing
210 bulging portion
212 clamping collar
214 radial prong
216 casing half
218 casing half
220 antenna
222 external display
224 vessel
226 through hole
228 nut
230 master node
232 node
234 controlling computer
240 vessel
242 bollard
244 mooring line
246 sling
248 transition
250 mooring stay
252 quay
254 winch
256 controller
258 termination
260 anchor
262 loading flange
264 antenna
266 strain gauge
268 connection
270 monitor
272 windows display
274 line identification data
276 monitoring parameters
278 potting transition
280 filament limit
282 pressure vessel
284 transition cap
286 transition cap
288 protrusion
290 pressure transducer
292 instrument package
294 antenna
296 Newtonian fluid
298 boss
300 boss
302 overmolded transition cap
304 integrated cable module
306 module cover
308 collar
310 unified collar
312 interwoven section
314 loop
316 body
318 cover
320 inlet
322 first channel
324 second channel
326 separator
328 void
330 web
332 void
334 strain gauge
335 collector
336 eye
338 shroud
340 transition cap
342 transition cap
344 collector
346 collar
348 curved shoulder
350 oil platform
352 anchoring cable
354 pressure vessel
356 locating vane
358 strain gauge
360 transverse plane
362 longitudinal axis
364 vertical axis
366 lateral axis
368 instrument package
370 antenna
372 pressure vessel
374 indicator panel
376 transverse tube
378 orientation cap
380 electrical contact
382 piercer
384 threaded shaft
386 passage
388 instrument package
390 antenna
392 cap receiver
394 hole
396 clip receiver
398 washer
400 bolt
402 retaining clip
404 strain gauge
406 instrument housing
408 channel
410 channel
412 bracket
413 hole
414 band
416 deformed tube
418 collar
420 recess
422 joint

DETAILED DESCRIPTION OF THE INVENTION

FIG. 1 provides an exploded view of an exemplary intelligent cable module that is configured to be located near one end of a tensile fiber strength member—in this case a cable. The intelligent module in this example is therefore referred to as an "intelligent cable termination." Intelligent cable termination 132 is shown as an exploded assembly in FIG. 1. The particular cable 10 shown has nine individual strands 12 surrounding a core. All these components are encompassed within a surrounding jacket. A portion of the jacket is removed to reveal the individual strands and the core. A strand termination 30 is affixed to the end of each individual strand 12. Each strand termination 30 is then attached to collector 34.

The intelligent cable termination 132 is configured to attach to an external element (such as a payload to be hoisted and placed by a crane). A connecting feature can be added to collector 34. However, in the version shown, the connecting feature (clevis structure 76) is incorporated as part of a separate housing 74. Housing 74 connects to collector 34. Using this approach, tension carried by strands 12 is transmitted to the collector 34, then to housing 74 and finally through clevis structure 76 to an external element.

In addition to carrying the cable's load, housing 74 in this embodiment provides additional internal space for housing an instrument package or packages. The instrument package or packages allows the integrated termination to become an "intelligent" termination, as will be described subsequently.

Middle strand collector 64 slides over the splayed strands and attaches to the perimeter of collector 34. Distal strand collector 66 (which is split into two halves in this version), clamps over the small end of the middle strand collector and seals the interface between the middle strand collector and the jacketed portion of the cable. These components direct the transition of the strands from their configuration within the cable to the "splayed" state proximate collector 34.

Figure 2:
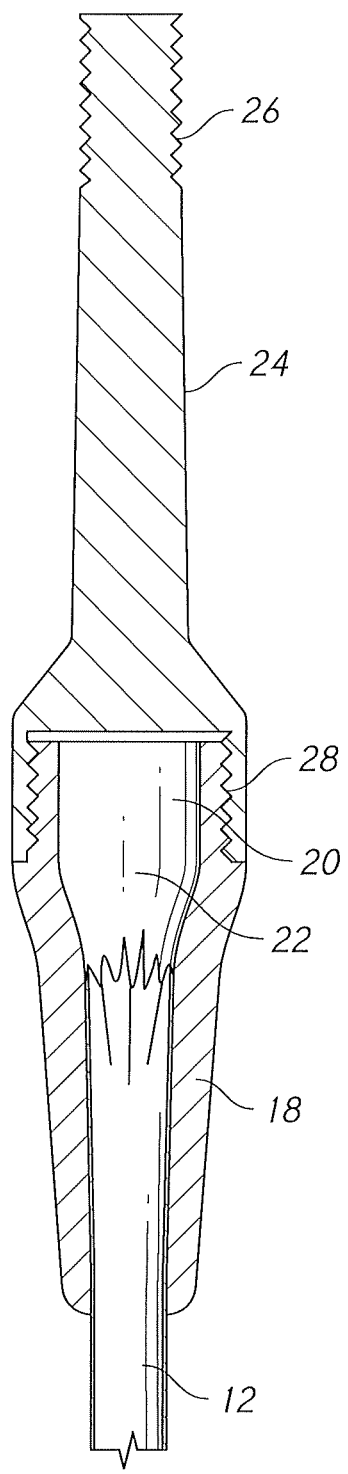
FIG. 2 is a sectional elevation view, showing one type of strand termination that may be used.

FIG. 2 is a sectional elevation view showing an exemplary structure for a strand termination 30. The individual filaments within strand 12 (which may be a million filaments or mom in the case of an advanced synthetic material) are connected to anchor 18, such as by potting a length of the filaments within cavity 20 to form potted region 22. Loading stud 24 is connected to anchor 18 via threaded engagement 28. The loading stud is equipped with a suitable force-transferring feature—in this case male thread 26. This assembly thereby transmits tensile loads from strand 12 to loading stud 24.

Figure 3:
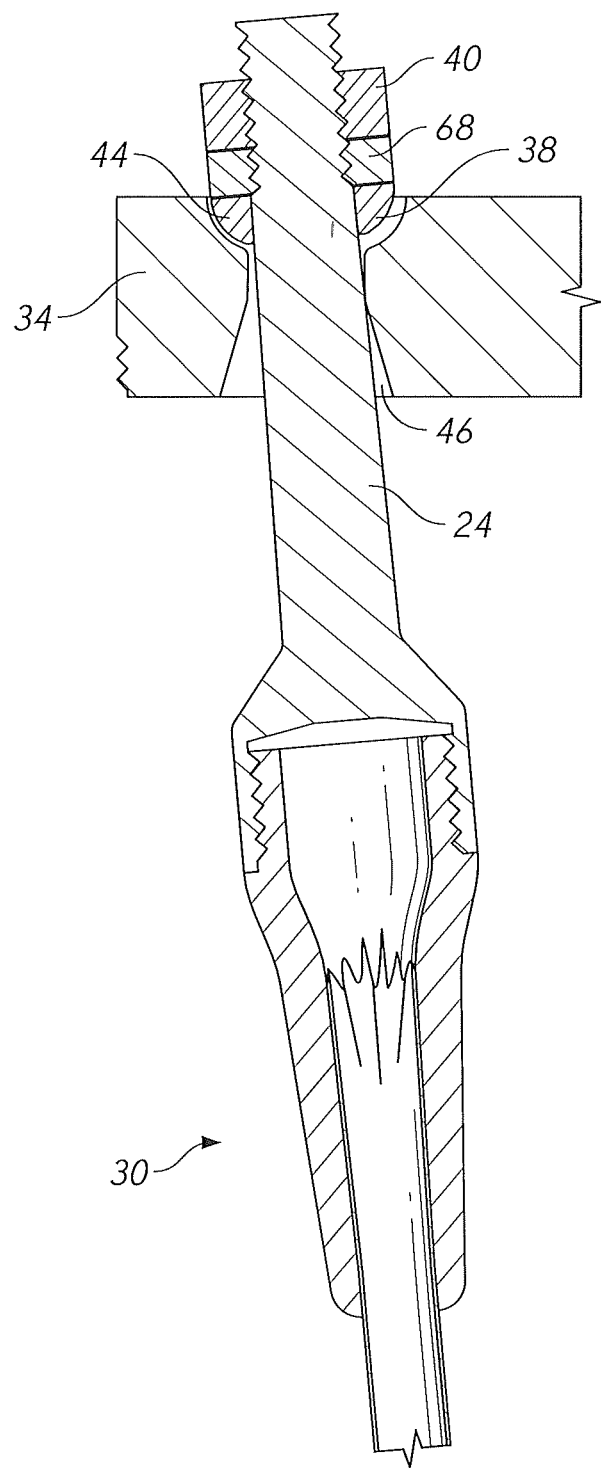
FIG. 3 is a sectional elevation view, showing representative instrumentation that may be added to a strand termination.

FIG. 3 is a sectional elevation view depicting an exemplary connection between strand termination 30 and collector 34. In this version a ball-and-socket connection is used. Opening 46 passes through collector 34 at an angle. A hemispherical receiver 38 is provided in the portion of the opening opposite the strand. Hemi bearing 44 rests in receiver 38. Loading stud 24 passes through hemi bearing 44. Load cell 68 is placed on top of hemi bearing 44. Nut 40 secures the assembly in place. Each individual strand termination includes its own adjusting nut. The nuts may be used to individually allocate the total tension among the strands. Load cell 68 provides an electrical output that corresponds to the amount of compressive load it is presently experiencing. Each individual strand termination is preferably provided with a load cell so that the load on each strand can be monitored. In this example the intelligent cable module receives and monitors the information from the load cells. It can also place this information in a suitable communication format and transmit it to an external monitoring system.

The load cell shown in this version is illustrative of any load/stress/strain sensing device that is incorporated into a cable or strand's load path. Other types of devices may be substituted. As an additional example, a pressure sensing device can be provided within the potted region inside the anchor. As still another example, a strain gauge may be attached to the exterior surface of the strand termination. In the context of this application, the term "strain gauge" shall mean any device that is responsive to strain imposed on the thing to which the strain gauge is attached.

Figure 4:
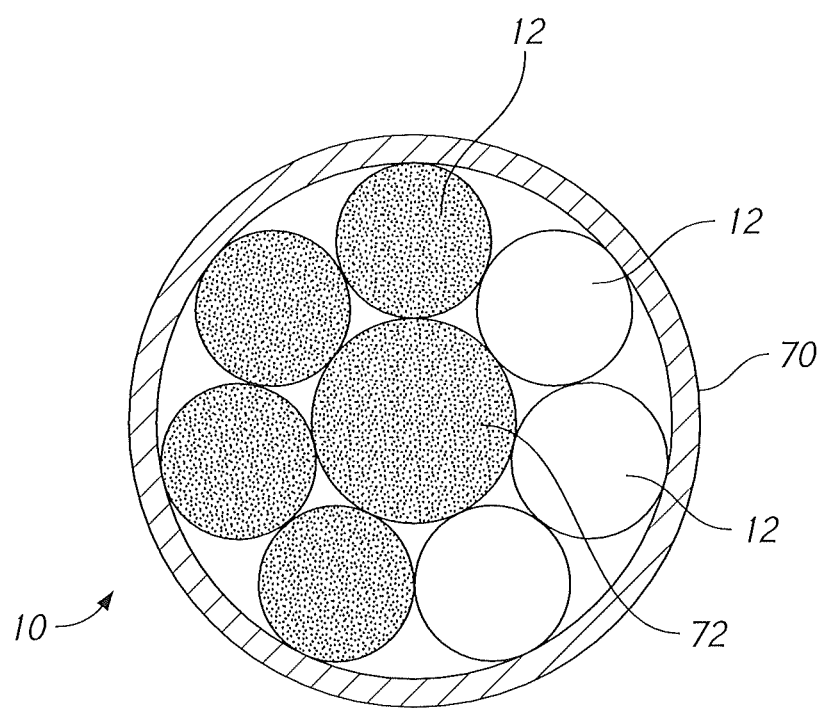
FIG. 4 is a sectional view, showing one possible construction for a multi-stranded cable.

FIG. 4 shows a cross sectional view through an exemplary cable assembly of the type depicted in FIG. 1. This particular cable has ten sub-groupings—core 72 surrounded by nine strands 12. Optional jacket 70 may be provided to surround and protect the other components. While cable jackets are not common in the field of deep water lowering and lifting (primarily due to inspection limitations), with the addition of sensory technologies, an external jacket may be an advantageous feature. External jackets are more common in other applications.

Figure 5:
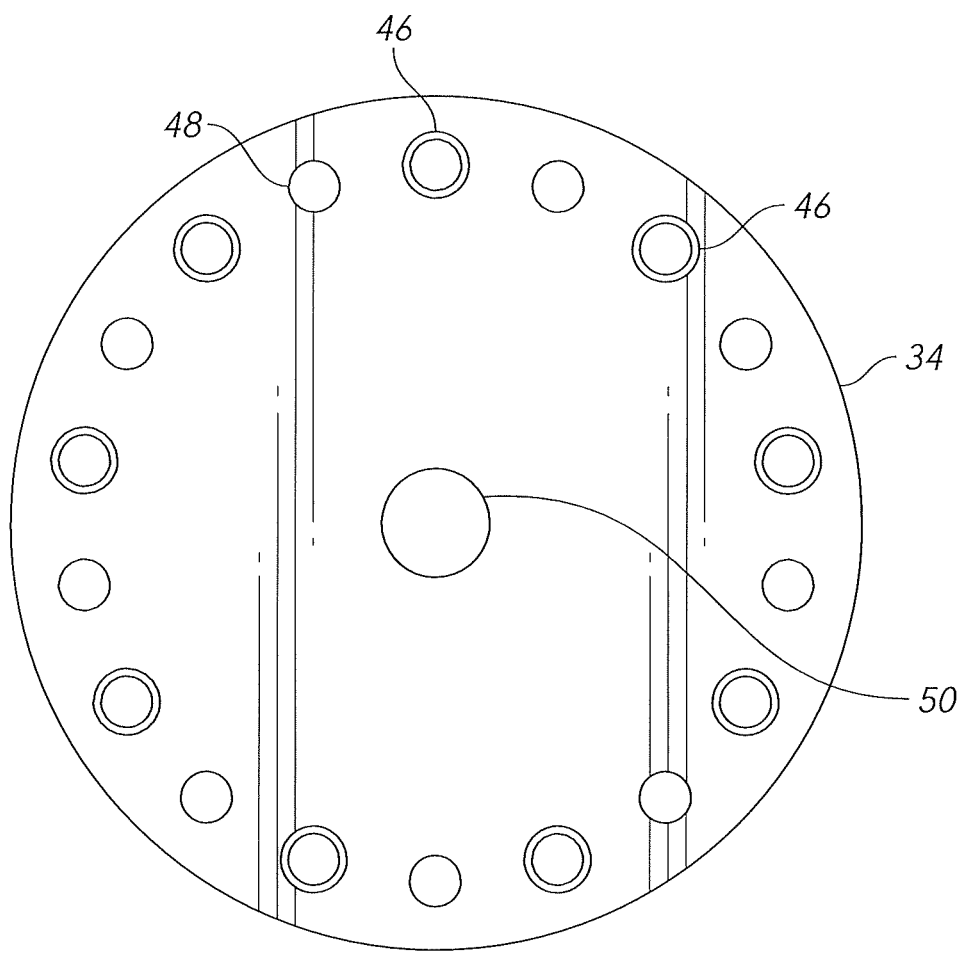
FIG. 5 is a plan view, showing a collector.

FIG. 5 depicts a plan view of collector 34 (the same version as shown in FIG. 1). Center opening 50 receives core 72. Nine openings 46 are provided for the nine strands 12. Nine through holes 48 are provided for bolts that are used to attach the collector to the housing.

Figure 6:
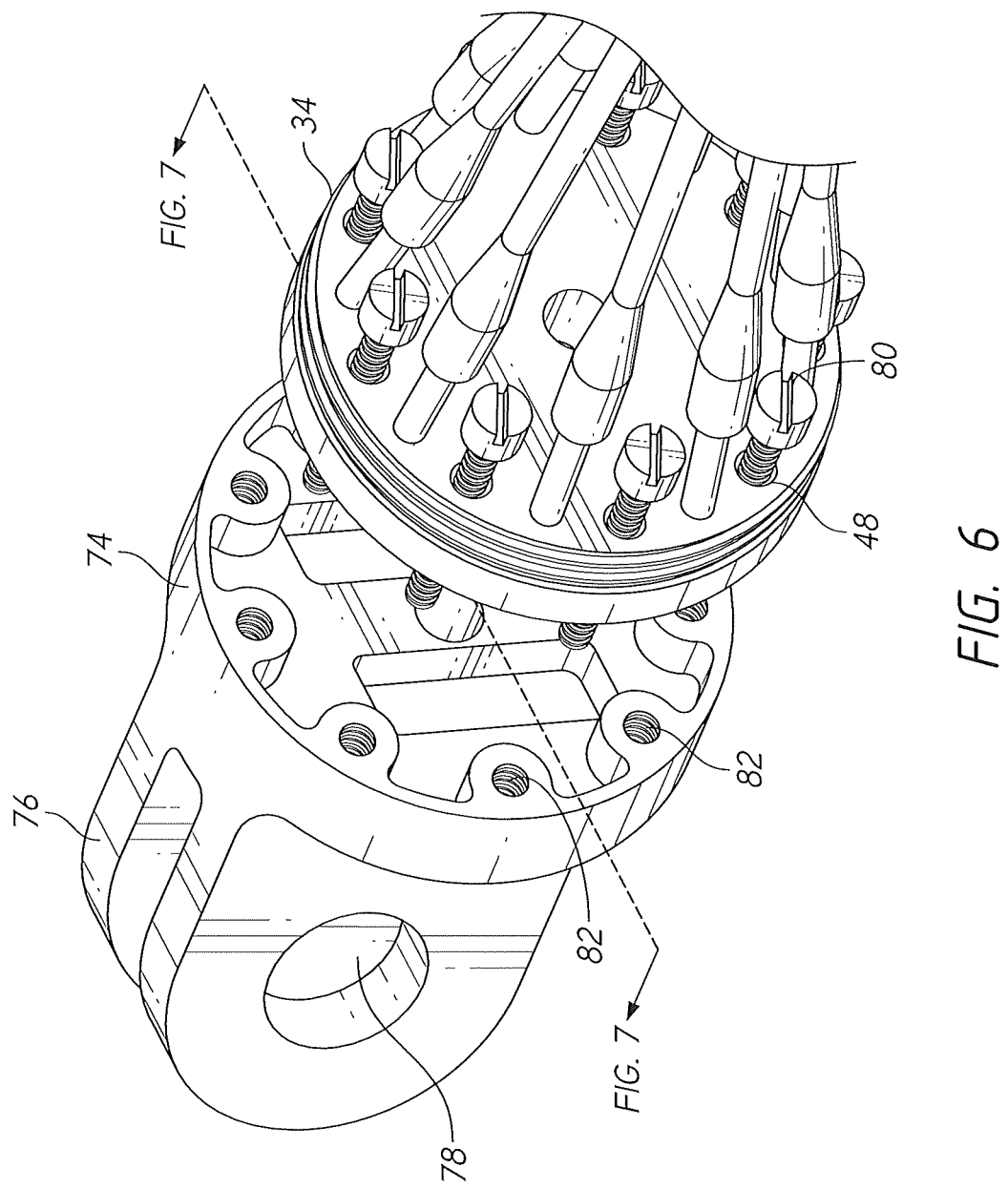
FIG. 6 is an exploded perspective view, showing additional features of the housing and collector.

FIG. 6 provides a perspective view of collector 34 and housing 74. The reader will note how the nine through holes 48 in the collector align with nine receivers 82 in housing 74. Each receiver 82 includes a female thread. Nine bolts 80 are passed through the receiver and into the nine threaded receivers 82 in the housing. The bolts are then tightened to secure the collector to housing 74.

In this example housing 74 is machined as one integral piece. It includes clevis structure 76 with transverse hole 78. This is configured to receive a tang and cross-pin in order to attach the housing to some external element. An example of an external element would be a payload that is to be lifted and moved using the inventive cable termination. In many cases additional rigging (such as lifting slings) and hardware will be added to the clevis structure shown. Thus, the clevis structure should be viewed as exemplary and non-limiting.

Figure 7:
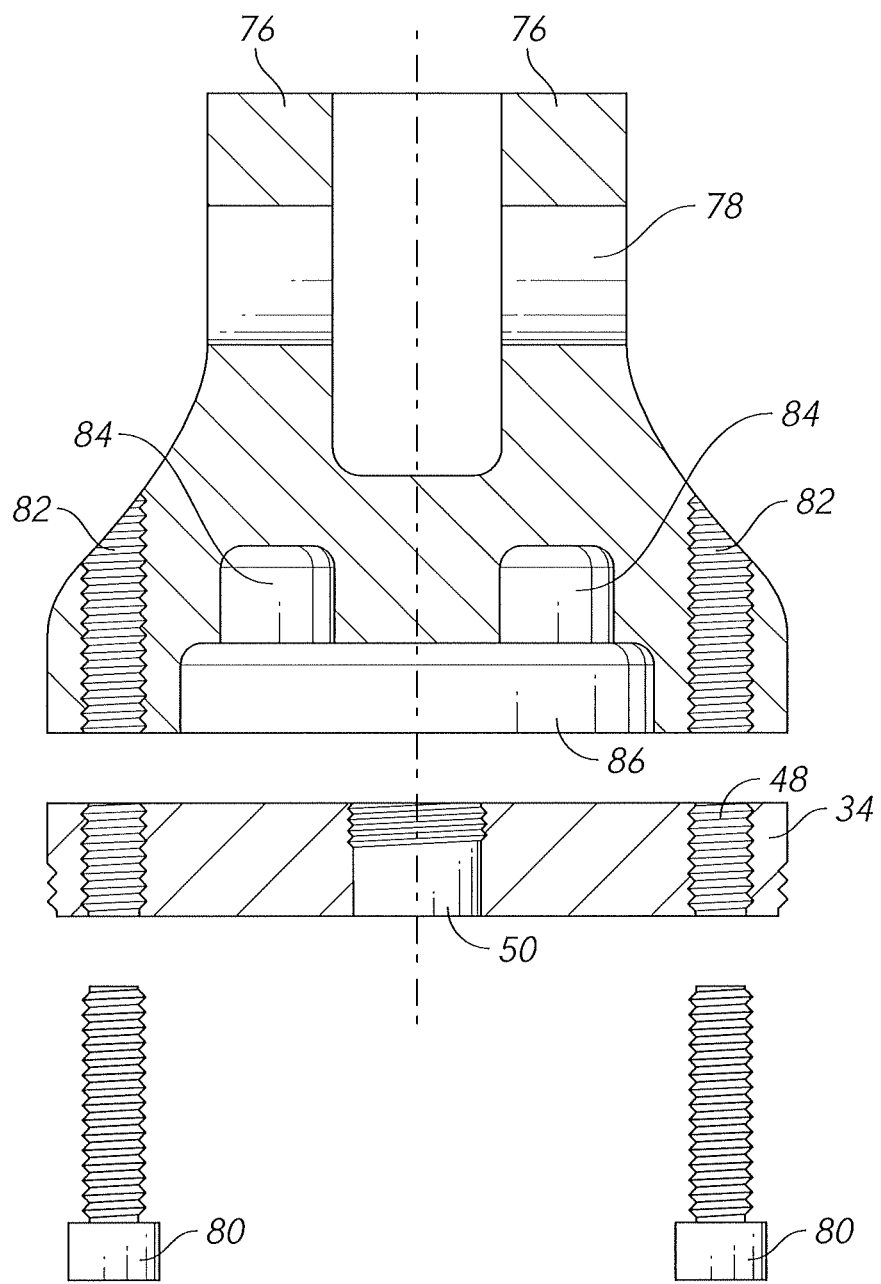
FIG. 7 is a sectional elevation view, showing a version in which a separate collector and housing is used.

Housing 74 includes one or more internal recesses 84 that may be used to house one or more instrumentation packages. FIG. 7 shows a sectional elevation view through collector 34 and housing 74. Cavity 86 is provided in the portion of the housing that faces the collector. One or more additional recesses may be provided where the limitations of structural strength requirements permit. In the example shown, two such recesses 84 are provided.

It is preferable to provide space for instrumentation within the integrated termination itself. However, any available region around the integrated termination could be employed as space for instrumentation—provided that it is sufficiently protected (for applications needing such protection). The protective body for the instrumentation need not be the same body that is used for the integrated termination. Housing 74 is preferably quite robust, and in some cases may be sealed from water and/or water pressure. Given that most instruments are sensitive to water and/or the pressures of deep water operation, a boundary will typically need to be established for ocean lifting applications (other applications will not need pressure resistance but may still need dust resistance). This can either be done within housing 74 as an example, or individually between instrument package components. For example the power source and sensors may have independently sealed packages for this purpose. Housing 74 would then not require an overall seal.

Figure 8:
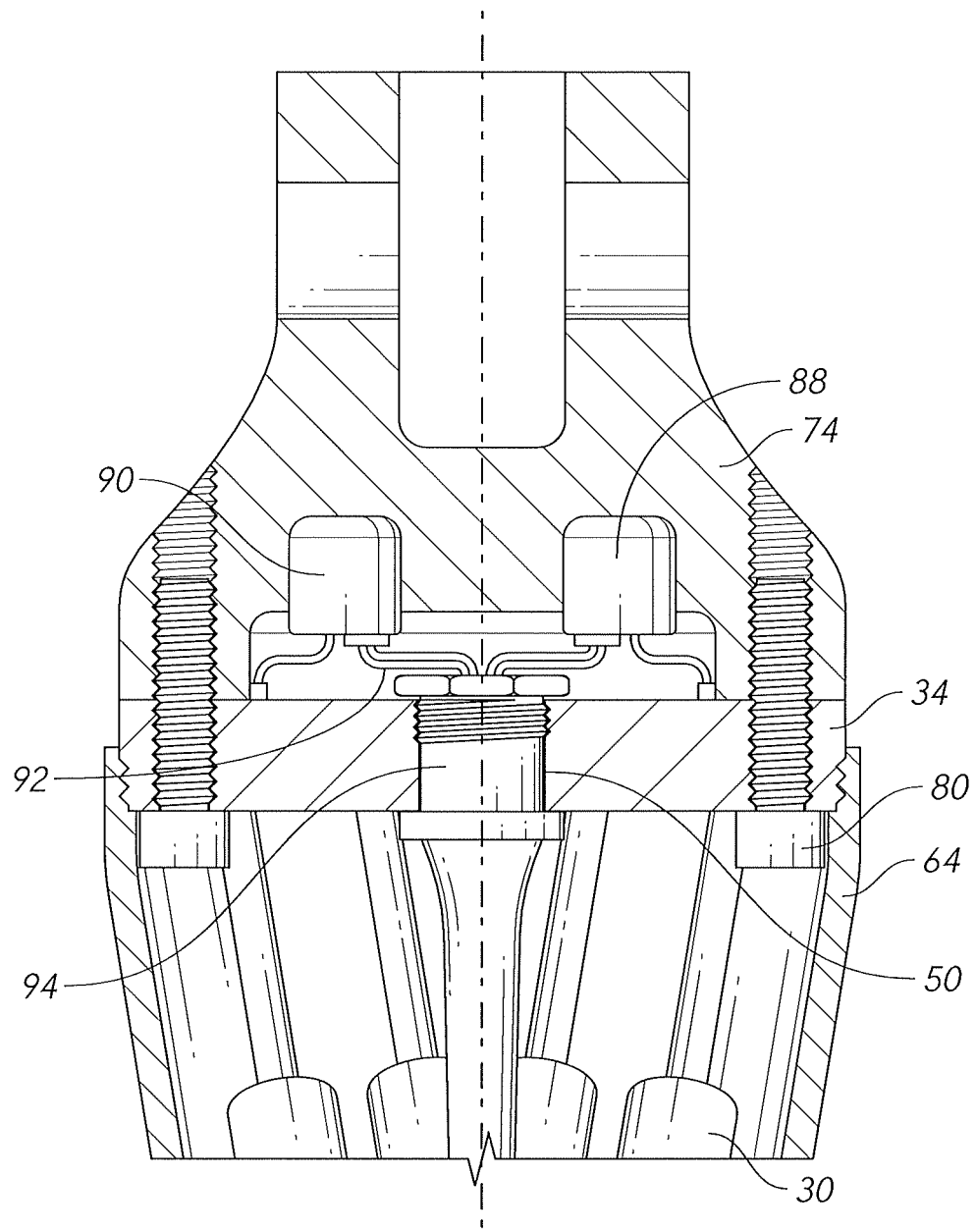
FIG. 8 is a sectional elevation view, showing a completed assembly using the components of FIG. 7.

The user will note in FIG. 7 how bolts 80 may be placed in through holes 48 and threaded into receivers 82. FIG. 8 shows a sectional view through an assembly made according to the present invention (The section is taken on the same plane used for FIG. 7). Core termination 94 is provided on the end of core 72 in this example. It is secured within central opening 50 in collector 34. In this version core 72 is not intended to carry significant tension. It houses communication and/or power lines that extend along the entire length, or in some cases a portion, of the cable.

First instrument package 88 and second instrument package 90 are contained within housing 74. These instrument packages are connected to the elements in core 72 (such as fiber optic lines and electrical conductors). The instrument packages are also connected (in this version) to the load cells monitoring the load on each individual strand. As will be known to those working in the field of deep water lifting, the addition of power, communication, data, air, fluid, or any form of auxiliary service line can be incorporated within the strength member to increase the service context of the intelligent cable module. These service lines can be incorporated in countless configurations, such as inside strands, between strands, within layers of the jacket, temporarily wrapped and unwrapped around the outside of the cable, etc. The proposed invention is not limited to any specific cable design. However, the addition of auxiliary service lines can significantly increase the advantages of the inventive termination.

As an example of the above, the addition of fiber optics and in some cases power within the lifting cable may allow high speed data transfer for real-time feedback of position, or operation of subsea ROVs and/or AUVs. In such cases, the intelligent termination can more easily become the power and/or communication hub for additional machines and/or devices operating at depth.

The reader will also note in the example of FIG. 8 that middle strand collector 64 has been attached to the outer perimeter of collector 34. The unification of these elements (see FIG. 1—housing, collector, middle strand collector, distal strand collector, and cable) creates a solid and protective assembly. As shown in FIG. 8, the instrument packages and associated connections are well-protected inside a very solid surrounding structure. This configuration is preferable, as a cable termination frequently lives in a hostile environment. As covered previously, this housing may take on many shapes and forms, including separate or attached housings that may not be within the termination casing.

Figure 9:
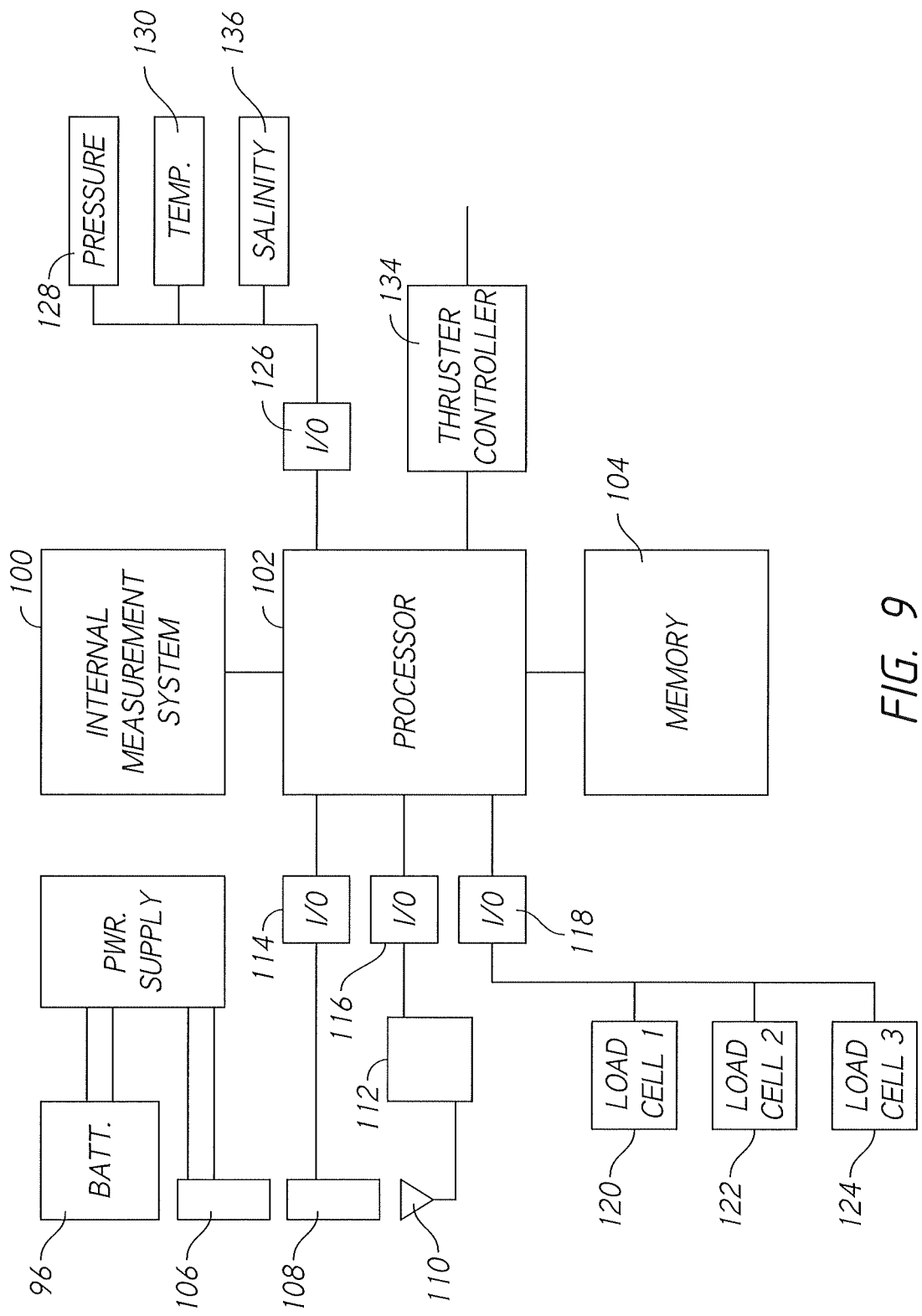
FIG. 9 is a schematic view, showing a representative instrumentation package for an inventive termination.

The instrument package(s) may include many types of electronic devices. FIG. 9 schematically depicts an exemplary embodiment to aid the reader's understanding. The reader should first bear in mind that some versions will include external power and/or communication connections, while others will not. The unconnected versions will run on internal power and may save information for subsequent downloading, or pulse information to other sources on an interval or as-needed basis (such as a strand integrity breach alarm signaling an acoustic transmitter to communicate to an external receiver). The connected versions may transfer information up the cable (such as to a receiver on board a surface vessel) as they are being used. FIG. 9 shows an externally-connected version (meaning a version that is designed to maintain communication up the cable).

The instrument package(s) may include only analog devices. An example would be load cell circuitry that sends a sensed value up the cable. It is preferable in most cases, however, to include digital devices such as one or more processors within the intelligent cable module itself. These may be used to convert information to a digital format and thereby facilitate easier retention and transmittal. The example of FIG. 9 uses digital circuitry.

Processor 102 is ideally a programmable device capable of running suitable software. It includes an associated memory 104. The memory is preferably non-volatile so that it may store data over time even if the power is lost. Power supply 98 provides stable power to all the components shown (The power connections are not depicted). The power supply may draw input power from battery 96, from external power connector 106, or both. Additionally it may draw power from an alternate source such as an ROV tether or auxiliary power source on the sea floor.

Inertial measurement system 100 ("IMS") provides position and orientation data to the processor. It preferably provides full six degree of freedom information. Using conventional nomenclature, this means that the IMS provides such information as X-axis position, Y-axis position, Z-axis position, roll angle, pitch angle, and yaw angle. The IMS may also provide such information as a rate-of-change for these values. The information provided by the IMS allows the processor to "know" the intelligent module's position in space and its orientation. This assumes, of course, that accurate initial information is provided (an initial value for all six state variables). Providing initial state information is well understood in the art. As one example, the termination might be placed in an initial "zeroing" fixture. After it is zeroed the cable to which the termination is connected would then be lifted by a boom on a crane and swung into service moving a payload.

The IMS is not limited to any particular kind of system. Such systems have traditionally used spinning gyroscopes in combination with linear accelerometers. However, since space will be somewhat limited inside the termination, solid state solutions are preferable. The preferred embodiments will likely employ "ring laser gyros." As those skilled in the art will know, these devices are not gyros at all. Rather, each individual ring laser measures interference between counter-propagating laser beams to sense angular velocity. Mathematical functions are used to convert the angular velocity to angular position. Where less accuracy is required, MEMS devices (micro electromechanical systems) may be used for monitoring the roll, pitch, and yaw motion.

Linear accelerometers (essentially very accurate force detectors) are used to measure linear acceleration that is then integrated to determine position (X, Y, and Z). Where high accuracy is needed, three orthogonal ring laser assemblies are used and multiple linear accelerometers are used. The IMS generally contains its own internal processor and memory. These units integrate the received data to produce values for the six state variables. Alternatively, raw data may be fed from the IMS to the processor and the processor may perform the integrating functions.

The reader should bear in mind that not all inventive embodiments will include a full six degree of freedom IMS. As an example, some embodiments may provide only positional data without any attitude data. Others may provide attitude data with no reference to position. Still others may omit an IMS altogether.

Multiple input/output ports 114, 116, 118, 126 are provided for the processor. I/O port 114 provides connection to communication connector 108. In this example the communication connector provides a hard-wired connecting to the far end of the cable. If, for example, the cable is being paid off a shipboard crane, the far end of the cable will remain on the ship and the communication connector will allow real-time communication between the ship and the termination (even though the termination may be thousands of meters below the ocean's surface).

I/O port 116 connects processor 102 to acoustic transducer 112. The acoustic transducer is connected to acoustic antenna 110. This is a device intended for undersea communications. It allows sonar-like signals to be sent by the termination to other devices. The termination can also receive these signals from an external source. This type of communication device is merely an example, as it is one of many potential technologies that can be used to either transmit or receive information. As an example, for the standing rigging on a drag-line crane, the communication is preferably via radio signals and antenna 110 in that application would be an R/F antenna.

I/O port 118 connects the numerous load cells 120, 122, 124 (feeding load data from the individual strands) to processor 102 (any type of load sensor may be substituted).

I/O port 126 connects multiple sensors to the processor. In this example, it connects pressure sensor 128, temperature sensor 130, and salinity sensor 136. These are merely examples of the many forms of sensors that may be tied into the instrument package. These may reside within the housing or be separate. In some cases they may be entirely separate, such as those on the subsea infrastructure—and may simply communicate data to the instrument package.

Returning briefly to FIG. 8, the reader will note the numerous wire connections 92 to the core and to the load cells monitoring the strand loads. The processor is able to use these connections to monitor position and loading information and to send that data back to the far end of the cable through the electrical and/or optical connections in core 72. Of course if the termination is designed to be a standalone system without power and/or communication running down the cable, this data is simply stored for ship-side retrieval or transmitted on an as needed basis. Power in that case is handed via a sufficient local power source.

In the version shown in FIG. 9 the intelligent cable module is configured for deep water lifting operations. The exemplary termination is provided with a pair of thrusters that can provide limited positioning adjustment—controlling both the twist in the cable as it moves down the water column, and the positioning of the payload as it nears its point of connection on the sea floor. Thruster controller 134 controls the orientation and thrust provided by the thrusters. The thruster controller is integrated with processor 102 as shown.

Figure 11:
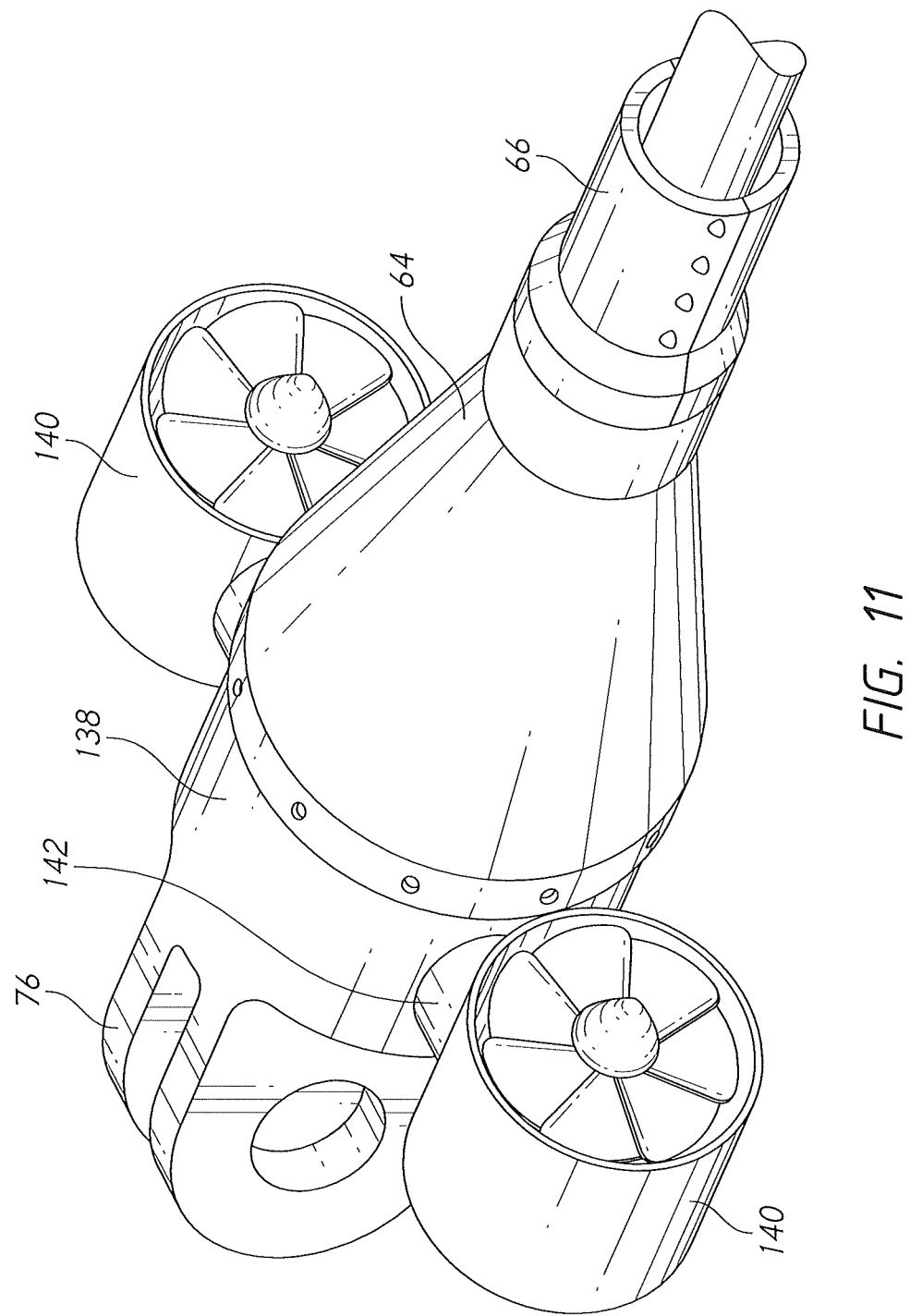
FIG. 11 is a perspective view, showing an inventive termination with thrusters.

FIG. 11 provides a perspective view of the completed termination with a series of thrusters 140 included. Each thruster may be independently pivoted about its trunnion mount 142. Each thruster may also be throttled and reversed in this embodiment. The orientation and affiliation of thrusters may vary widely, and may not necessarily be integral to the termination housing. For example these may be mounted to a large external frame. In other cases there may further be auxiliary thrusters or position orienting devices mounted to the actual payload.

Figure 13:
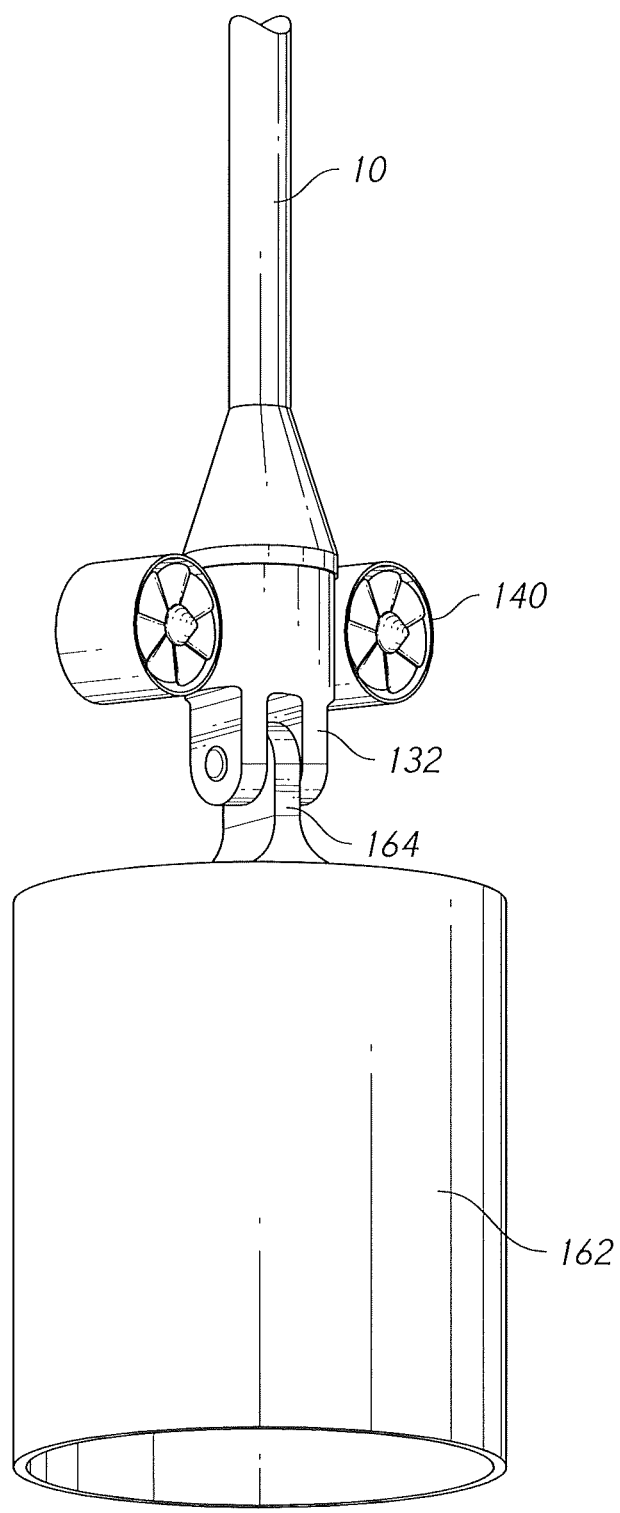
FIG. 13 is a perspective view, showing the use of the inventive termination to place a payload in the deep water lifting environment.

FIG. 13 shows a view of the intelligent termination 132 attached to a representative payload 162 in a deep water lifting scenario. Lifting tang 164 on the payload is connected to the clevis assembly by a cross-pin. Cable 10 suspends the assembly from a crane located on a surface vessel. Thrusters 140 provide selective lateral and torsional mobility on the sea floor, as well as assuring that the cable is not twisted when traveling to and from the vessel through the water column which has alternating currents. With synthetic fiber and hybrid ropes in particular, this is helpful in assuring that rope integrity remains intact.

Surface vessel crane control systems include stabilization functions that are generally referred to as "anti-heave" functions. These are designed to minimize wave-induced motion of the payload on the end of the cable. However, these anti-heave functions in the prior art have no useful information regarding the exact motion of the termination and its attached payload when at depth. Rather, they attempt to compensate using only information regarding the motion of the surface vessel. This is a challenge when running in deep water. It is especially significant with the use of synthetic fibers as the delayed spring response is more difficult to predict. In the present invention (for embodiments including real-time data transmission), the termination can transmit accurate motion and position information which can then be used by the surface anti-heave systems or an inline device.

Figure 10:
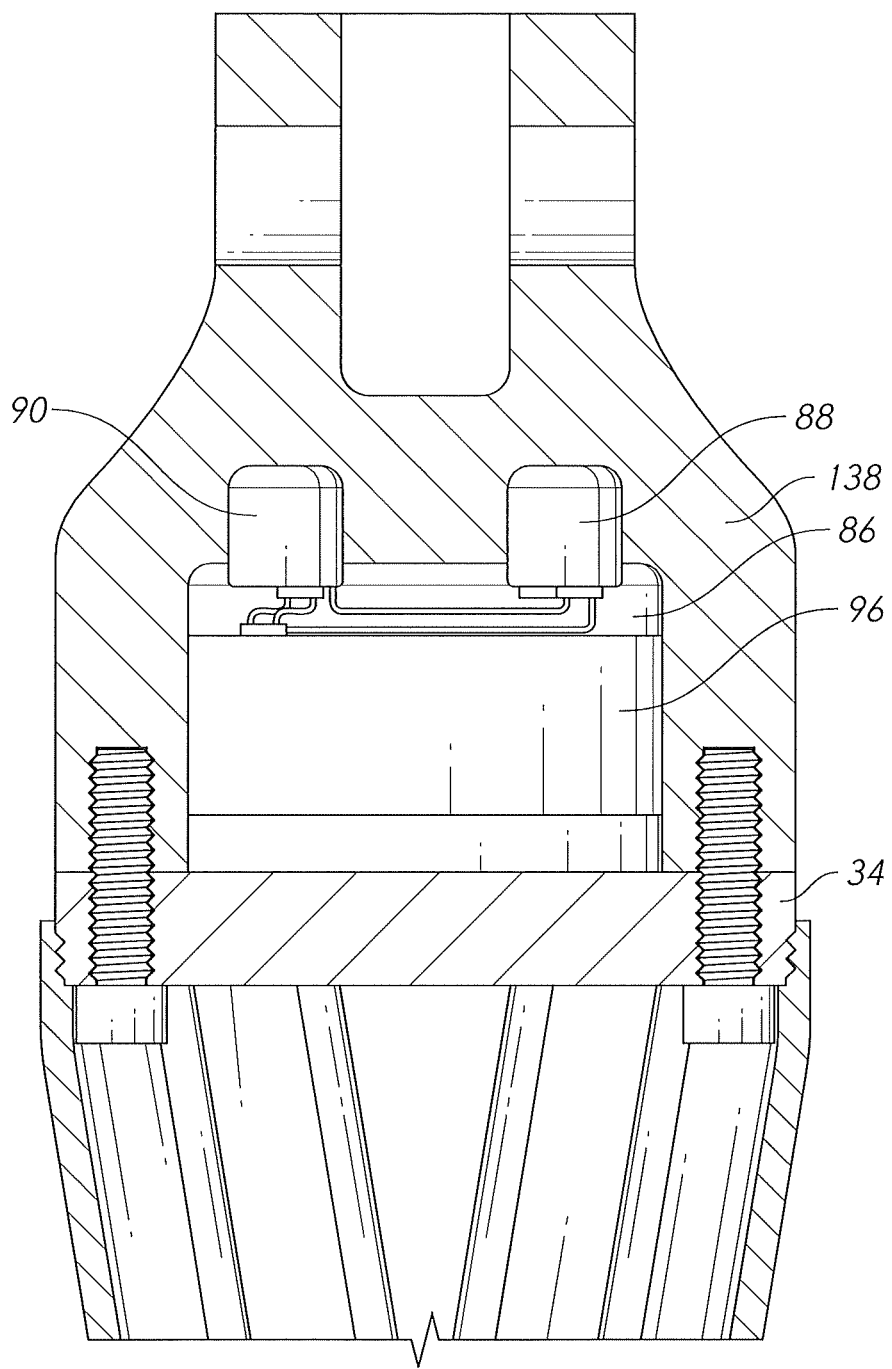
FIG. 10 is a sectional elevation view, showing another embodiment of the inventive termination.

FIG. 10 shows another embodiment in which there is no communication through the cable. Extended housing 138 includes a larger cavity 86. A large battery 96 is provided in this cavity. The battery provides electrical power to the instrument packages, the load cells, and other items requiring electrical power. In this version the instrument packages are more akin to the "black box" of an aircraft (a flight data recorder). An external port (not shown) is provided so that when the termination is brought in for service the battery can be recharged and the internally-stored data can be downloaded. Of course, non-wired options are also possible for the battery charging and data downloading (such as an inductive connection).

Figure 12:
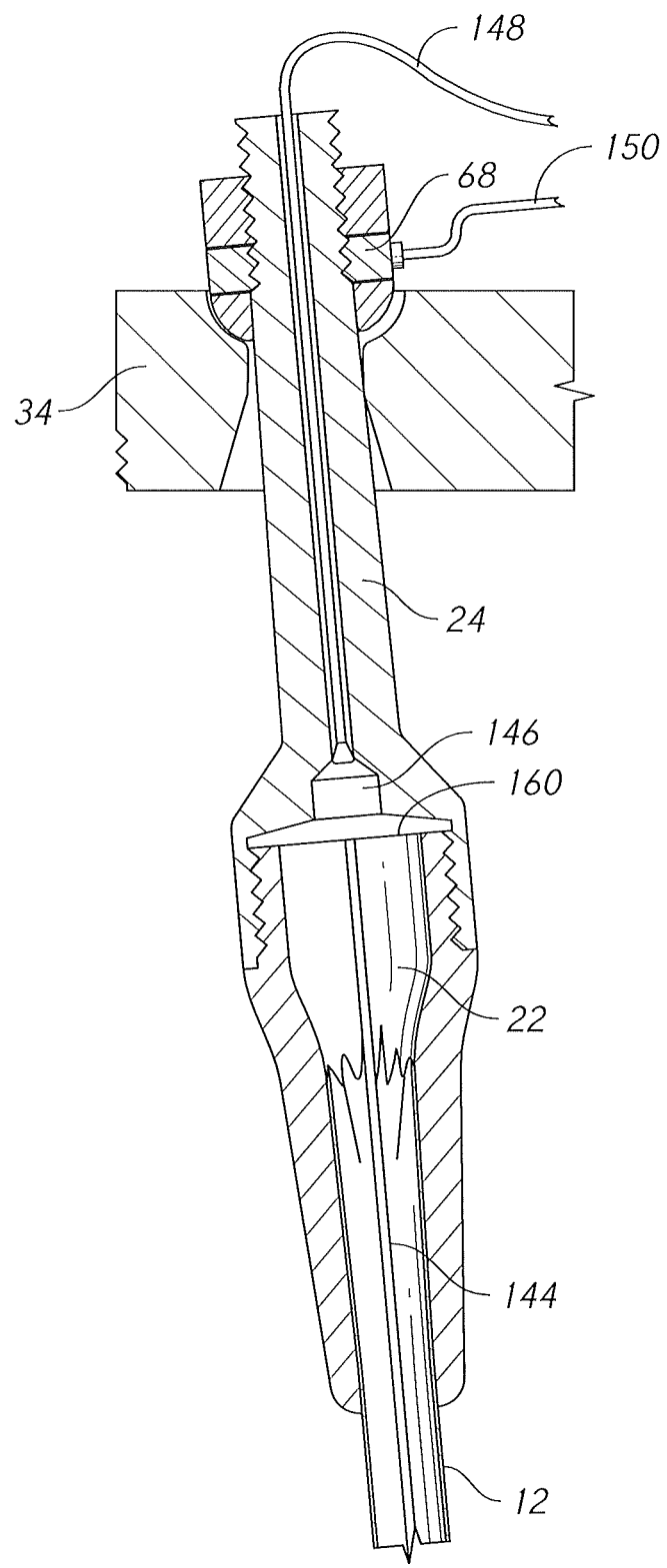
FIG. 12 is a sectional elevation view, showing a strand termination with an embedded sensing/comm element.

Other components may be provided to proactively monitor the state of the load strands (as opposed to inferring their state from the loads applied to them). FIG. 12 shows an embodiment in which strand 12 includes embedded sensing/communication elements 144. These elements are intended to be used in monitoring the condition of the cable (though they may possibly be used for communication as well). In the version shown, these elements are optical fibers that stretch from one end of the cable to the other. Light is applied to the far end of the cable. Sensor 146 measures the light transmitted and sensor lead 148 passes through the loading stud to carry this information to the processor (sensor lead 150 carries the load cell information). The optical fibers are sized to break as the strand is over-stressed. Alternately if a strand is damaged or cut in operation the ceased light would indicate a potential hazard. A reduction in light transmission thereby indicates a cable overstress. This example is one of many possible configurations. Fiber optics could run through a jacket, down the center of the rope, etc. Alternatively, the use of electrical conductors could carry a similar function—providing either strain or pass/fail criteria for damage to the cable. Significantly, in all cases the termination may aid in collecting or transmitting the relevant information to determine the health of the lifting cable. In the event of a sensed problem, it could further be used to communicate the hazard to the surface vessel and/or other subsea equipment.

Most damage to tensile fiber strength members, especially with synthetic fiber cables, would occur in the last few meters of the cable (as it reaches the termination). In the case of undersea operations the damage results from the fact that ROVs would be operating in this area. Thus, in some embodiments the sensing/comm elements 144 may only be included in this portion of the cable. One approach is to embed a 20 meter loop of conductive material and then monitor for breaks in this material (such as by monitoring for increased resistance).

Figure 14:
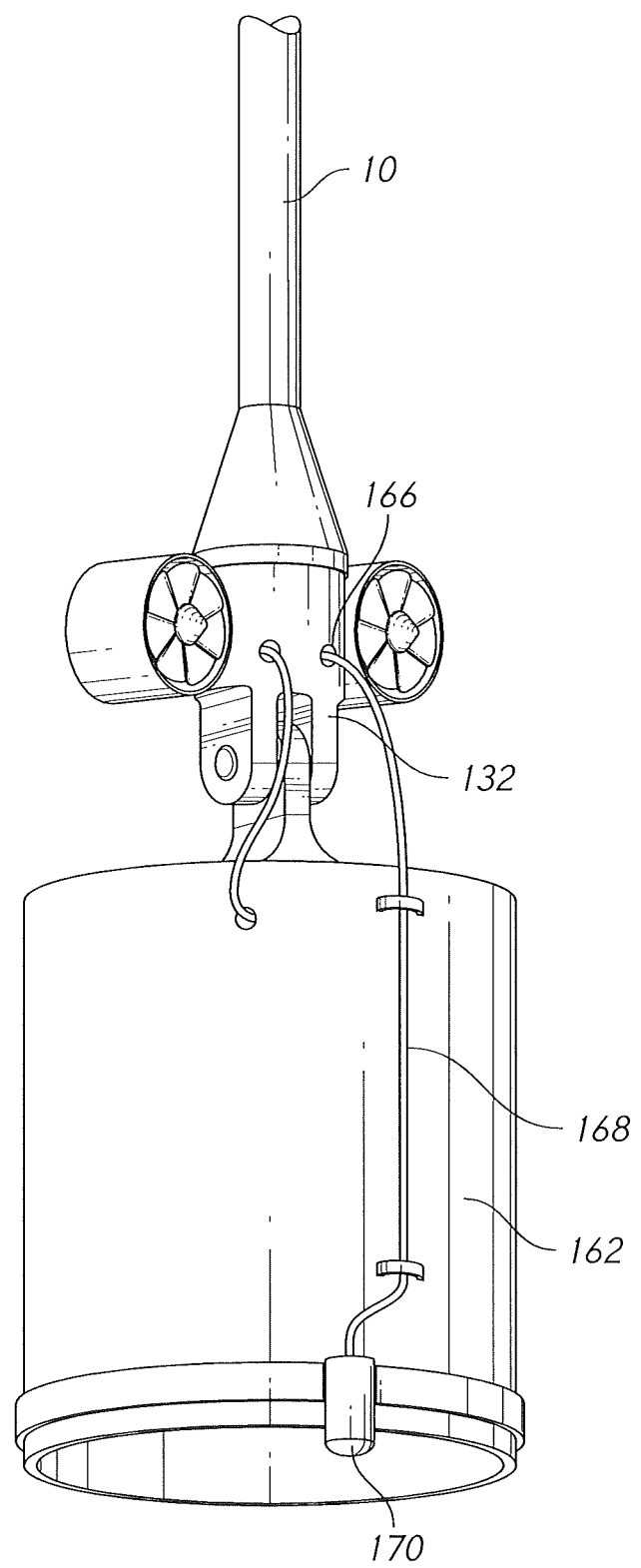
FIG. 14 is a perspective view, showing the addition of an external camera to the assembly of FIG. 13.

The sensors and other components provided within the intelligent cable termination need not be connected directly to the termination itself. FIG. 14 illustrates a placement scenario where downward visibility is needed from payload 162. Camera 170 is mounted on payload 162 in a position providing a good downward field of view. Cable 168 attaches to camera 172 and to connector 166 on intelligent cable termination 132. In this version, video data is fed into the instrument package(s) within the termination and then up cable 10 to a surface ship. The video data is used to guide the placement of the payload. The camera and cable may be left with the payload when the payload is released from intelligent cable termination 132. Connector 166 may facilitate this detachment (by being designed to reliably pull free upon the application of a specified detachment force).

Figure 15:
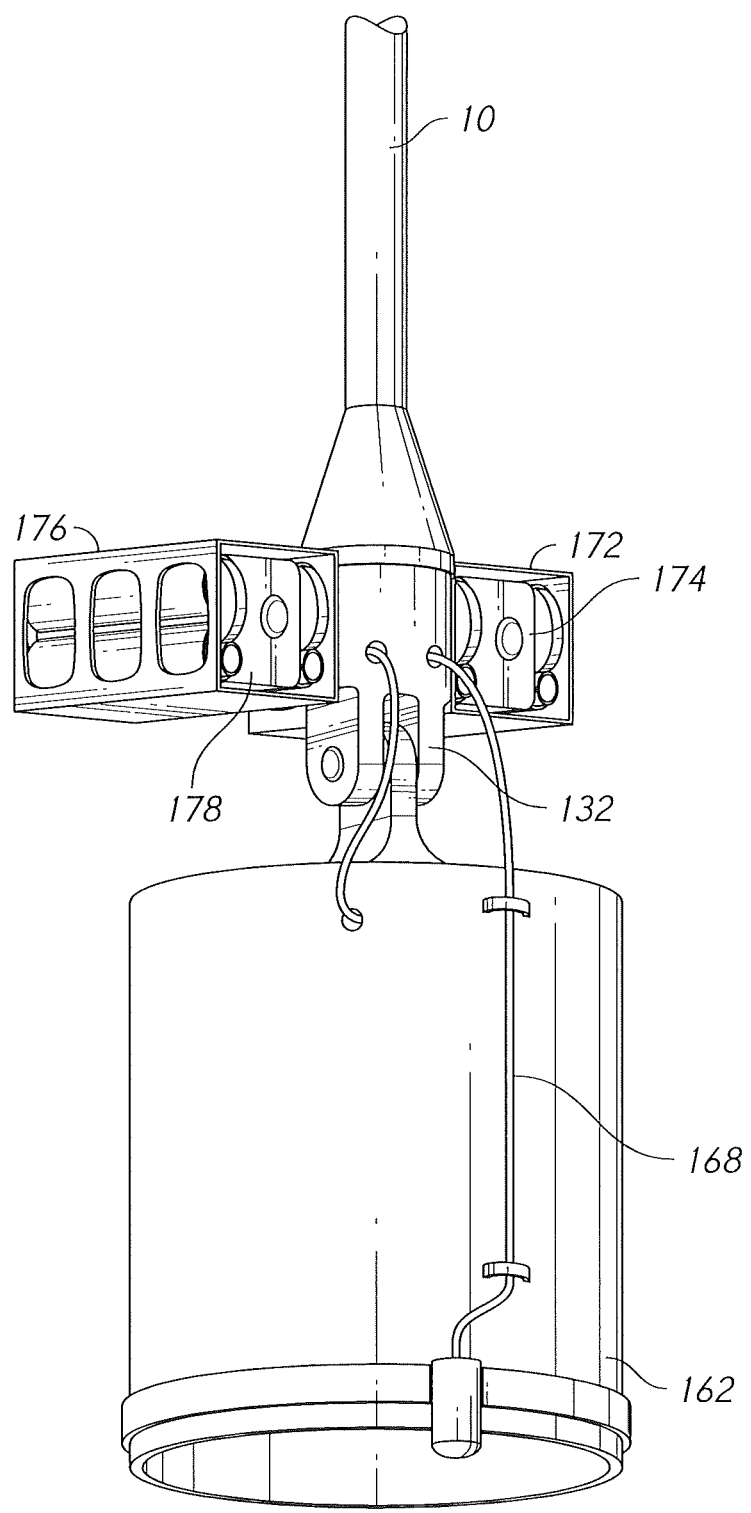
FIG. 15 is a perspective view, showing the addition of a pair of ROV garages and ROV's to the intelligent cable termination.
Figure 16:
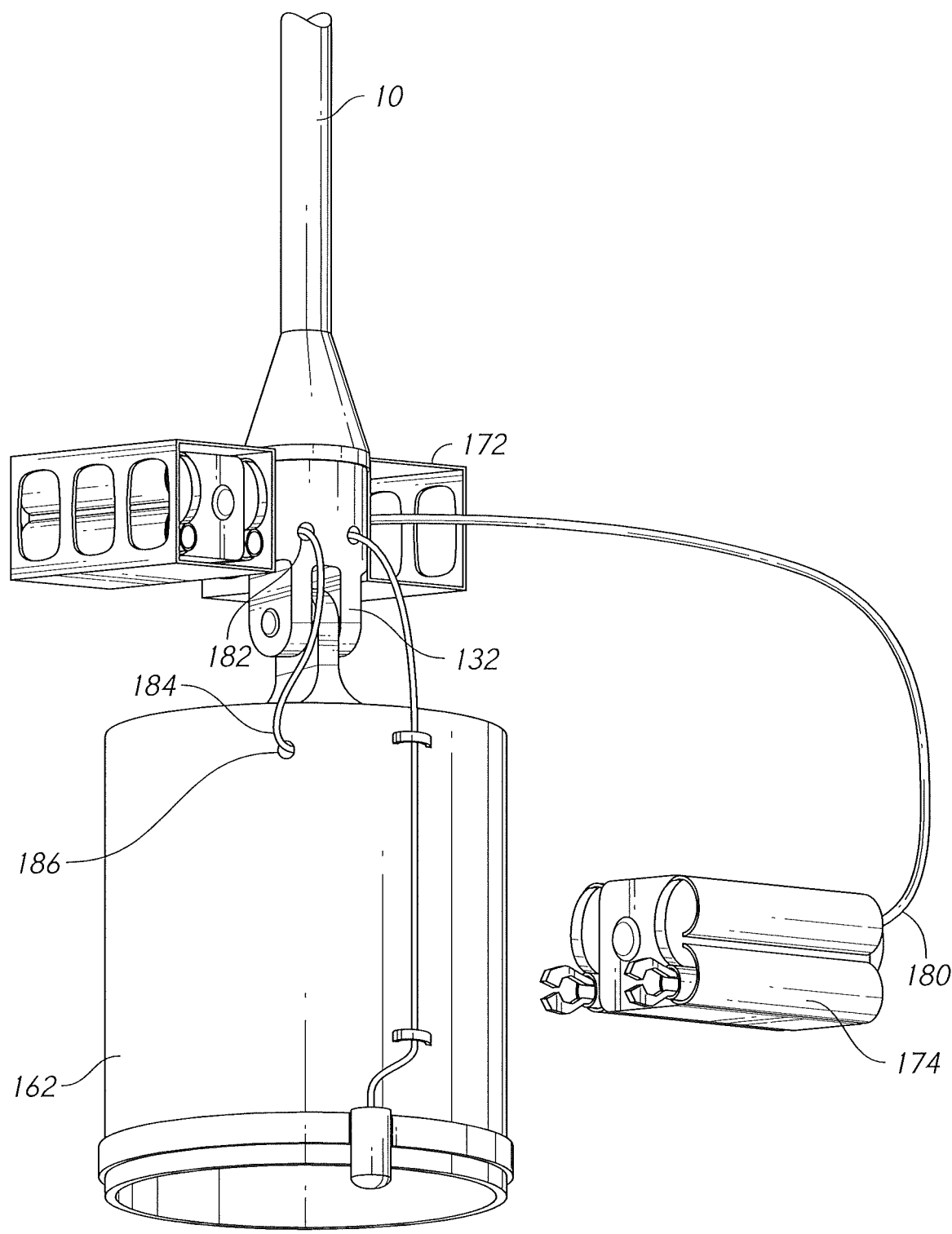
FIG. 16 is a perspective view, showing one of the ROV's of FIG. 15 in operation.

FIGS. 15 and 16 show still another embodiment in which ROV's (remotely operated vehicles) are used. It is common in undersea lifting operations to use ROV's to guide and place a payload. These ROV's are typically lowered and controlled using a cable other than the cable used for lifting the payload. Many ROV's are lowered into a working position in a protective "ROV garage." The ROV garage may contain a tether connected to the ROV. The tether often pays off a reel as needed. The tether may carry electrical power, bidirectional data signals, and air or fluid pressure. In recent years autonomous underwater vehicles ("AUV's") are replacing ROV's in some applications. In this disclosure, the term "ROV" shall be understood to encompass both ROV's and AUV's. An AUV does not usually have a tether but it may still be deployed from a garage and it is often charged in that garage.

FIG. 15 shows an embodiment in which two ROV garages 172, 176 are connected to intelligent cable termination 132. Each ROV garage contains an ROV 174, 178. Using this system, the ROV's are lowered with the payload. The ROV's may be used to manipulate the position and orientation of the payload, as well as operating other systems such as the mechanism that releases the payload from the cable. The ROV's may also provide video data so that a surface operator can see the state of the payload and its surroundings.

FIG. 16 shows the same assembly with ROV 174 having left its garage 172. ROV 174 may be maneuvered as needed. It contains multiple thrusters that allow it to orient itself in a desired direction and provide force in a desired direction. Information regarding the state of the ROV may be sent via tether 180 back to ROV garage 172. This information may then be fed into the instrument package(s) within intelligent cable termination 132 (and possibly back up cable 10).

It is also possible to establish communications directly between the payload and the intelligent cable termination. In the version of FIG. 16, electrical cable 184 connects connector 182 on the termination to connector 186 on the payload. If, for example, the payload contains a release mechanism, this connection may be used to instruct the payload to release itself from intelligent cable termination 132. Cable 184 would then detach itself as the intelligent cable termination is lifted away from the payload.

Figure 17:
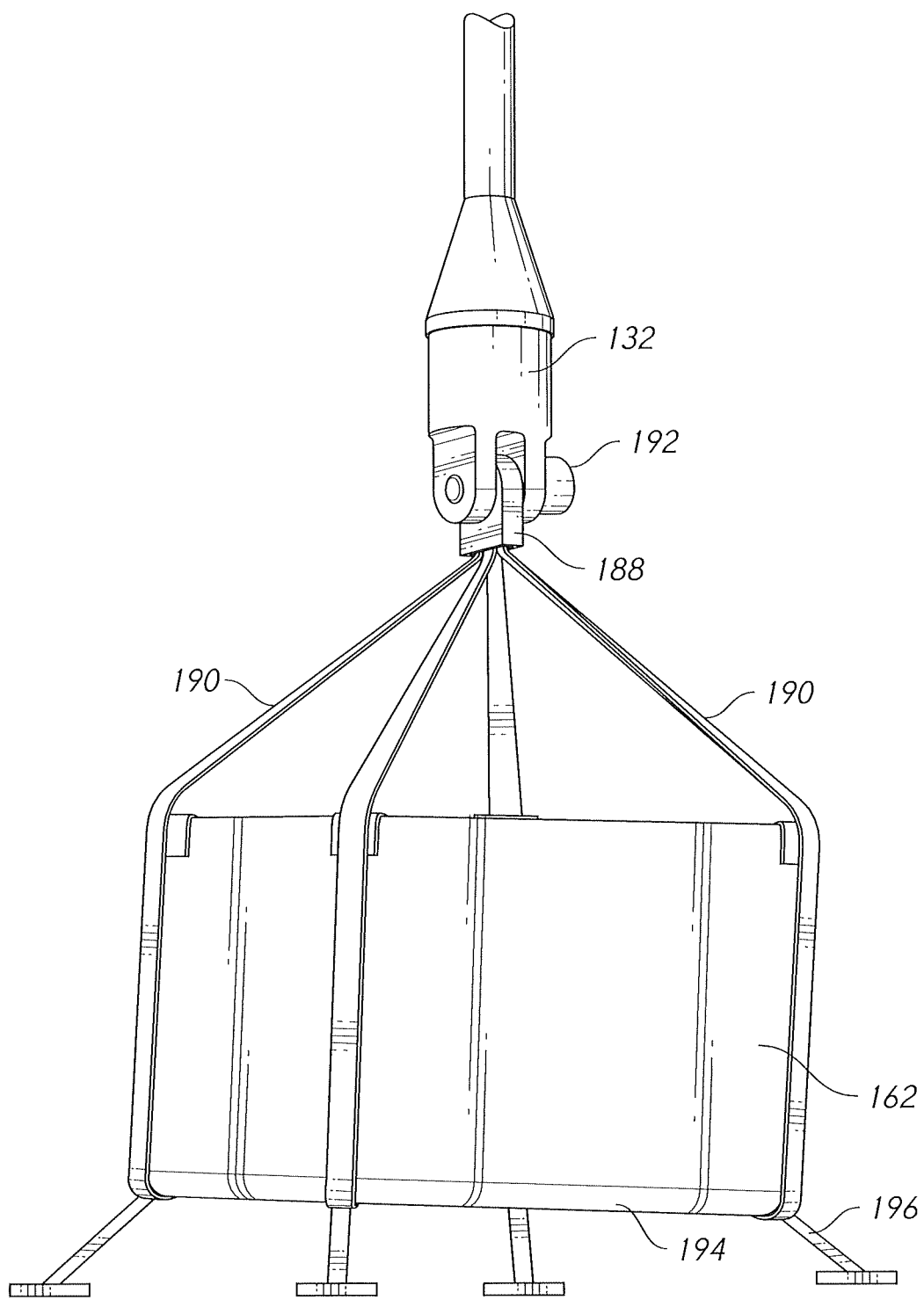
FIG. 17 is a perspective view, showing a different payload configuration.

FIG. 17 depicts a more common configuration for a payload. In this version payload 162 rests atop a standard pallet 194 with four legs 196. Rigging is used to appropriately suspend the load. In this case four slings 190 extend along the sides of the payload and down to the pallet. The four slings are joined to tang 188, which is connected to the intelligent cable termination. Release mechanism 192 is provided to selectively release tang 188.

When the assembly reaches its destination (such as the seabed), release mechanism 192 is actuated and the tang and slings fall free from the intelligent cable termination. The release mechanism may be actuated by an instrument package in the termination. Alternatively, it may be released by an ROV. The rigging may remain with the payload indefinitely. In the alternative, an ROV can be used to detach and retrieve the rigging.

As explained initially, an inventive intelligent cable module can be provided at any desired point along the cable. The preceding examples have been located near the end of a cable. In the following examples an intelligent cable termination is provided at some point in between a cable's terminations.

Figure 18:
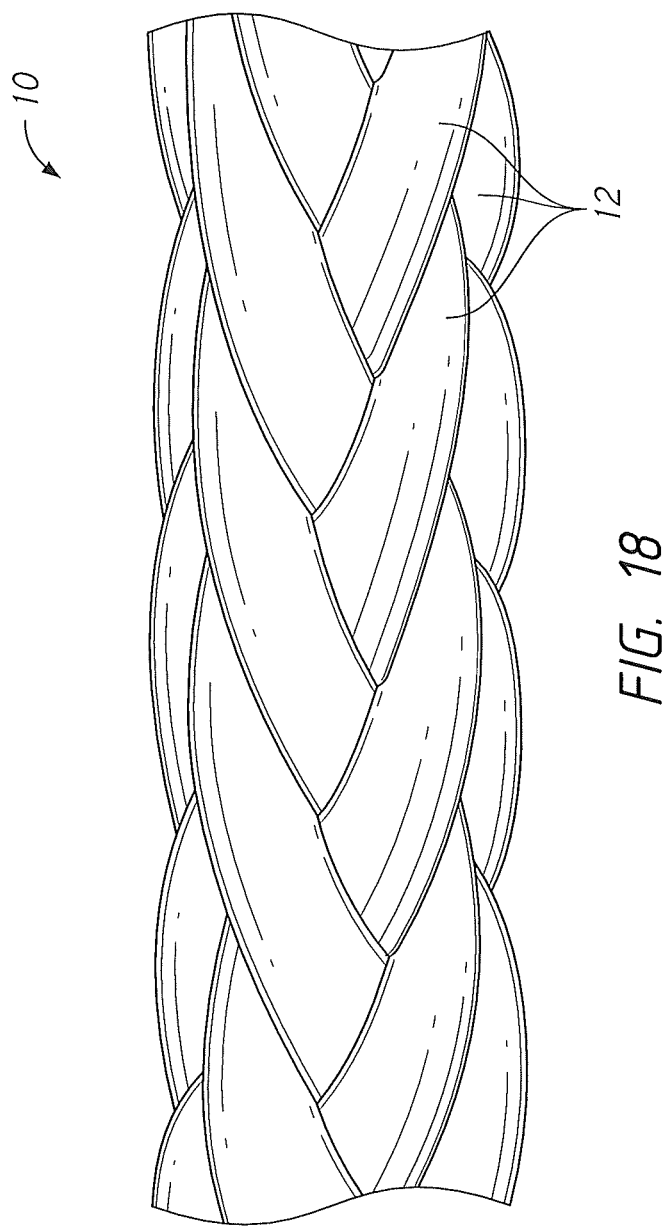
FIG. 18 is an elevation view, showing a common construction for a braided cable.

FIG. 18 shows an elevation view of a 12-strand braided cable. The individual strands 12 are interwoven to create the pattern shown. As those skilled in the art will know, it is possible to loosen the construction of such a cable in order to provide access to the cable's interior. This process is used when weaving a length of cable back into itself to form an eye (see, for example, commonly owned U.S. Pat. No. 9,791,337).

Figure 19:
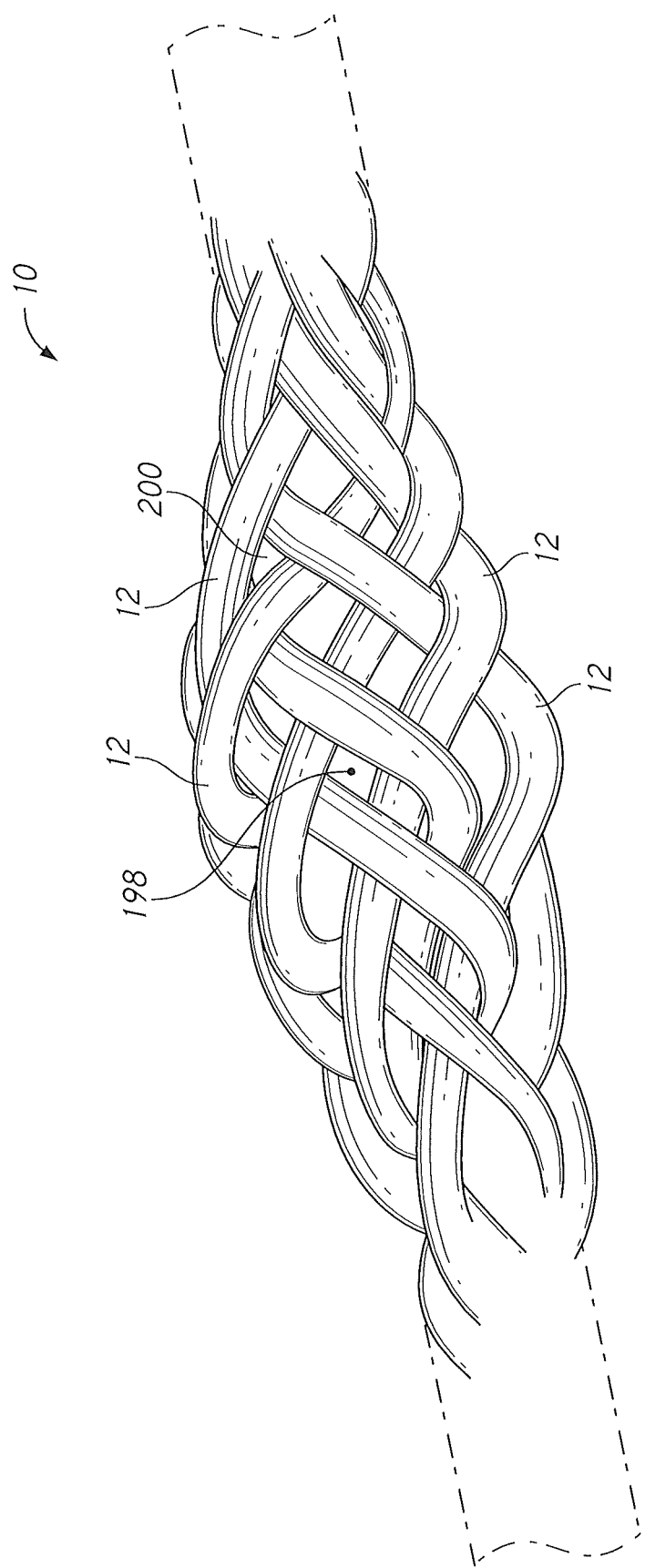
FIG. 19 is a perspective view, showing how the strands of a cable can be loosened to expose a central void and gaps between the individual strands.
Figure 20:
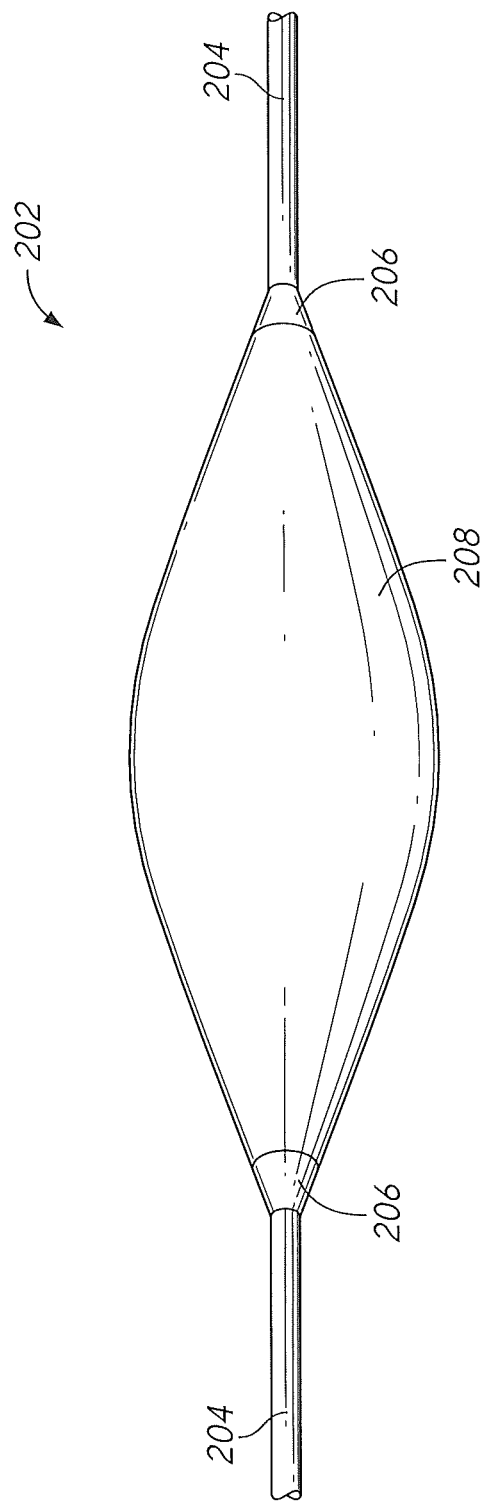
FIG. 20 is a perspective view, showing an exemplary intelligent cable module configured to fit in the central void of a braided cable.

FIG. 19 shows the cable of FIG. 18 after the strands have been loosened to reveal central void 198 within the cable. Many individual inter-strand voids 200 are also created by the loosening process. FIG. 20 shows an embodiment of an intelligent cable module configured for insertion into the center of a braided cable. Intelligent cable module 202 has a smoothly shaped module casing 208. In this version communication strand 204 runs down the center of a braided cable. A connector 206 is provided on each end of module casing 208. These connectors connect the devices within module casing 208 to communication strand 204.

Figure 21:
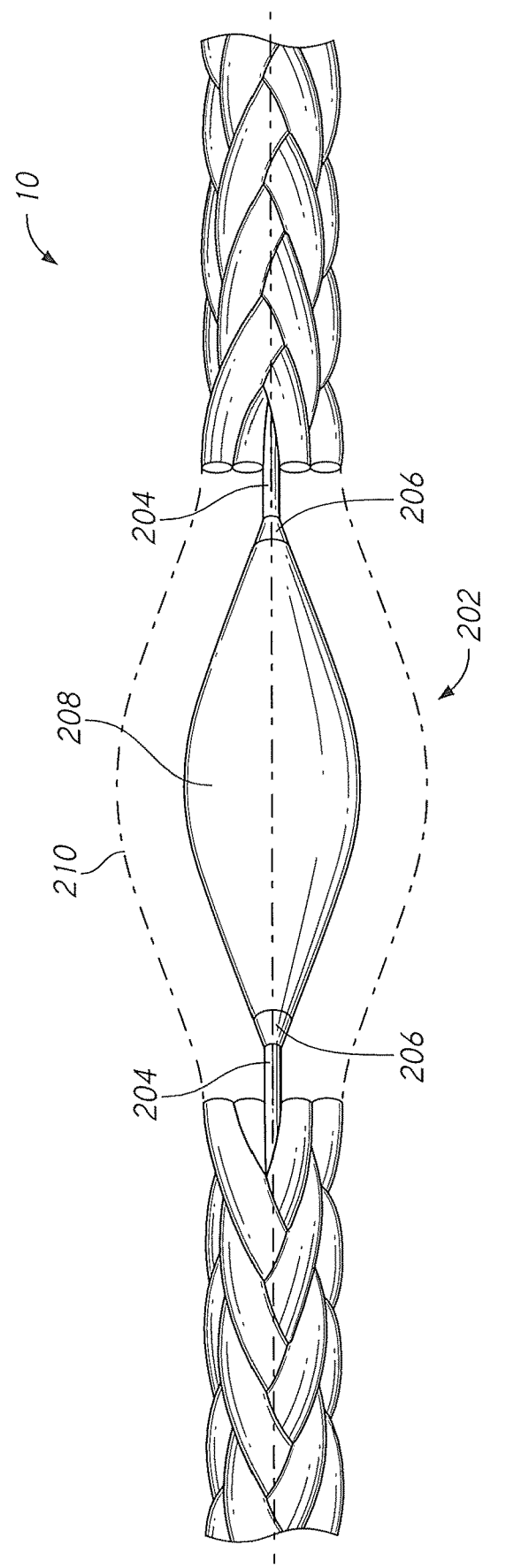
FIG. 21 is an elevation view with a cutaway, showing the intelligent cable module of FIG. 20 installed inside a cable.

Module casing 208 typically contains a processor and other associated digital devices—such as shown in the diagram of FIG. 9. FIG. 21 shows a view of intelligent cable module 202 installed within cable 10. The cable is cut away in the view (in the vicinity of the intelligent module). Communication strand 204 passes down the cable's core and connects to module casing 208. Multiple intelligent cable modules may be provided along the cable's length, with communication strand 204 providing communication between these modules and to devices external to the cable. Once the module is in place, the strands are laid over the module in the same configuration as the rest of the cable. The perimeter of the cable is shown in a phantom line in the view (bulging portion 210). From the cable's exterior, a bulge is evident in the vicinity of the intelligent cable module. However, the intelligent cable module itself is protected within the strands.

There are several ways in which an intelligent cable module such as shown in FIG. 21 can be installed. One approach is to install the module(s) at the time the cable is created. A cable braiding machine creates a braid of strands around a core. In some cases the core is empty (a spacing mandrel may be used during the manufacturing process). In other cases the core contains a "filler" strand. Communication strand can be fed into the core as the braid is created. Module casings can also be added at desired intervals. In this case it may be necessary to modify the braiding machine to have a larger core diameter in the vicinity of the intelligent cable module.

Figure 26:
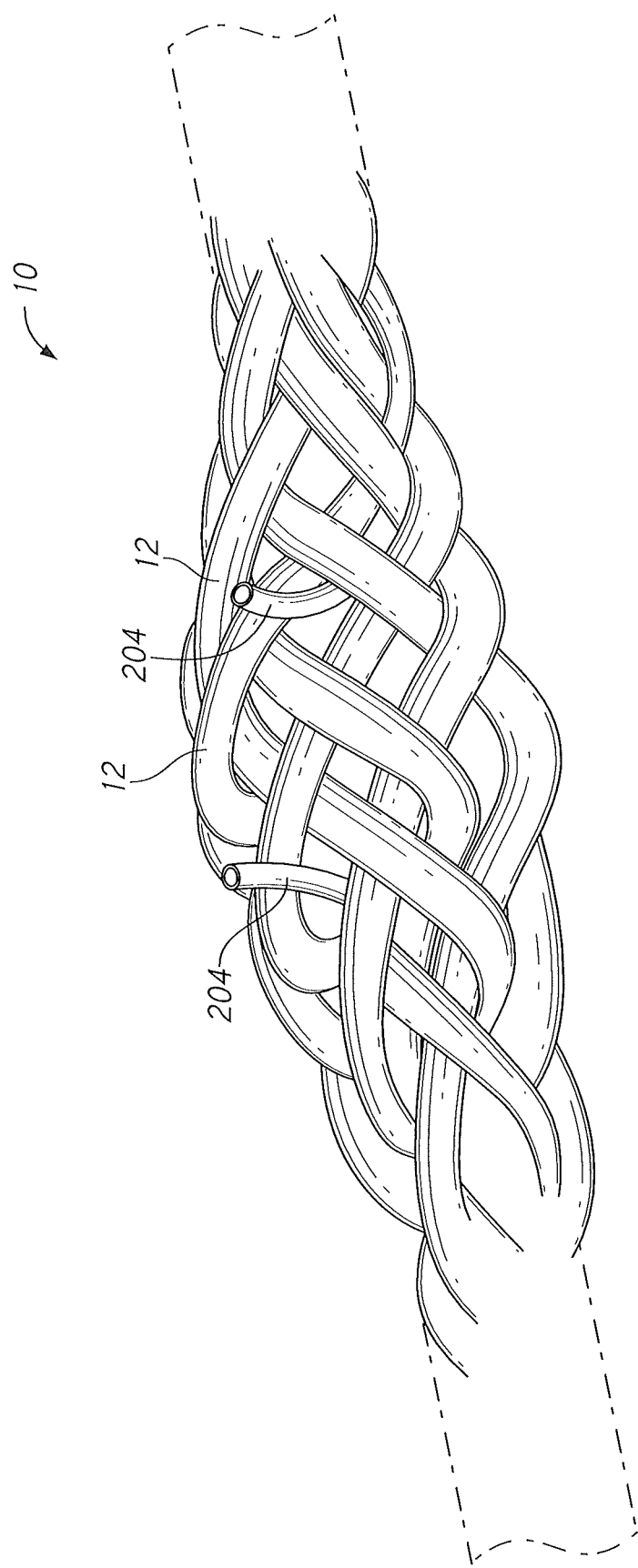
FIG. 26 is a perspective view showing how an intelligent cable module can be added at any desired position along a cable's length.

A second approach to installing an intelligent cable module is to add the module after the cable has been braided together with communication strand 204 at the core. FIG. 26 shows cable 10 with the strands urged apart to reveal the interior void. A portion of communication strand 204 is exposed and then cut to leave two cut ends as shown. Communication strand 204 in this case is a simple bundle of electrical conductors in a jacket. Each of the conductors is made part of a connector 206 (such as shown in FIG. 21) and then slipped back into the void inside the cable. An intelligent cable module is slipped into the void as well, and the two connectors are then attached to the module to create an assembly such as shown in FIG. 21.

Figure 22:
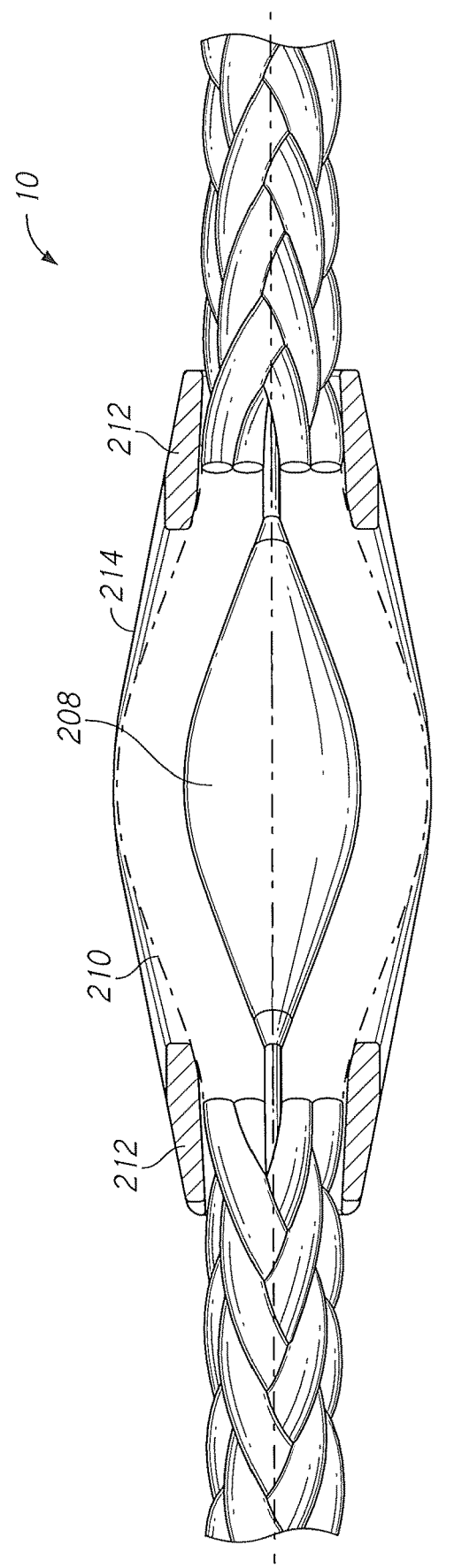
FIG. 22 is a sectional elevation view, showing the use of clamping collars to hold the module of FIG. 21 in position.

One of the issues with an assembly such as shown in FIG. 21 is the tendency of the intelligent cable module to move longitudinally within the cable's core. Other components may be added to fix its position. FIG. 22 shows the assembly of FIG. 21 with the addition of a pair of clamping collars 212. Each clamping collar 212 is a split collar that clamps to the cable's exterior. The two clamping collars may be joined by a protective cover 214. Cover 214 keeps the two clamping collars from moving away from each other. The result is that module casing 208 is trapped between the two clamping collars.

Figure 23:
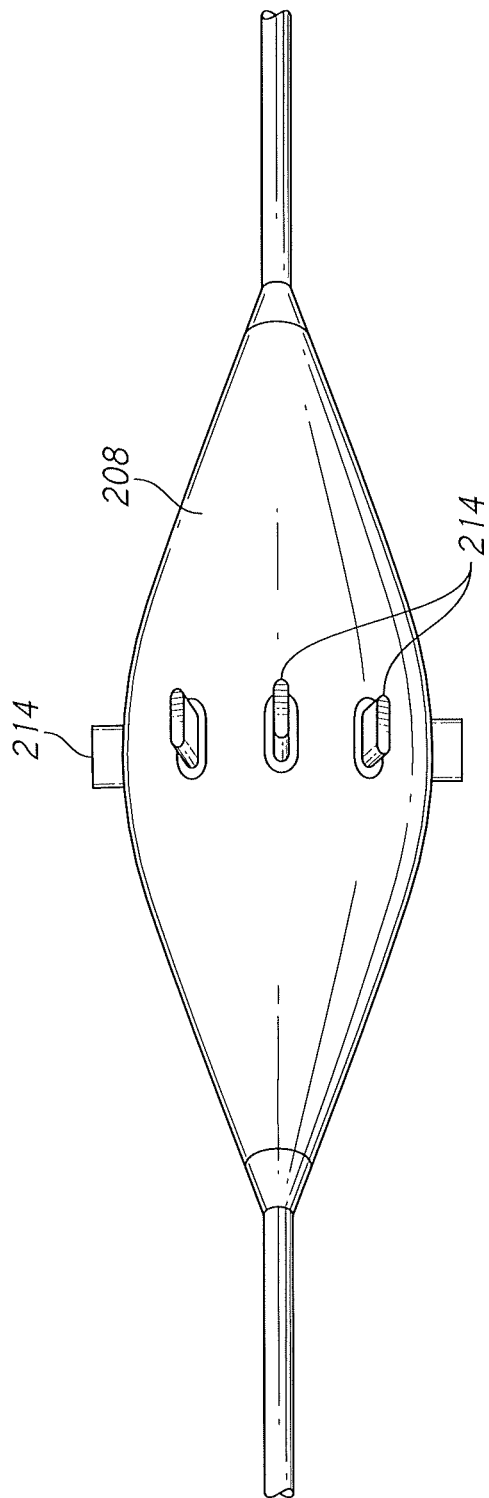
FIG. 23 is a perspective view, showing an embodiment of the intelligent cable module including radial prongs to stabilize its position.

FIG. 23 shows another approach to maintaining the longitudinal position of the intelligent cable module. In this embodiment module casing 208 features an array of radial prongs 214. These protrude outward. Returning briefly to FIG. 18, the reader will note how the braided strands 12 have intersections at regular intervals both laterally and longitudinally. FIG. 19 shows how the strands can be urged apart. Once the module casing 208 is placed into the interior of the cable, tension is placed on the cable gradually and each radial prong 214 is urged into the intersection of two adjacent strands. When additional tension is added the strands will grow taut around module casing 208. The module casing 208 is then held in place via the fact that each radial prong is engaging the strands passing over the exterior of the module casing.

Once module casing 208 is secured in the cable's interior, inward pressure on the module casing can be correlated to cable tension. Thus, it is possible to measure tension at intermediate points along the length of the cable without interrupting any of the cable's strands.

Figure 24:
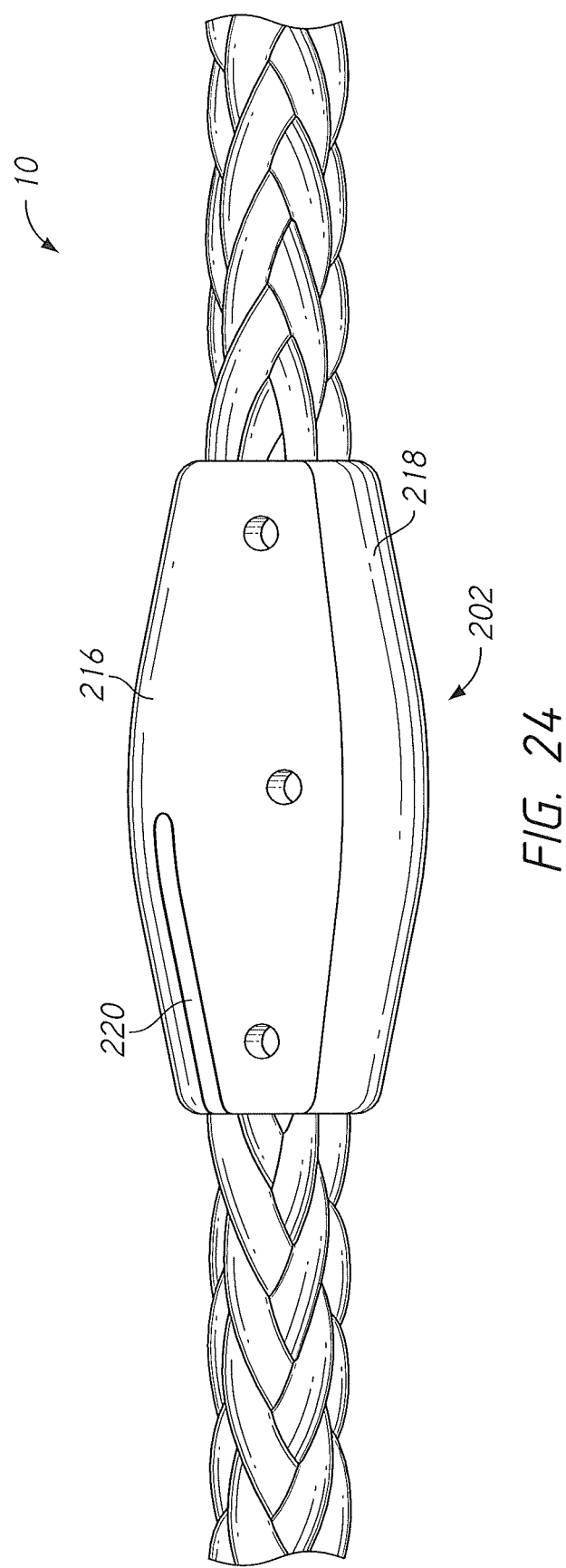
FIG. 24 is an elevation view, showing an embodiment of an intelligent cable module configured to clamp to the exterior of a cable.

FIG. 24 shows another embodiment for the intelligent cable module. In this version the module is split into two halves 216, 218 that are clamped over the cable's exterior. This embodiment is configured for use on a fixed cable for a dragline crane. The intelligent cable module contains tension monitoring instruments and a processor (with components similar to those depicted in FIG. 9). However, because this example operates in air, radio communication is preferred. Antenna 220 is provided on the module's exterior. This sends and receives radio signals.

Figure 25:
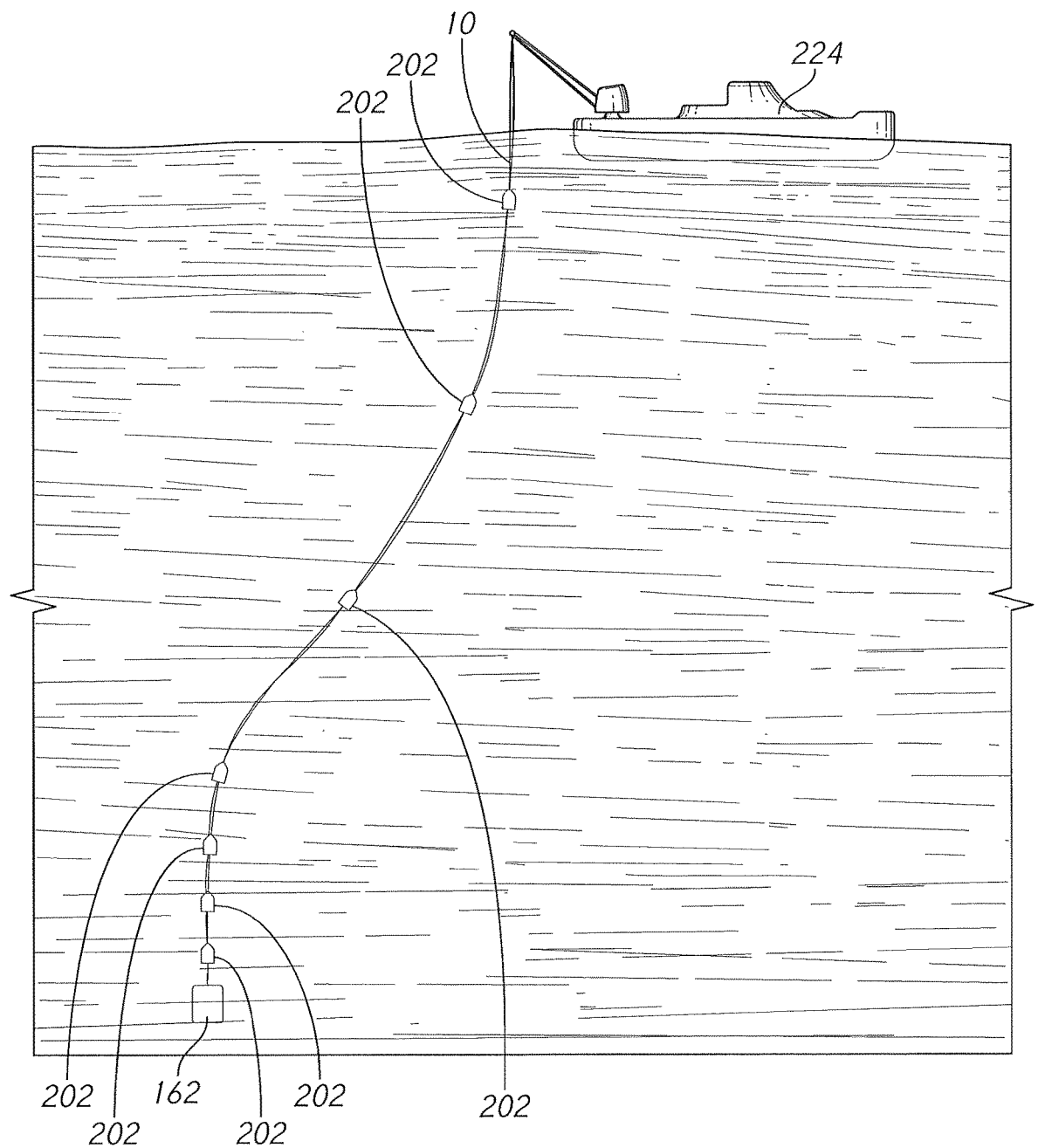
FIG. 25 is an elevation view, showing the use of multiple intelligent cable modules along a cable in a marine lifting application.

In some applications a single cable will have multiple intelligent cable modules. FIG. 25 shows a single cable extending from a crane on board vessel 224 to payload 162 near the sea floor. Multiple intelligent cable modules 202 are installed along the length of the cable. The density of modules is varied in this example, with more modules being provided adjacent to the payload.

Figure 27:
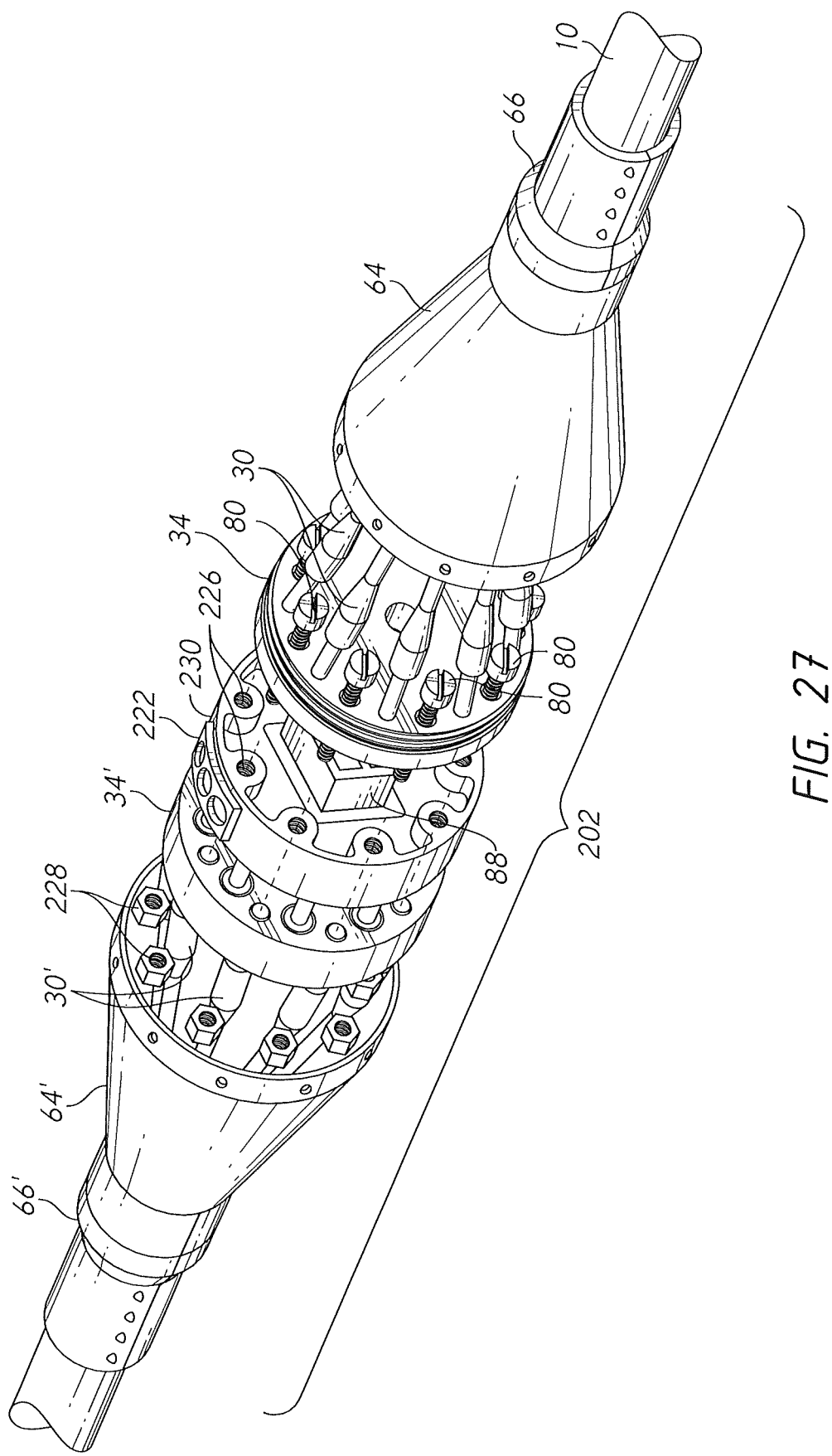
FIG. 27 is an exploded perspective view, showing the addition of an intelligent cable module in a length of cable.
Figure 28:
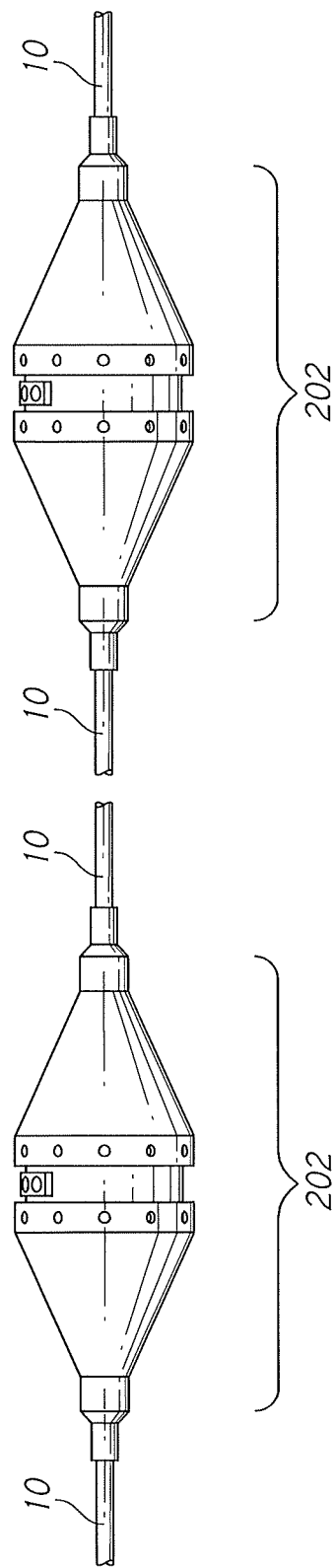
FIG. 28 is an elevation view, showing the addition of two intelligent cable modules in a length of cable.

In some embodiments it is desirable to provide tension information for each strand at an intermediate point in the cable. FIGS. 27-28 depict an embodiment of an intelligent cable termination configured for this application. Intelligent cable termination 202 is shown in an exploded state. Housing 230 contains first instrument package 88, along with a processor, connectors, and communication hardware (such as depicted in FIG. 9).

As for the example of FIG. 1, cable 10 includes multiple individual strands. Each strand is attached to a strand termination 30. The strand terminations 30 on the right side in the view are attached to collector 34. The attachment for each strand includes load cells that monitor the tension on the strand.

The strands on the left side of the view am attached to strand terminations 30', and these are attached to collector 34'. Housing 230 and collector 34' include an array of through holes 226. The components shown are secured together by passing bolts 80 through holes 226 and then applying and tightening nuts 228. This draws housing 230, collector 34, and collector 34' tightly together. Middle strand collector 64 is then secured to collector 34 and middle strand collector 34' is secured to collector 34'.

The result is an intelligent cable termination 202 in the middle of a cable that can monitor tension on each individual strand and transmit that information to an external monitoring system (or record it for future retrieval). FIG. 28 shows a cable 10 with two intelligent cable modules 202 installed. In reality the two modules may be quite far apart (such as 1 km).

Figure 29:
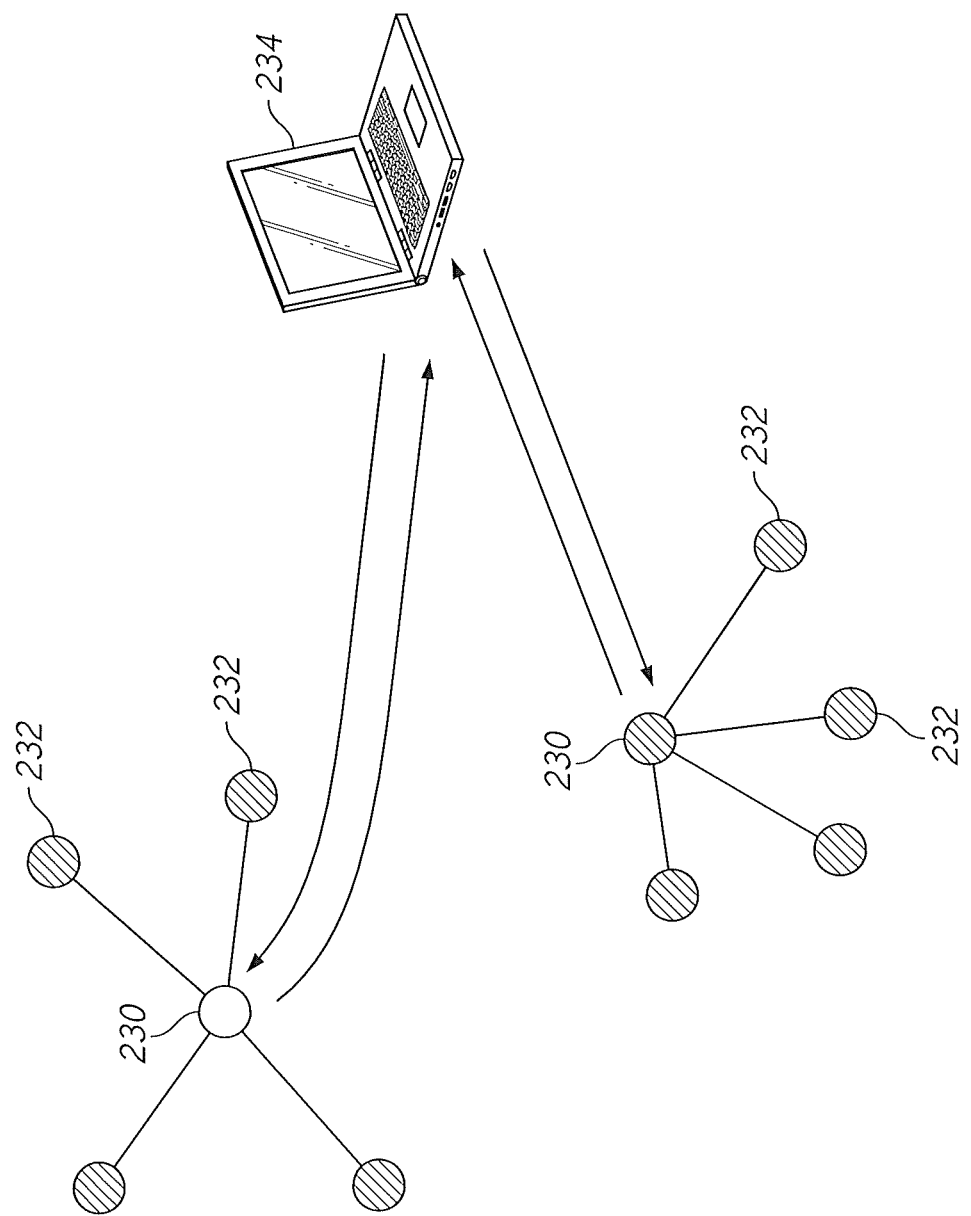
FIG. 29 is a schematic view, showing a master-based network among intelligent cable modules and other systems.

Returning to FIG. 25 the reader will recall that multiple intelligent cable modules may be present in a given installation (including multiple modules on multiple cables). These may be organized as network nodes. FIG. 29 shows an exemplary embodiment in which controlling computer 234 communicates directly with master nodes 230. Each master node 230 then communicates with several nodes 232.

Figure 30:
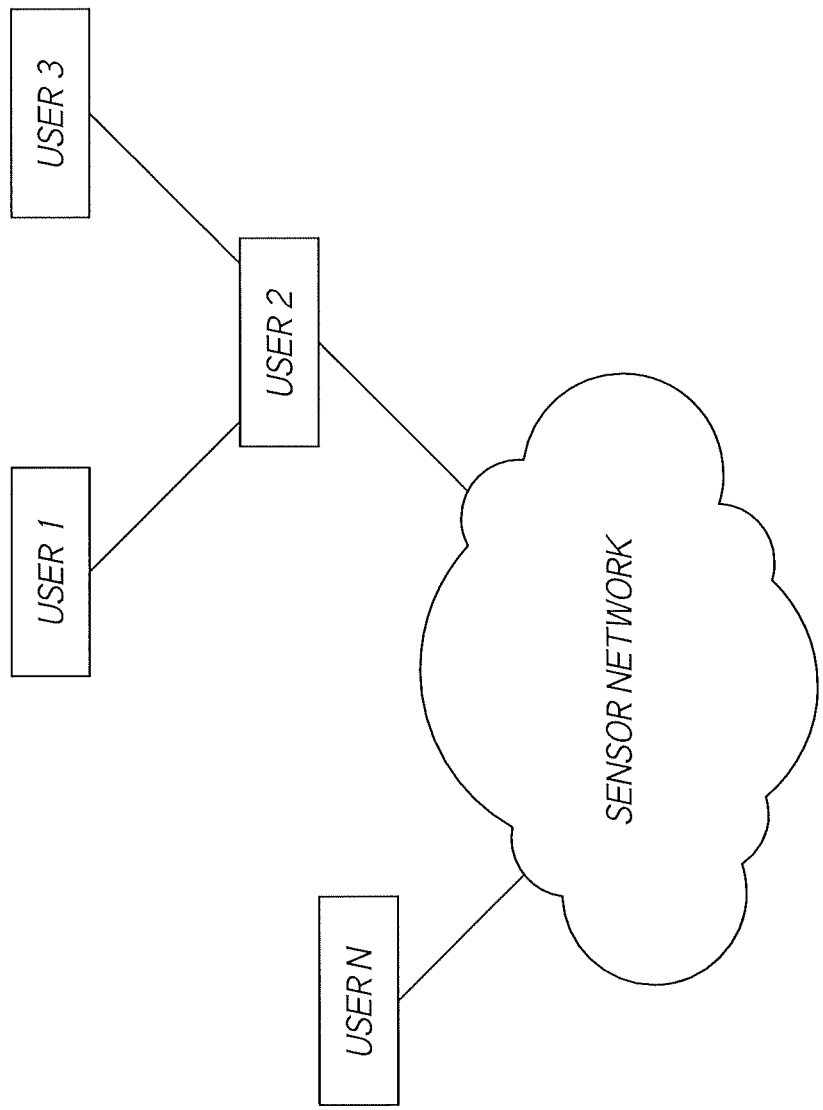
FIG. 30 is a schematic view, showing a masterless network among intelligent cable modules and other systems.

It is also possible to use a peer-to-peer network. FIG. 30 shows such a network in which multiple users (directly or indirectly) access a sensor network as embodied in the intelligent cable modules. Such a network can be a mobile ad hoc network ("MANET") where nodes come and go depending on availability. Consider for example the depiction in FIG. 25. Communication in this example can be via sonic pulses. Those modules near the bottom may have good communication with the payload while the surface vessel does not. In a MANET each node can be configured to disseminate information to other available nodes, which then further disseminate the information. In this way information could be conveyed back up to the surface.

Another good example is found in offshore mooring operations such as are used for oil drilling platforms. In a common configuration 16 separate mooring lines extend from the floating platform down to anchors on the sea floor. These mooring lines are tightened until the platform reaches a desired level of stability. If such cables include intelligent cable modules then a network will not normally be confined to a single cable. Rather, the network may include all modules in all 16 cables. If a MANET is used then a module in one cable may have a stronger communication link with a module in a second cable instead of another module within the same cable (particularly if sound pulses are used for communication). Modules in different cables can then relay messages back and forth to create a robust communication network.

Figure 31:
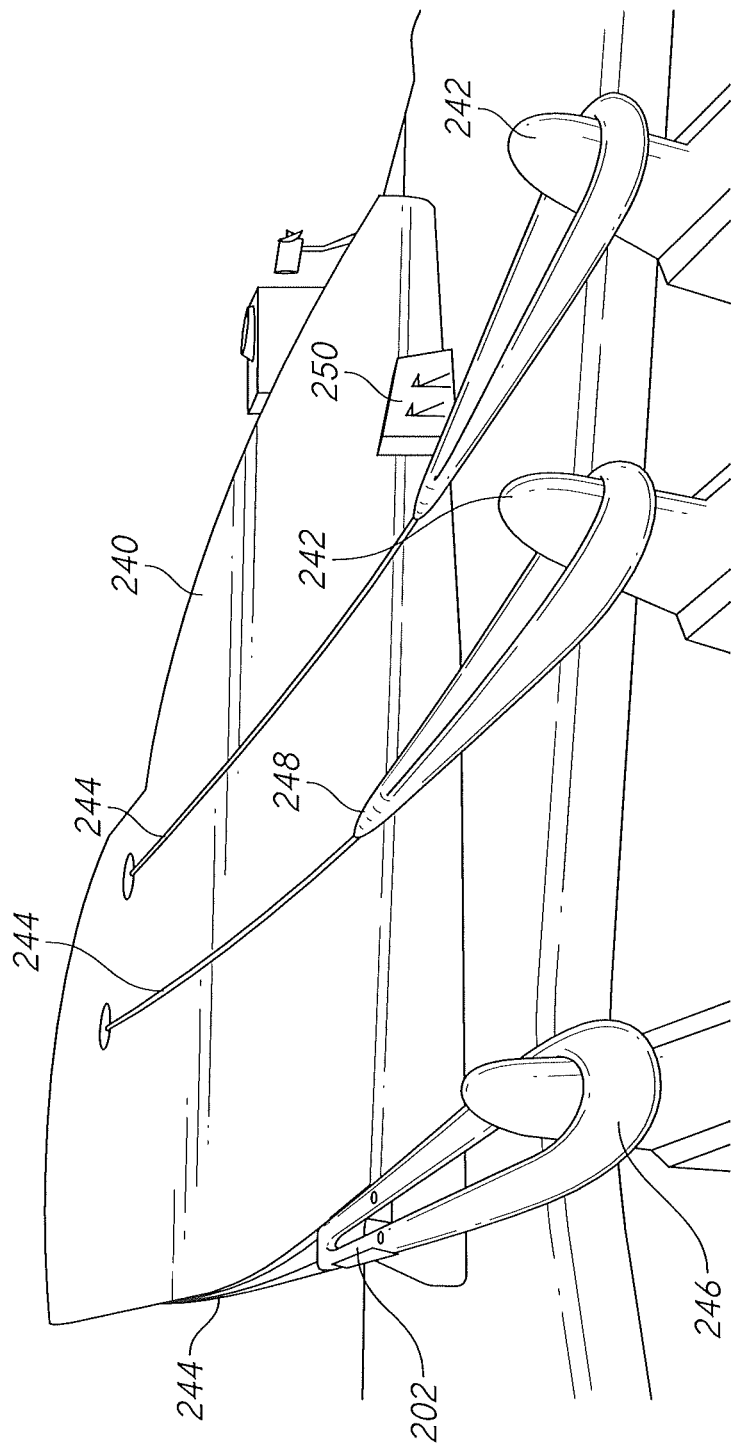
FIG. 31 is a perspective view, showing an intelligent cable module integrated into a ship mooring system.
Figure 32:
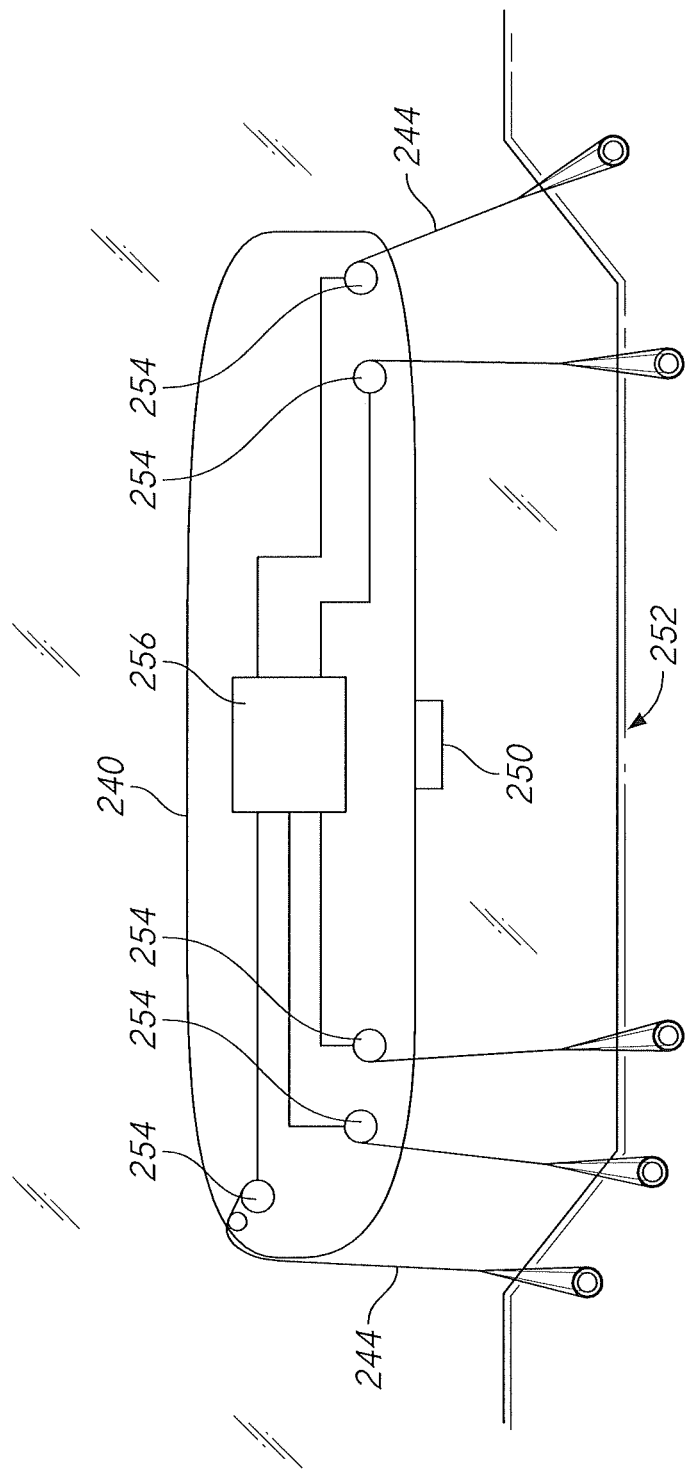
FIG. 32 is a plan view, showing the system of FIG. 31

FIGS. 31 and 32 depict still another application for intelligent cable modules. FIG. 31 shows a large vessel 240 moored alongside a quay. Multiple mooring lines 244 locate the vessel with respect to the quay by securing it against mooring stay 250. Each mooring line includes a sling 246 configured to encircle a bollard 242 on the quay. The shipboard end of each mooring line is attached to a winch that can be controlled to apply tension as necessary. The mooring lines travel with the vessel. They are an expensive piece of hardware that must be inspected, maintained, and periodically replaced. At present they are just visually inspected.

In the example of FIG. 31, intelligent cable module 202 has been added to the transition 248 between mooring line 244 and sling 246. This module can be configured to measure and transmit many different values, including (1) simple tension on the mooring line, (2) the "pinching" force imparted by the diverging legs of the sling, (3) motion of the module (via an on board 3-axis or greater measurement system, (4) the number of loading cycles, and (5) ambient conditions such as temperature and humidity.

FIG. 32 shows a plan view of the configuration of FIG. 31. The shipboard end of each mooring line 244 is connected to a separate winch 254 on board the vessel. The shore end of each mooring line is connected to a bollard on quay 252. Controller 256 adjusts the tension on each mooring line (via its associated winch) to hold the vessel properly positioned against mooring stay 250. Such automatic tensioning systems are known in the art. However, such prior art systems do not incorporate an intelligent cable module to monitor the condition of each mooring line.

Figure 35:
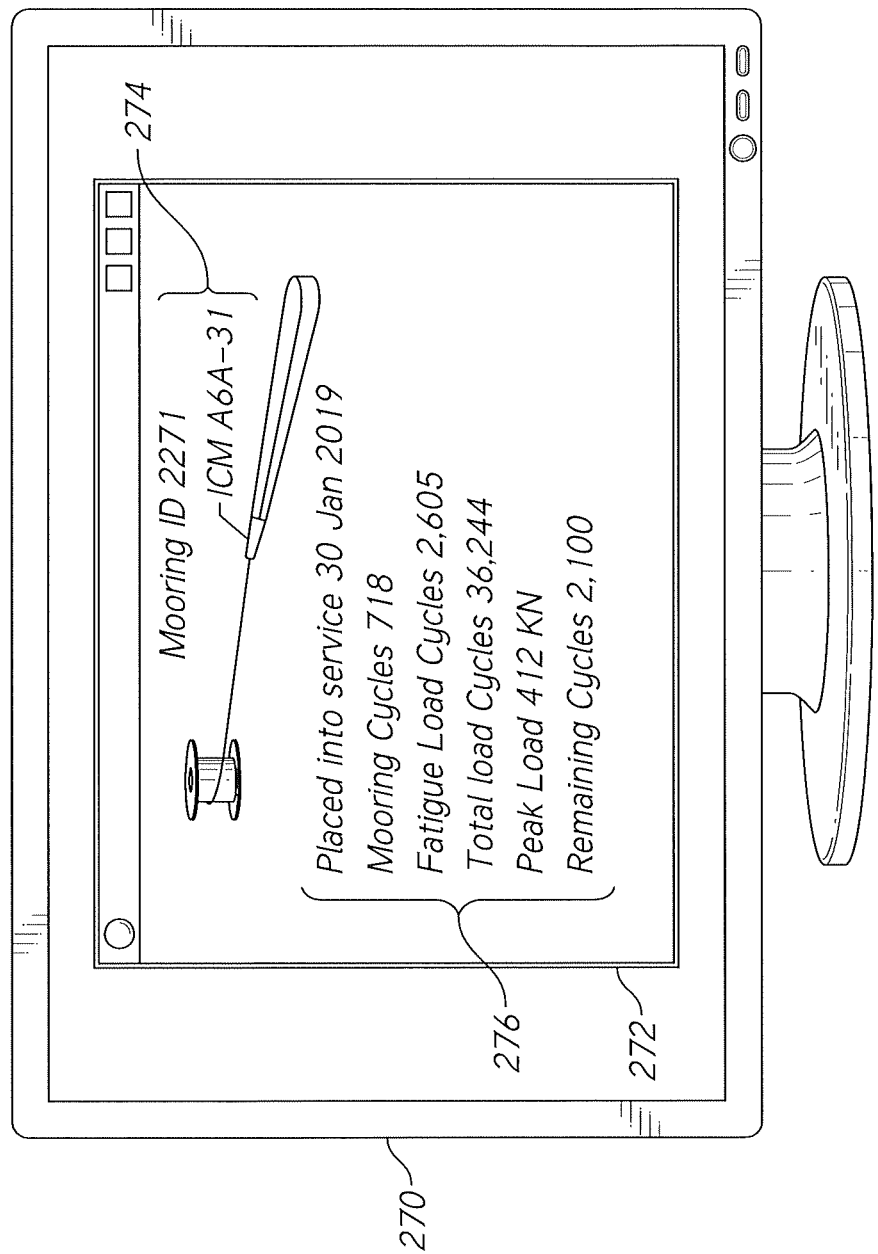
FIG. 35 is an elevation view, showing an exemplary graphical user interface.

The present inventive system preferably includes an intelligent cable module on each mooring line. These modules provide data (directly or via periodic downloads) to a remote processor which then assembles the data and presents it to a user. The user interface can assume many forms. FIG. 35 provides a simplified depiction of such an interface. Monitor 270 presents a conventional windows-type display 272. The display includes an identification of a particular mooring line selected by the user (line identification data 274). The display also provides a list of significant parameters concerning the selected lint (monitoring parameters 276). In this specific example the monitoring parameters are:

1. The number of mooring cycles in which the line has been used;
2. The number of fatigue load cycles (meaning the number of instances in which the load on the mooring lien has exceeded a defined fatigue load threshold for the type of line in question);
3. The total load cycles for the line;
4. The peak load that has been placed on the line; and
5. A derived value for the number of mooring cycles remaining for the line.

Many other parameters could be stored and displayed. The data selected will vary with the application. The user interface preferably includes the ability for the user to make selections. As an example, for each parameter displayed the user could select the parameter and see more information. The user could be allowed, for example, to pull up a plot of peak loading cycles over time.

Figure 33:
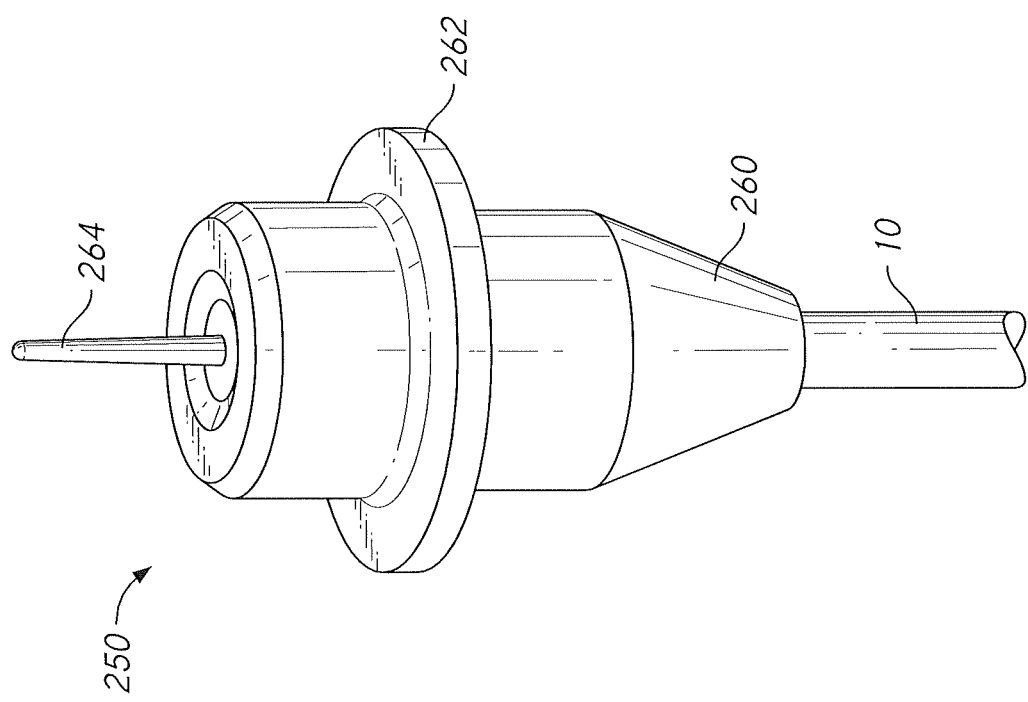
FIG. 33 is a perspective view, showing the incorporation of an intelligent cable module in a small single-strand termination.
Figure 34:
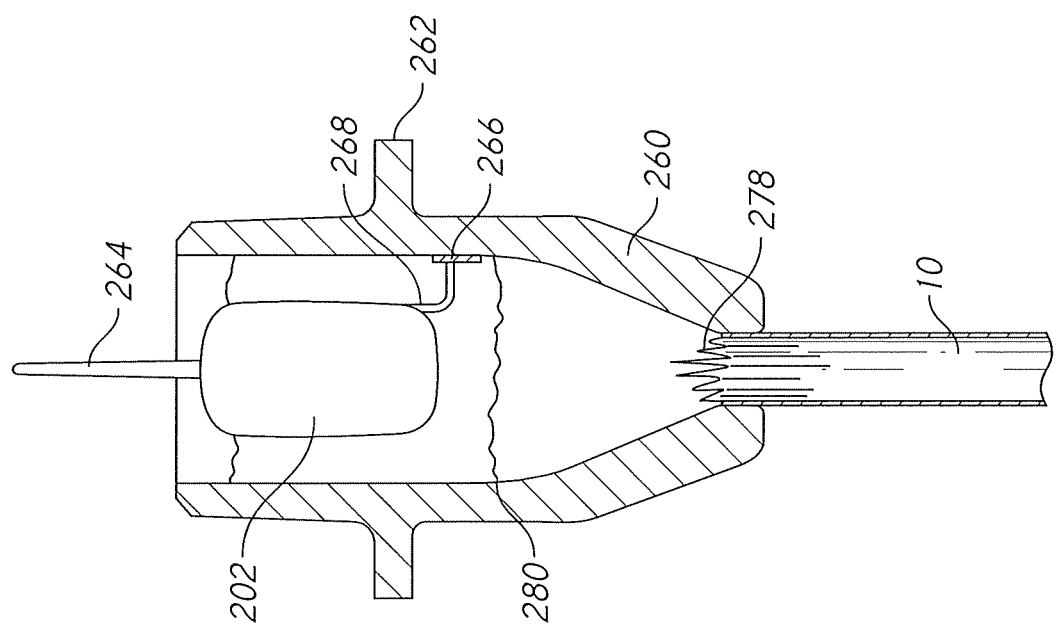
FIG. 34 is a sectional elevation view, showing internal details of the embodiment of FIG. 33.

The previous examples have pertained to large, multi-stranded cables. The invention is by no means limited to such large cables and may in fact be applied to small cables as well. FIGS. 33 and 34 provide an example of an application for a cable that is smaller than a mooring line.

In the example of FIG. 33, cable 10 consists of a single strand (though that strand may still be a complex braided or twisting construction and may still incorporate a jacket). Anchor 260 is affixed to an end of cable 10 to create termination 258. Loading flange 262 is provided on anchor 260. The anchor is designed to rest in a hole through a plate. Loading flange 262 transmits load from the anchor to the plate. An intelligent cable module is located within anchor 260. It transmits radio frequency signals using antenna 264.

FIG. 34 shows a sectional elevation view through the assembly of FIG. 33. Anchor 260 is affixed to cable 10 in this example by potting. A length of filaments near the end of the cable are placed within a hollow passage through the anchor's interior. The filaments are then splayed apart. Liquid potting compound is added to the splayed filaments (either before or after they are placed in the anchor's cavity). The term "potting compound" means any substance which transitions from a liquid to a solid over time. A two-part epoxy is an example of a potting compound. Once the potting compound solidifies, the length of filaments within the anchor cavity is mechanically linked to the anchor. Potting transition 278 represents the transition from a composite mass of filaments locked within solidified potting compound to the freely flexing filaments within the cable.

In this example additional operations are performed before the potting compound is added. First, one or more strain gauges 266 are adhered to the interior wall of the anchor (within the hollow central cavity). Strain gauge 266 is connected to intelligent cable module 202 by electrical connection 268. The filaments near the end of cable 10 are placed within the cavity in the anchor and splayed apart. The filaments only extend up to filament limit 280. Above that level the anchor's interior cavity is empty volume. Intelligent cable module 202 is suspended in this empty volume. Potting compound is then added until it (1) saturates all the filaments, and (2) covers some or all of intelligent cable module 202. The potting compound then solidifies to create a unified assembly (Note that the order of operations can be varied while still producing the same result).

Once the potting compound is cured the example of FIG. 34 can be placed into service. Strain gauge 266 monitors the amount of elastic wall deformation of the anchor, and this value can be correlated to the tension on cable 10. Provide the correlation is performed properly, the strain gauge reading will very accurately provide the tension on the cable. The tension values may then be stored within intelligent cable module 202 and/or sent out to a separate control system.

In some installations, many such assemblies may form part of a larger system. For such an example, intelligent cable module 202 can be programmed to send a radio signal only in the event of an "exceedance." An exceedance means an instance in which the cable tension has exceeded a defined warning limit.

Having described some embodiments in detail the disclosure will now turn to more general concepts regarding the invention and its applications. This invention may be said to apply to the "Internet of Things" ("Iot"). Applications include synthetic fiber tensile strength members, commonly referred to as fiber ropes, cables, tethers, cords, or tendons. It also covers hybrid strength members incorporating metal and/or composites, as well as round slings, wound slings, rope grommets, and synthetic fabric slings. (Collectively referred to as "rope/cable/tension member"). More specifically, this disclosure covers multiple concepts for synthetic fiber-based strength member systems used principally in high capacity and/or performance critical applications in conjunction with a termination and/or electronic module—whereby many more intelligent and connected synthetic rope-system technologies and overall data accumulation, communication, networking systems can be made possible.

While traditional strength members are passive in nature, the present invention seeks to collect important usage data—either directly or indirectly from the strength member and/or termination and/or connected module. Traditional strength members incorporating synthetic fiber can easily incorporate fiber optics, wires, hoses, and other means of communicating, powering, or transmitting. The traditional cable strength member can in fact include much more functionality than is presently included. This additional functionality enabled by incorporating either a rope-affixed module, or a rigid body termination (of any design—hereinafter mechanical termination) that can serve as a stable junction point for connecting, harnessing, and/or transmitting, power, data, fluid transfer, etc. This functionality has not traditionally been included as part of a high-load structural element. For example, electro-mechanical and opto-mechanical umbilical cables are common industry products. However, these umbilicals do not carry significant tensile loads. For example a fiber optic or electrical wire cable may commonly include a synthetic fiber to act as the load bearing element, but this is only to support the fiber optic or electrical wire and not to support a significant external load.

Whether at the end of the fiber rope as part of a "termination" or simply a rope-attached device, the concepts of the inventive intelligent cable module generally include a multifunctional rope module (or modules) that offers a wide range of data collection, storage, computation, machine interfacing, communication, and/or networking options.

These functions turn traditionally passive strength members into intelligent data gathering and dissemination devices.

Current offshore lifting operations can be very challenging—especially when the operator needs to place a very large, complex and heavy module that can have a value of many millions of dollars to a positional accuracy of centimeters in water depths up to 3,000 m or more. Typically the operators have to rely on secondary sensors that are not directly connected to the payload/lift line system (such as the use of separate remotely operated vehicles, ROV's). These secondary devices watch and sometimes physically guide the payload as it travels through the water column and is placed on the sea floor or connected to another structure already in location. Sometimes guide wires are also used. These are just some of the methods and tools used today.

The majority of lifting operations are monitored closely throughout the lifting operation to ensure the process is effectively executed. In the case of offshore lifting using a crane on a vessel, the monitoring is achieved primarily by instrumentation located on the vessel lifting device such as the crane or winch system. There are many different types of sensors used to control the descent and recovery speed and landing of the payload. This also includes the motion reference sensors that control the winch and crane to reduce the effect of vessel rolling and pitching motions on the payload. This technique is widely known as AHC (active heave compensation). It should be remembered that all of these sensors are located on the deployment vessel and all other external monitoring is carried out by secondary devices such as the ROV which require separate control systems and operators dedicated to this task. Occasionally the use of motion reference units are attached to the payload as a method of monitoring the payload during descent. However there are many challenges in direct communications with these devices through the water column.

The simplest form of intelligent cable module is one that is passive and standalone. An example of this is where an internal battery, data processor, and transmitter are used. Alternately of course these could be data storage devices. As is probably evident, these devices could rest anywhere inside or outside a cable termination (or at some intermediate point along the cable). In this example, a strain gauge, load cell, or series of devices are added to the cable module to accurately monitor the load and/or peak stress conditions.

The cost of failure during offshore lifting operations creates a need to develop the capability to record the operation at the interface point between the object under lift and the lift line interface (an intelligent cable module proximate the hook termination). The module effectively becomes the equivalent of a flight data recorder used in commercial aircraft. The presence of the module will enable the operator to record the complete operation at the payload. There are many reasons this would be advantageous including providing a better understanding of the performance of the AHC systems, recording load swings and all changes that related to the vessel systems and their impact on the payload. Examples of data using integrated sensors or recorders are peak loads, load trends, stresses within the termination (such as strand termination loads), payload pitch/yaw/roll, position, acceleration, pressure, temperature, vibration, distance from another object, material contact point, etc. Position and movement sensors could include multi-axis gyroscopes (whether of the physical or ring-laser type), accelerometers, etc. If going into something such as a downhole tool or pipe as another example it may include sensors that measure diameter, speed, distance, gases, material composition, time, etc. It could include video of the operation as yet another example, or use a 3D camera or ultra-sonic camera that can make certain measurements. Any number of sensors could be utilized.

The intelligent cable module can also incorporate communication tools for more automated operations. Examples for lifting could be a location/position pinger, light transmitter, or other communication device for working with other devices or machines, such as an ROV or AUV. In such a case, the ROV need not use a traditional vision or camera system to do certain functions—it may be more easily automated as a machine-to-machine method of communication. Such a tool could have significantly more precision and enable a more autonomous operation on the sea floor when coupled with other technologies.

With such a device, there is also the opportunity to extend the capability of the intelligent cable module to provide the services and capabilities of the ROV or other external devices. For example the module may include a significant power source that can be used as a charging station or outlet for ROVs or AUVs. This could have a significant impact of the amount of secondary equipment deployed during any offshore lifting operation.

In its most general state, what has been described in the preceding embodiments is an intelligent cable module for tensile fiber strength member systems, which incorporate sensors, communication devices, and/or power in standalone form. These devices may be powered within the module (such as with batteries for example), or alternately the power may come from a separate source. This could be for example a wire running up the fiber rope, or a wire ported out the anchor and run separately to a power source. While the latter configuration is clearly not preferable for offshore lifting, in other applications such as a structural pendant, this would often be the most preferred means of powering the termination module. Likewise, sensors or communication devices are preferably mounted within a rigid housing. However, in some cases there may be some external affixation involved. For example a termination may include internal batteries but an external 3D camera or laser sensor mounted in a non-hazardous area.

The next level of sophistication is an "active" intelligent cable module. Such a module can provide active data/power/communication, on a real-time basis, and/or be able to respond autonomously to certain conditions. For example an acoustic pinger may signal pressure achievement, depth, position, etc, for other machines/tools to operate a certain function. As an example where the termination module reacts to other devices, the termination hook or load pin may be released when receiving a signal from another device/machine, or alternately a communicated signal from the operator above water.

As an example of the user interface for real-time data, a graphical user interface can present current loading and recent peak loading for every strand of a 12 strand rope. In this example each of the rope's primary strands has a load cell, and connecting hardwiring to this termination provides a real-time health monitoring tool.

Any of the examples above may be further developed with the addition of active components whereby communication between machines (such as an AUV or other data collection devices) or the operator (such as the vessel crane operator or an ROV pilot), is made possible. This real time information coming from the termination module can be used to automate industrial processes, improve safety, operating speed, and provide system integrity/health data.

In many cases in order to make real-time data, power, communication, or other capability a realistic possibility, it would be most advantageous to run these types of services inline with the high load tension member—as the lines are often quite long. Externally affixing or helically wrapping these components around the high load strength member is a possibility in certain static cases, such as structural pendants. However, a far preferred method where possible is to incorporate these service lines into the strength member itself. For the purpose of this disclosure, a "service line" is any line other than the strength member that is added to expand the service context of the strength member and termination—such as a fiber optic line used for communicating data from one intelligent cable module to the next in a string of interconnected mooring lines. Any number of service lines can be used to improve the capability of the termination and system as a whole.

How these service lines get included into the strength member is entirely dependent on the strength member construction and the application. For example a crane line that runs at very high loads around sheaves would require a different construction than a semi-static pendant line or offshore mooring rope that is nearly always linear. With this in mind, below are a few distinct possibilities for incorporating service lines into the strength member:

1. Fiber optics, fluid or pressure hoses, electrical wires, etc.—for data transfer, communication, gas or fluid exchange, etc.
2. Service lines externally affixed to the strength member
3. Service lines helically wrapped around the strength member
4. Service lines located in the center of the strength member
5. Service lines located in the center of one or some of the primary strands of the strength member (In a 12 strand braided rope this may be one line per 12 strands)
6. Service lines alongside the strands or in place of certain strands in the strength member.

In most cases additional armoring or components will be needed to either protect the service line within the strength member, or protect the strength member from wearing on the service lines. Referring back to the offshore lifting example, very high stresses will be placed both on the service lines and the interface between these lines and the fibers. This may commonly require careful engineering to ensure the service line does not get damaged in use or compromise the performance of the strength member.

One can easily envision the technology being used for more than monitoring health at the termination point to more holistically monitoring the tension member system as a whole. As one practical example, the wires, optics, or other communication devices previously discussed may not be used necessarily for communicating to/from the termination, but rather monitoring the health or integrity of the strength member. In some cases, the intelligent cable module may also be beneficial as a receiver, collecting data from other nearby devices and communicating this data through the included service line. In such as case the high load tension member becomes the hub for a greater network of devices, not just the strength member itself. This could be a string of rope products, or entirely other machines such as AUVs, a subsea station that needs to report real-time data, etc.

In the field of offshore lifting, this type of device may also be considered an active and instrumented hook. This type of arrangement would allow for continuous communication with the hook during deployment and recovery to collect and send data from the hook to the operators on the vessel in real time. With the data from the hook in real time it would be possible to improve the AHC (active heave compensation) performance and reduce the actual load swings on the payload. This also gives the opportunity to monitor load positioning and many other instruments.

Yet another very powerful configuration based on the components above is the ability for the fiber rope termination to become a production/service tool—a machine at the rope that includes many potential service functions. Referring back to the offshore lift example, now with a real-time data feed to the surface, and the ability to sense location/position/heading/etc, the incorporation of payload position thrusters (on or near the termination or payload) becomes a practical and unique option. Due to the ultra-low weight of synthetics in water, the payload can more easily be manipulated in the water column. Further, the lack of line weight allows for more tooling to be added to the end of the rope, such as battery packs for ROV or AUV charging, an ROV garage, integrated tools with actuators, etc. For example, if thrusters are added to the termination to position payload, they may be powered internally by a battery source, since the fiber rope has displaced so much mass in the steel-to-fiber conversion. Alternately, based on examples provided previously, power or other key service lines could be run down the strength member. Such a configuration can in some cases displace the current ROV configuration.

This active payload positioning becomes the next logical step for the concepts above. The intelligent cable module in this version is used to both gather important information and guide the payload. If thrusters are added to the termination module, they could be manually driven like the ROV's used in the process today, or fully automated like an AUV, where machine-to-machine communication can provide higher levels of production and safety. In the later example, communication between subsea machines may help to guide the payload into position, manipulate the payload, and/or make more automated connections possible.

The intelligent termination or module could include many forms of sensor technologies—creating near countless forms of data. Below are examples:

1. Movement/position/heading/G-shock/inertial sensors
2. Accelerometers
3. Magnetometers
4. Gyroscopes
5. GPS devices
6. TIMU devices
7. MEMS devices
8. Acoustic/Ultra-Sonic Sensors
9. Pressure Sensors (atmospheric, liquid, solid)
10. Strain Sensors
11. Load Sensors
12. Torque/Torsion Sensors
13. Humidity Sensors
14. Temperature Sensors
15. Proximity Sensors
16. Vision or Image Sensors (2D/3D)
17. Relative Movement Sensors (3D camera, laser, etc)
18. Light Sensors (UV or other)
19. Distance/Displacement Measurement Sensors (laser, linear encoder, camera, radar, etc)
20. Rotary Sensors
21. Code Reader/OCR Sensors
22. Photoelectric Sensors
23. Photomicro Sensors
24. Fiber Optic Sensors
25. Gas Sensors
26. Flow/Micro-Flow Sensors
27. Liquid Leakage Sensors
28. Contact Sensors 29. Dielectric Sensors
30. Electrical Conduction/Resistance Sensors
31. Data Transmission/Communication Examples
32. Torque sensors for the cable as a whole or subcomponents thereof.

The data communication to and from an intelligent cable module can assume many forms, including:

1. Wireless communications such as Wi-Fi, Bluetooth, Passive or Active RFID, Zigbee, BAW, LTE, LTE-Advanced, or other radio or micro waves. Cellular, satellite, acoustic energy, sonic, electromagnetic induction, free-space optical, radar, or other.
2. Wired communications such as conductive elements, fiber optic elements, and the like.
3. The use of electronic or other data storage devices to store data for later retrieval.

Data may be pushed/transmitted only, pulled/received only, or both. Transmit vs receive capability may vary depending on module capability and application needs. Rope modules can include one or multiple methods of data transmission/communication. In the case of a wireless design, the addition of a hardwired-access component will typically be preferred for items such as system redundancy, backup, big data transfer, programming, or debugging as examples.

The intelligent cable modules can be powered by a wide variety of sources, including:

1. Stored/Battery Power: Batteries may be designed for inductive charging, regular replacement, or life-use. System may be designed for ultra-low power consumption so that multi-year life is possible.
2. Self energizing systems such as a power cell
3. RFID or similar which is energized by another device
4. Trickle charge systems such as with solar, wind, or other small auxiliary device
5. Auxiliary battery that is used to charge primary battery and be removed While it is possible that the rope module (s) are always connected directly to a power source (such as at the end or with conductors running down or around the rope), it is most common that there will also be a local battery or storage. For example, wired power may be used to power tools or maintain charge. Battery or stored power will likely be common to maintain data integrity and operate light ongoing functions.

The CPU or similar data-processing device(s), serves as the programmable device that can be used to define the module intelligence and logic. This includes managing information such as:

1. Global Positioning System (GPS) satellite receiver
2. Data input digitization
3. Data computation
4. Data compression
5. Data encryption
6. Data storage
7. Module time/date stamp
8. Signal conditioning and processing (from various inputs such as sensors)
9. Sending and receiving of defined information packages (ex: email alert, network communications whether packaged or real time, etc)
10. Measure defined limits (tension, pressure, shock, etc)—deploy reaction signals to adjacent tools or receivers for network communication.
11. Determine light, sound and other operator or networking signals based on certain conditions (low battery, overused rope, etc)
12. Manage hibernate/sleep modes for low power consumption
13. Review the strand-integrity data (via fiber optics, conductive elements, etc)

The modules can incorporate different operator/system alerts, including:

1. Visual alerts such as a status light (see external display 222 in FIG. 27)

The electronic design could take on countless shapes/forms, depending on desired function.

2. Colored stack/condition lights, pulsing light patterns to communicate different conditions, etc.
3. LCD or other electronic data panel on or near or insertable into the module
4. Acoustic alerts
5. Acoustic chirps or pings The intelligent modules can achieve machine-to-machine interfacing in many different ways, including:

1. Machine-to-machine Interfacing
2. Laser, UV light, wireless or wired transmission, ultrasound, wireless, or other method to communicate to another machine or onto the data network for alarming the operator or larger piece of equipment as a whole
3. Communication to a smart tablet or the local network so that computers are able to transmit conditions (electronic stack lights for example, or signal to operate a separate machine function) to any location
4. Real-time communication, or conditional data-transmission around certain events (shock load, time interval, etc).

For the purpose of this overall disclosure, intelligence can come from many potential forms including some form of bodies that house sensors and allow data to be managed. Generally speaking, this may be within the end (termination point), or anywhere along the rope, or both. While a termination is often at the end and used to transmit a load with a load connection point (such as an eye, hook, or stop), a module/IoT module is any device that is connected to the rope assembly, regardless of proximity. While it may be in or around the termination, it many cases it is preferable to be along the rope to provide intelligence. An IoT module would not typically be used to transmit a load, although this can be made possible. One should assume that throughout this disclosure a termination or module, while having different end-purposes, should be considered synonymous in its ability to provide the disclosed smart services/intelligence. Some ropes need only a smart module, some need a smart termination, some need both. In many cases the smart module rest inside or is adjacent to the termination. While the early disclosure was more focused on the termination point, this section will detail other means by which a more universal module or modules can be considered as primary and/or secondary devices. They may be used in place of an intelligent termination or used to support such a device.

Variations for the intelligent cable module include:

1. An intelligent cable module can be applied (mounted/inserted/affixed) anywhere on or within the rope or strands. This may be at the ends, in the midspan (anywhere along the rope), near one end, or in segments. For any of the examples disclosed, the module can be applied to measure loads for the entire tensile fiber strength member, an individual strand thereof, or some other subset of the whole.
2. There may be one or several modules serving different functions or communicating with each other. A module need not have a CPU or be independent—it may serve to function as a web to support other more intelligent devices or one central device.

3. A module in a termination may serve as an end-hub for several midspan modules that gather other data. The mid span modules may simply provide load, position, temperature—they may be sensors alone and be used to interface with a CPU (such as in the termination), or otherwise a hub for data transfer means to another source (such as when hardwired).

An intelligent cable module can be connected to a cable in many different ways, including:
1. Mounted inside the rope
2. Mounted to the outside of the rope (in symmetrical or asymmetrical form)
3. Mounted to certain strands of the rope (such as inside each of the primary sub-ropes)
4. Tethered to a rope as an attached node
5. Mounted on one or both ends of the rope
6. Mounted in one or both legs of a typical rope splice
7. Mounted in the thimble of a spliced termination
8. Mounted inside or affixed to another form of termination
9. Mounted permanently to a rope (tamper resistant), or designed to universally attach or clip on/off Multiple modules may also be present in a single location. FIG. 21 provides an example of a single module casing 208 placed in the center of a cable. In this instance the cable shown is a braid of 12 separate strands. In some cases each of these strands will itself be a braid of 12 smaller sub-strands. A smaller module casing could be placed within each of the 12 strands by separating some of the sub-strands. Some of these modules can even incorporate a removable data cartridge.

The intelligent cable module may rest on a sacrificial tail alone (such as where one end has a termination and the opposing end is later spliced into another rope). This configuration could be used to make a passive rope intelligent. It also allows the intelligence to be calibrated to the rope in a factory-controlled setting.

Monitoring examples include:
1. Termination drops or max shock. Rate of shock, duty cycles, cut strands, rope modulus, rope dielectric properties, rope length change, etc. Boom jacks (machine shocking), resonation, natural frequency, rope or strand torque, rope or strand imbalance, rope diameter, helix change, rope near-sheave or related device via proximity sensors. Period of connection to another device via dielectrics, etc. Chemical contamination, line security, temperature etc. Chemical exposure, strand integrity, rope life management.
2. Cycle Counting: Using inertial module or a RFID or other position sensor to count machine cycles in a rope. For example a hoist device that goes up/down.
3. Module to log hours via movement/load/etc.—record life/use. Data store/collect—then send package as needed.
4. Appropriate connection and load rating: Used to detect and indicate whether the appropriate rope and hardware are being used for a certain job, such as a lifting sling and shackle combination.
5. Chip or communicated data can signal operator or machine of any desired condition (load, depth, recommended operating hours, temperature overage, etc)
6. LCD panel or nearby tablet could identify peak conditions for inspection/review of system health (rope life, max operational load received, loading cycle count, etc)

Exemplary applications for the inventive intelligent cable modules include:
1. Crane/Winch lines (Offshore or land cranes, deep shaft mines, etc)
2. Large Vessel Ship-to-Shore & Ship-to-Ship Moorings (L&G tankers, Barges, etc)
3. Structural Boom Pendants (cranes, draglines, shovels, etc)
4. Civil structures tendons (bridge stays, post tension concrete structures, cable-rebar systems, etc)
5. Towing lines (commercial fishery lines, nets, etc)
6. Bridals (trawl doors, lifting assemblies, etc)
7. Floating structure moorings (oil platforms, vessels, windfarms, wave energy, commercial docks, boats, etc)
8. Tie-downs (cargo, aircraft, earth anchors, utility securement, etc.)
9. Lifting or Towing Slings (heavy lift round slings, rope grommets or light factory fabric slings)
10. The technology could also be deployed in miniature and/or simplified form into small cable assemblies, such as used in fitness equipment, aircraft control cables, automotive control cables, safety tethers, boat lifts, medical devises, etc.
11. As covered throughout this disclosure, the intelligent module(s) and/or terminations will commonly be linked to a greater network of devices. In principal, the devices when linked in some way can be viewed as rope networking modules—turning a physical rope system into a digital tool by which entirely new service functions may be derived. For example, a vessel mooring system that has been digitized not only allows an operator to understand each individual unit, but also how the system as a whole is functioning as well as stress that is imparted to the winches and other vessel components. The series of ropes become an input for data that is valuable for the entire machine/operation.
12. On a mining dragline multiple modules may communicate with one central collection device. They may be hardwired or wirelessly linked.
13. All rope-related devices on a machine or operation with intelligent cable modules could be linked to create a complete/closed loop data set to then perform more sophisticated analysis. For example, load long-range distribution and interaction amongst 4 boom supporting pendant cables can be assessed, or overall load across certain connected vessel mooring lines can be managed. One can use this macro-data to better manage the asset or field as a whole—not just each individual tension member.
15. Just like that of an electrical system shown in the picture below, the rope network can be configured in many ways, such as spoke and hub, pier to pier, multi-hub with boosters, interconnected, work through a gateway IoT module, a hybrid, etc. This may be considered as a distributed sensing network, and include items such as a smart hub, a digitized operator tablet to perform certain functions. This may be a slave or master network design—depending on the data collected, pushed, or pulled, and the overall system goal.
16. Scanners may be used to ping for data. Technologies such as RFID allow a passive system to ping the regional network to gather certain data. For example this may be a ping to communicate peak loads on an hourly basis, whereas other data is stored and removed in other ways.
17. The network rope IoT devices may all be interconnected and/or independently designed to push data into the cloud or a local server for networking with other sites or locations worldwide. In other works, the network may then be used to even more broadly evaluate systems performance or activity of geographies, countries, companies, equipment types, operation types, etc. An organization may gain visibility on the company-wide performance of critical equipment or operations. Of relevance is that tension members (such as fiber ropes) generally communicate meaningful data for heavy industries as they represent activities performed (for example payload values, hours operated, etc). Being able to digitize and communicate data from tension members in big/heavy equipment and operations is valuable in many ways. Countless user interfaces and analyses of key performance metrics are possible.

18. While much of the above would suggest broad distribution, in many cases the network may simply be a single operator interface, such as a ruggedized tablet that can be brought onto a particular site to monitor data in real time or extract historical/stored data on an as-needed bases. Additionally, these devices may be used to program or reprogram the networked modules.

For the embodiments in which information is transmitted from the intelligent cable module up the cable, the reader should bear in mind that the extraction point for this information may be in different locations. The "payload end" of the cable is the end to which the termination is attached. A cable is often paid off a drum on a surface vessel. Information applied to the cable at the payload end must be extracted at some point distal to the payload end. This extraction point may simply be the opposite end of the cable. However, it may also be some intermediate point where the information carrying components of the cable depart the load carrying components.

One may make some generalizing statements regarding the invention that will be true for many embodiments:

1. It is advisable to place the instrument package(s) above the payload release point. An objective of the present invention is to use the instrument package many times in the deployment of multiple payloads, so it is undesirable to place the instrument package in a position where it is difficult to "bring home" with the termination when the payload is released. The payload release point may be in the vicinity of the intelligent cable termination (as shown in FIG. 17). However, it may also be far below the termination. In some instances the release mechanism may lie 20 meters below the termination. This will be true where long slings connect the termination to the payload and the release mechanism is located on the payload end of the long slings.

2. For the versions incorporating force sensing devices (load cells, strain gauges, etc.), the instrument package may transmit the sensed forces directly or record them for subsequent transmission.

3. The preferred embodiments will all include a processor and the ability to transmit digital signals. However, it is possible to implement the invention using only analog components and no processor. As an example, a very simple version might include only load cells, a local battery, and possibly an amplifier set in the integrated termination. These analog devices could then send analog signals directly up the cable and all the processing would be done outside of the integrated termination.

4. The instrument package ideally includes an inertial measurement system. Such a system, combined with real-time (or near real-time) data transmission back to the surface, allows a surface operator to know the precise location and orientation of the integrated termination (and by inference the payload itself).

5. The use of synthetic filaments in the cable provides a large weight saving in comparison to prior art steel cables. This weight savings allows additional weight to be carried at the termination (or in the vicinity thereof). Batteries may be added to the intelligent termination to provide an ample power source without having to send power down the cable. Data may still be send through the cable in this scenario, but the greater challenge of sending power through the cable would be avoided.

6. The camera such as shown in FIG. 14 may be a stereo camera, a laser scanner, or some other suitable device capable of allowing the intelligent termination to "home" on a target. As an example, a visual fiducial might be provided as the desired placement point on an undersea platform. A stereo camera could be used to guide the payload onto this target. A 3D object could be used as a target for a laser scanner. The camera could also be provided on the intelligent termination itself (perhaps offset on a lateral boom).

7. If a visual guidance system is provided then the inertial measurement system does not have to be terribly accurate. The inertial system may be used to get the payload "in the ballpark" and the visual guidance system could then take over for the final placement. The combination of the two systems allows for greater accuracy while holding down costs.

Many other features can be included with the inventive termination, including one or more of the following:

1. The memory may be used to log strand loads for future analysis regarding needed cable maintenance and possible removal from service.

2. Communication and power wires may not travel through the core of the cable but rather may travel externally. As an example, they might be embedded in the cable's jacket or wrapped helically around the cable.

3. The collector and housing could be made as one integral unit.

4. The instrument package functionality can be applied to a cable having only a single strand (rather than a multi-stranded cable incorporating a collector).

5. The instrument package may be included as part of a ruggedized ROV garage.

Figure 36:
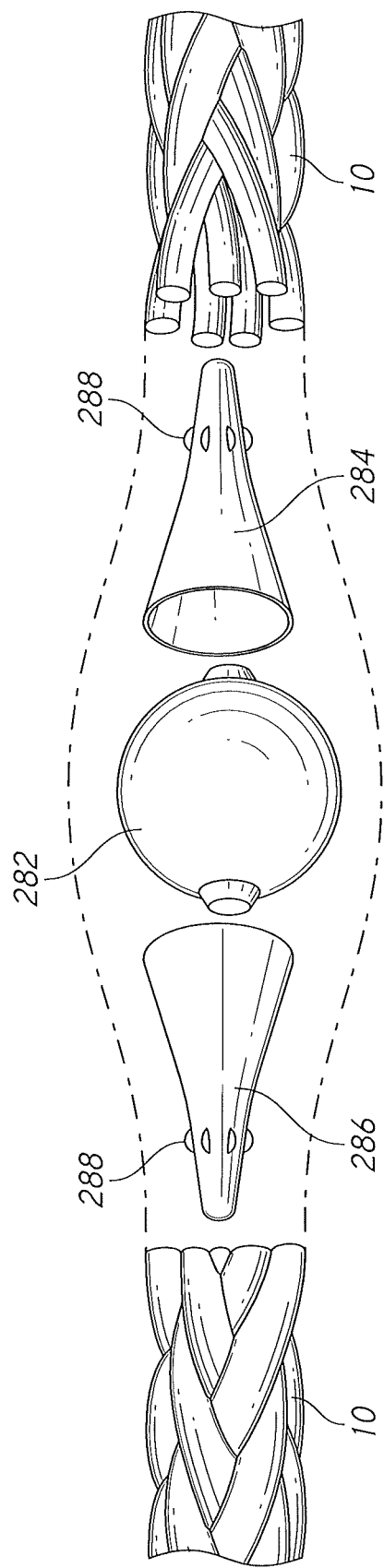
FIG. 36 is an exploded perspective view, showing the inclusion of a pressure-based sensor in an intelligent cable module.

FIGS. 36-39 illustrate additional embodiments for the intelligent integrated cable module. In FIG. 36 the components are shown in an exploded state. In an assembled state transition cap 284 would lie against the right side of pressure vessel 282 and transition cap 286 would lie against the left side of the pressure vessel. These embodiments are configured for installation in the center of a cable—away from the terminations on the cable's ends. The module is installed at a selected location by "upsetting" the tight lay of the stands as shown in FIG. 26. The components are then inserted through one of the strand interstices into the cable's interior. Unlike the example of FIG. 26, a connection to a communication strand 204 is optional. In many instances, the embodiment of FIG. 36 will be installed where no communication strand is present. The broken lines represent the "swollen" profile of cable 10 as it passes around components 282, 284, 286 installed in its interior.

Pressure vessel 282 is a hollow vessel. It can be made of metal—such as stainless steel or aluminum. It can also be made of composite materials—such as a wound fiber embedded in a resin. Transition caps 284,286 are provided to smooth the transition from the normal (undisturbed) cross-section of cable 10, over the section covering pressure vessel 282, and back to the normal cross section. Each transition cap preferably includes a concave portion configured to fit over a portion of the spherical shape of pressure vessel 282. Each transition cap also includes a tapered exterior as shown. A radial array of protrusions 288 can be provided on the exterior surface of each transition cap. These protrusions are positioned to lie within the interstices of the cable strands. They thereby inhibit the rotation of the transition caps.

Figure 37:
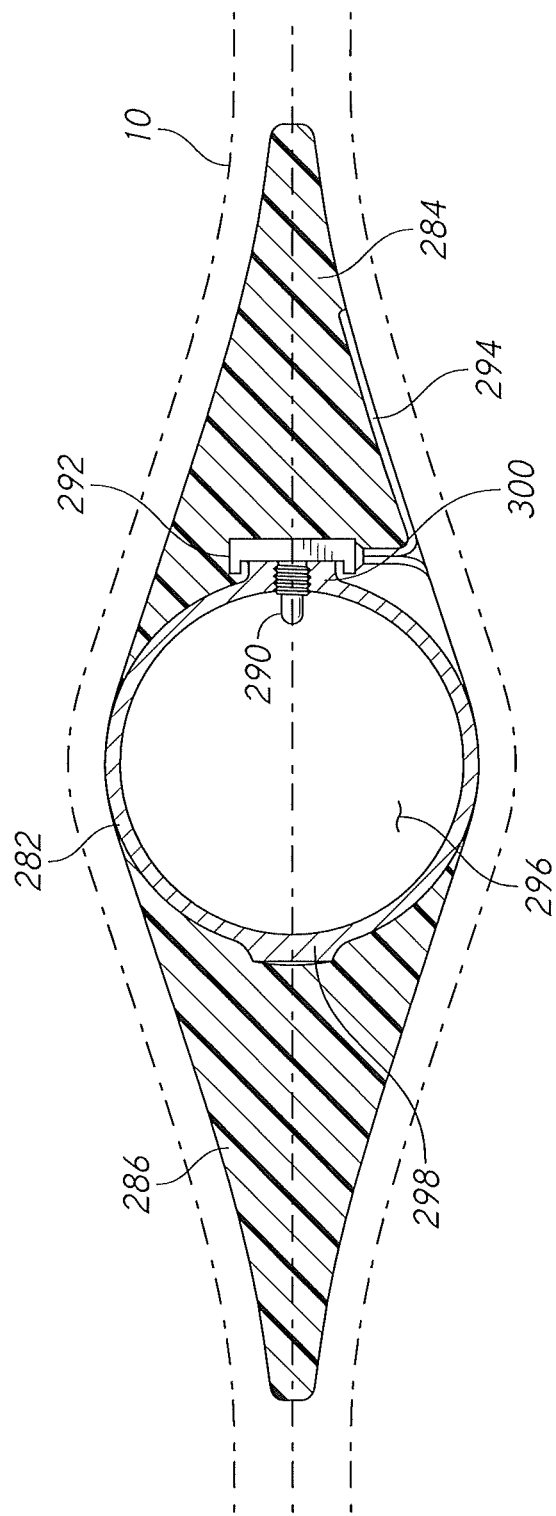
FIG. 37 is a sectional view, showing the assembly of FIG. 36 installed in a cable.

FIG. 37 shows a sectional view with the components of FIG. 36 installed in the center of the cable. The reader will note how the concave end sections of transition caps 284, 286 fit around the spherical exterior of pressure vessel 282. In this example the pressure vessel is hollow and contains a Newtonian fluid 296. The Newtonian liquid selected is preferably non-corrosive. Silicone oil is one example. Pressure vessel 282 has two bosses 298, 300 that are intended to be positioned along the cable's central axis as shown. Boss 300 includes a threaded hole. Pressure transducer 290 is threaded into this hole and secured in place. In this example, instrument package 292 is made integral with pressure transducer 290. Antenna 294 may be made as part of the housing for instrument package 292 or may extend externally as shown. Instrument package 292 preferably includes a radio transceiver that is able to send and receive data via antenna 294.

The cable's strands pass smoothly around pressure vessel 282. When tension is applied to the cable, the strands encompassing the pressure vessel apply an external squeezing force. This squeezing force produces an internal pressure rise that is monitored by pressure transducer 290. Pressure vessel 282 is given a shape so that the squeezing force exerted by tension on the cable will produce a pressure rise in the fluid contained within the pressure vessel. The example shown is a sphere. As those skilled in the art will know, a sphere represents the minimum surface area for a given volume of fluid contained therein. Tension on the cable tends to squeeze the sphere so that the cross section of the pressure vessel 282 in FIG. 37 becomes more elliptical. The departure from the spherical shape produces a decrease in the internal volume and a resulting rise in internal pressure.

In the example of FIG. 37, a Newtonian liquid is used to completely fill pressure vessel 282. Those skilled in the art will know that the density of a Newtonian liquid increases only slightly with increasing pressure. Thus, even a slight compression in the shape of pressure vessel 282 will produce a significant change in the internal pressure read by pressure transducer 292.

Most cables of interest have a multi-stranded, complex construction. The relationship between the pressure measured by transducer 290 and the tension applied to the cable is quite complex for these cable construction. Thus, it is difficult to develop a mathematical expression that relates measured pressure to applied tension. This is not to say that it is impossible to develop such a relationship. However, variations from cable to cable make the uncertainty in using such a defined relationship so large that it is not practical. A more practical solution is to calibrate cable tension versus measured pressure for a particular cable design, and possibly even for a particular cable.

The calibration process for many cable geometries will not be simple. A multi-stranded synthetic cable does not behave as predictably as a wire rope. After terminations are added, the synthetic cable should be "bedded" by subjecting it to a significant tension schedule. This bedding process seats the fibers in a more final and compact form. During this process the cable geometry changes slightly—such as longer strand helices and smaller diameter and higher packing density. In some instances, it is necessary to adjust the individual length of each terminated strand. Otherwise, the load distribution among the strands may become uneven. In some cases it is necessary to undergo a first bedding process, then re-adjust the strand lengths, then undergo a second bedding process. It is advisable to bed the cable properly before proceeding to the calibration process. Otherwise, the calibration may not be accurate.

Figure 38:
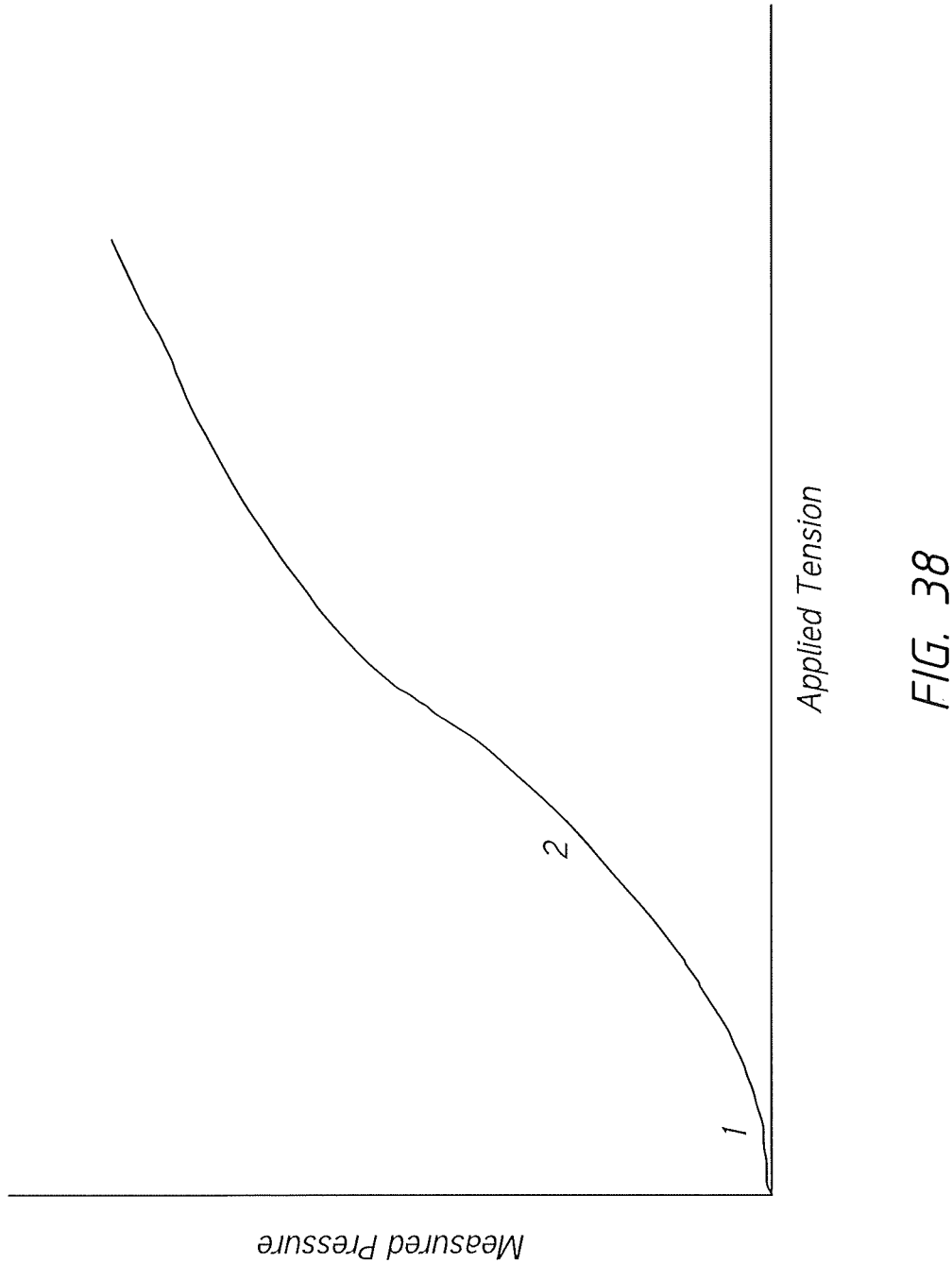
FIG. 38 is a plot of measured pressure versus applied tension in a process used to calibrate the exemplary intelligent cable module of FIG. 35.

FIG. 38 shows an exemplary calibration curve for measured pressure versus applied tension. The cable—with an intelligent cable module such as depicted in FIG. 37—is properly bedded and then placed in the calibration fixture. The calibration fixture applies a specified tension schedule while the pressure readings are recorded. Several loading cycles are typically used in order to ensure consistency.

In the region denoted as "1" the slope of the curve varies significantly and repeatability from one loading cycle to the next is marginal. In the region denoted as "2"- and in regions above—the curve tends to be consistent and repeatable. This is the useful part of the calibration curve. The calibration curve tends to produce a more accurate correlation between measured pressure and applied tension for the higher loading regime. As this is the regime of most interest in determining cable life and performance, the inaccuracy that sometimes exists for the lower loading regime is not a significant drawback.

Once the calibration process is completed the intelligent cable module can store the measured pressure versus applied load curve in a suitable form (such as a look-up table with interpolation or a higher-order polynomial). In use in the field, the intelligent cable module can transmit either measured pressure or calibrated load data. The module can also store the data for future retrieval. The data can provide useful information. A few examples follow:

1. The maximum load that has been placed on the cable (as well as the date/time and/or period by which it was at a maximum load);

2. The number of loading cycles that have exceeded a defined threshold (such as a load value or accumulated time value); and 3. The number of exceedances and the maximum load sustained during each exceedance.

Figure 39:
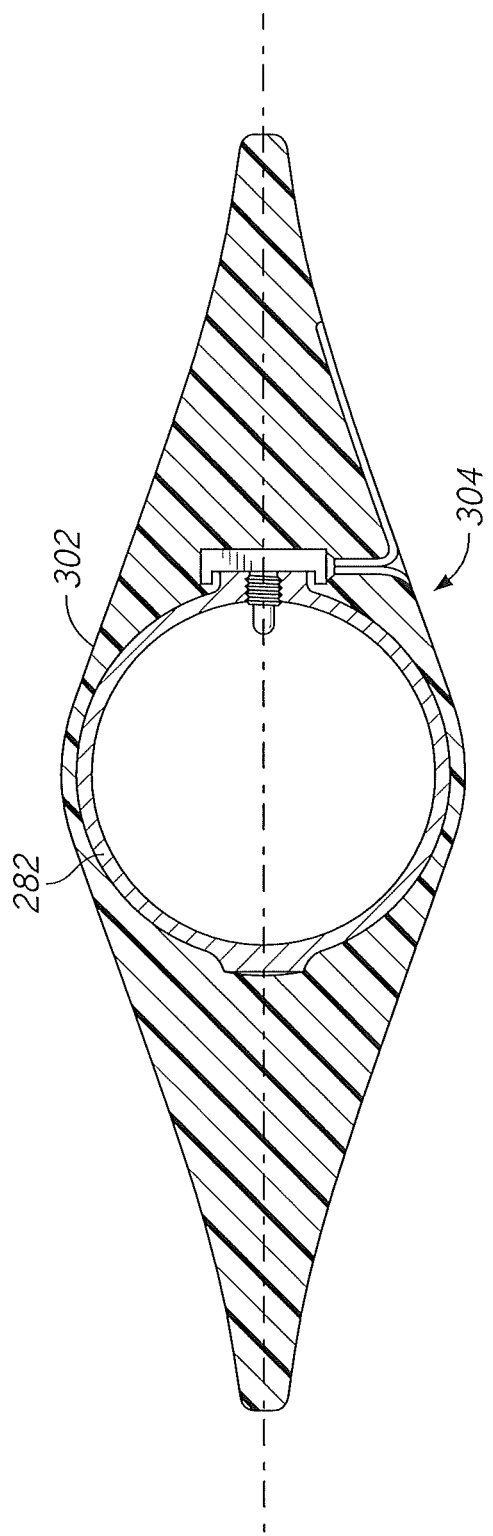
FIG. 39 is a sectional view, showing an alternate embodiment of the intelligent cable module of FIG. 35.

FIG. 39 shows an alternate embodiment in which the two transition caps are replaced by a single overmolded transition cap 302. Pressure vessel 282, along with the pressure sensor, instrument package, and antenna are placed within a molding cavity and a tough material is molded over them to create integrated cable module 304. The overmolding material is selected to provide suitable durability. One example is moderately flexible polyurethane, which can be molded at relatively low temperature.

Figure 40:
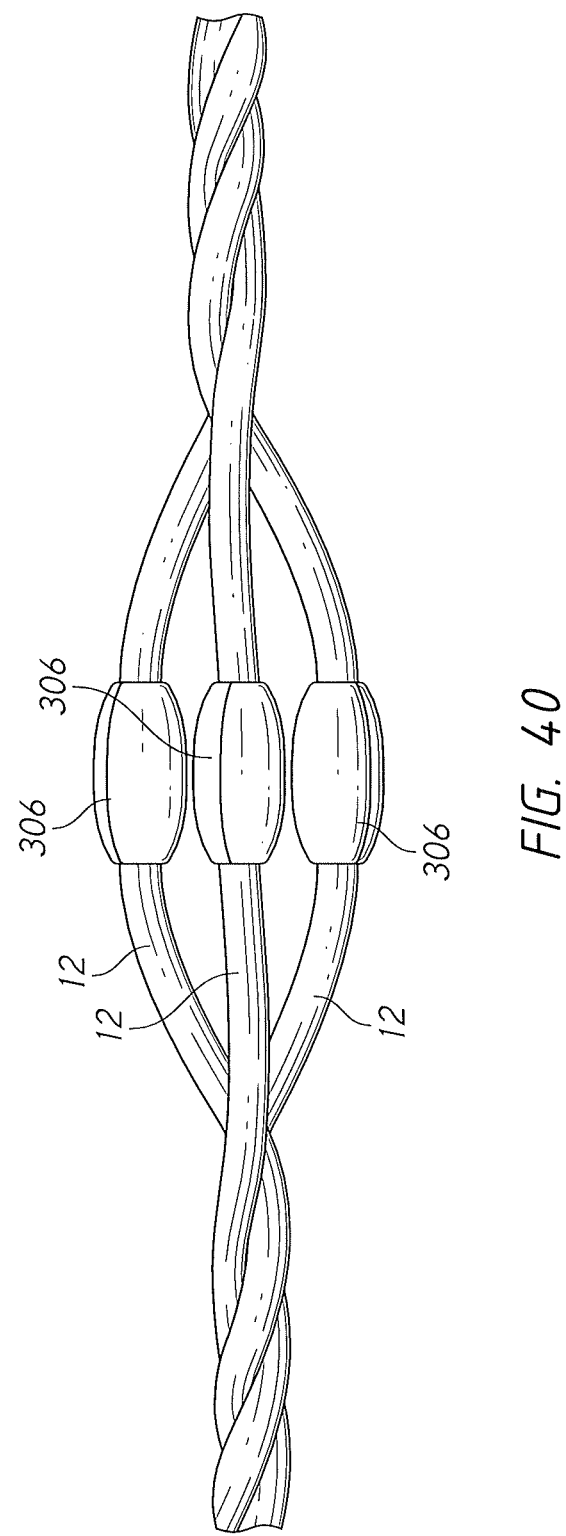
FIG. 40 is an elevation view, showing a set of intelligent cable modules, with each module being installed on an individual cable strand.

The prior examples have shown intelligent cable modules located in the center of a cable. It is also possible to provide an intelligent cable module that is clamped onto the exterior of a cable or one or more individual cable strands. FIG. 40 shows a simple 3-strand cable with a split module cover 306 clamped onto each strand. In some versions the sensing and communication technology within the intelligent cable module will be in the module cover itself. In other instances the sensing components may be housed inside the cable while the power and communication component is clamped to the cable's exterior.

Figure 41:
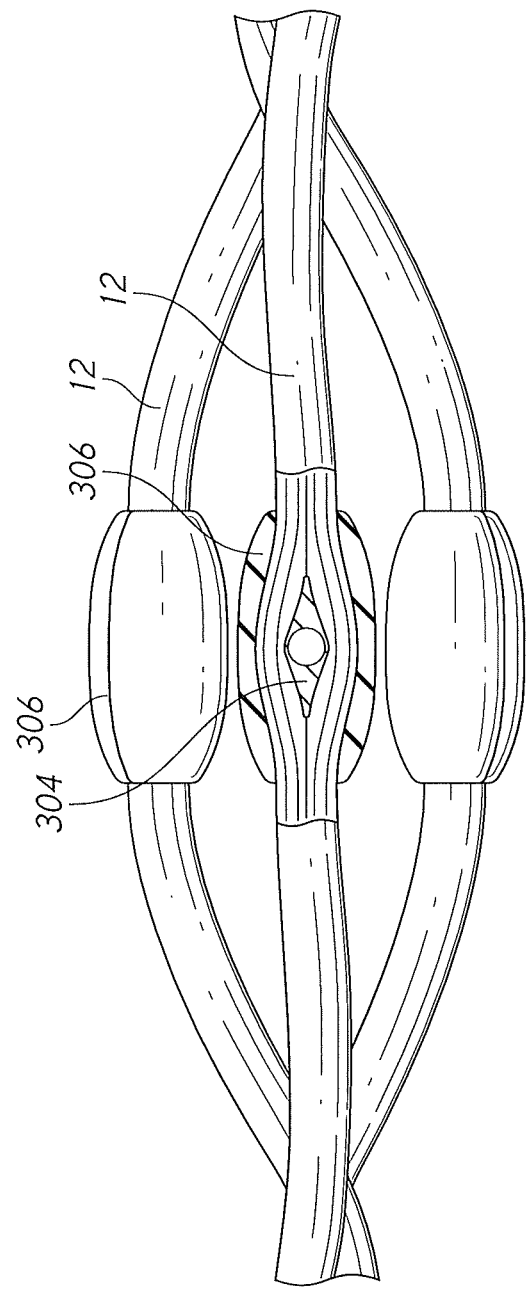
FIG. 41 is a partial sectional view, showing a section through one of the cable modules of FIG. 40.

FIG. 41 shows a sectional view through one of the integrated cable modules. A small version of integrated cable module 304 is located in the middle of an individual strand. A split module cover 306 is clamped over the cable strand's exterior in the vicinity of the bulge caused by the introduction of the integrated cable module. Power and communication equipment can be located in the module cover (small conductors can be passed laterally through the strand between integrated cable module 304 and the electronics in module cover 306). Indicator panel 374 can be provided on the exterior of module cover 306. This indicator panel can optionally include an LCD display with relevant data, or one or more LED status lights. Alternatively, the panel may include an audible noise alert to indicate status (such as a chirp via low battery, two chirps for a caution/conditional inspect notification, etc). The addition of a plug port (or charging or data) or user-operated function buttons could also be a part of the panel or module to add functionality. These devices can be used to provide alerts or indicate the condition of the cable strand or cable to an observer.

The intelligent cable modules on the individual strands may not be nearly as close together as depicted in FIG. 41. In other embodiments the modules may be separated at different intervals and a module's nearest neighboring module may be quite far away—such as 10 meters or more. The concept of an intelligent cable module on an individual cable strand is not limited to the type of module shown in FIG. 41, and may in fact be applied to any of the intelligent cable module types found in this disclosure.

Figure 42:
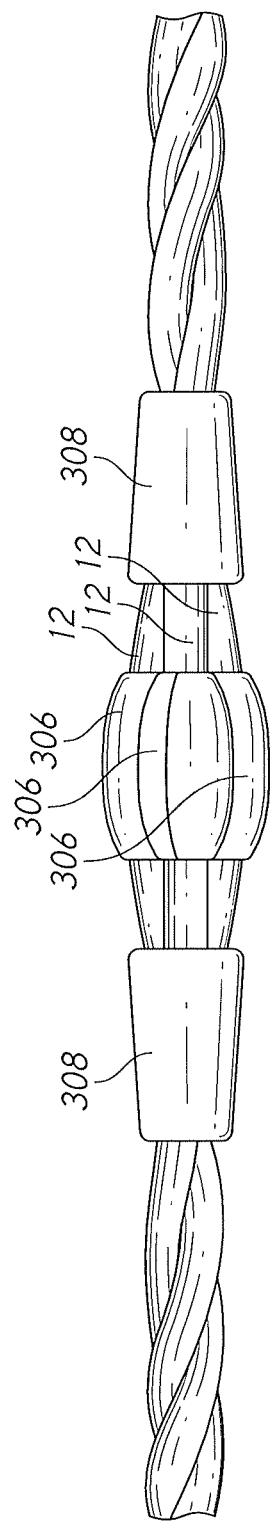
FIG. 42 is an elevation view, showing the embodiment of FIG. 40 with the addition of a pair of collars.
Figure 43:
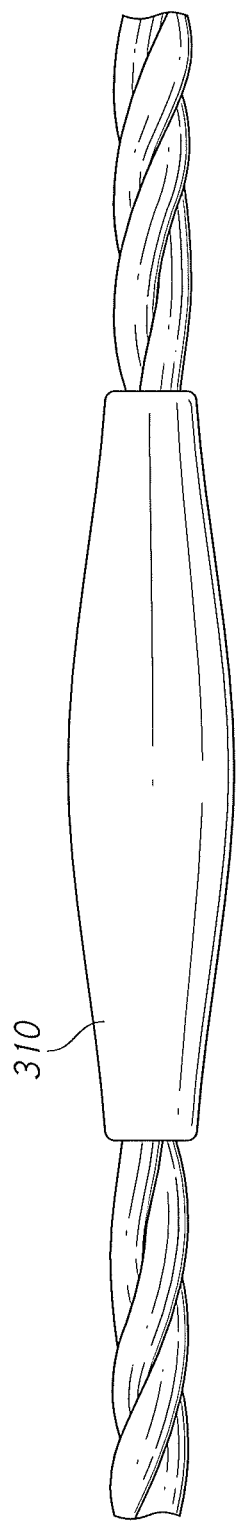
FIG. 43 is an elevation view, showing the embodiment of FIG. 42 with the addition of a unified collar.

FIGS. 42 and 43 illustrate an optional protective cover that can be used for the embodiment of FIG. 41. In FIG. 42 a pair of collars 308 have been clamped to the exterior of the cable near module covers 306. In FIG. 43 unified collar 310 has been attached over the components shown in FIG. 42. An indicator panel 374 can be provided on the exterior of unified collar 310. This indicator panel provides information regarding the cable's status or history, such as the examples provided above.

Figure 44:
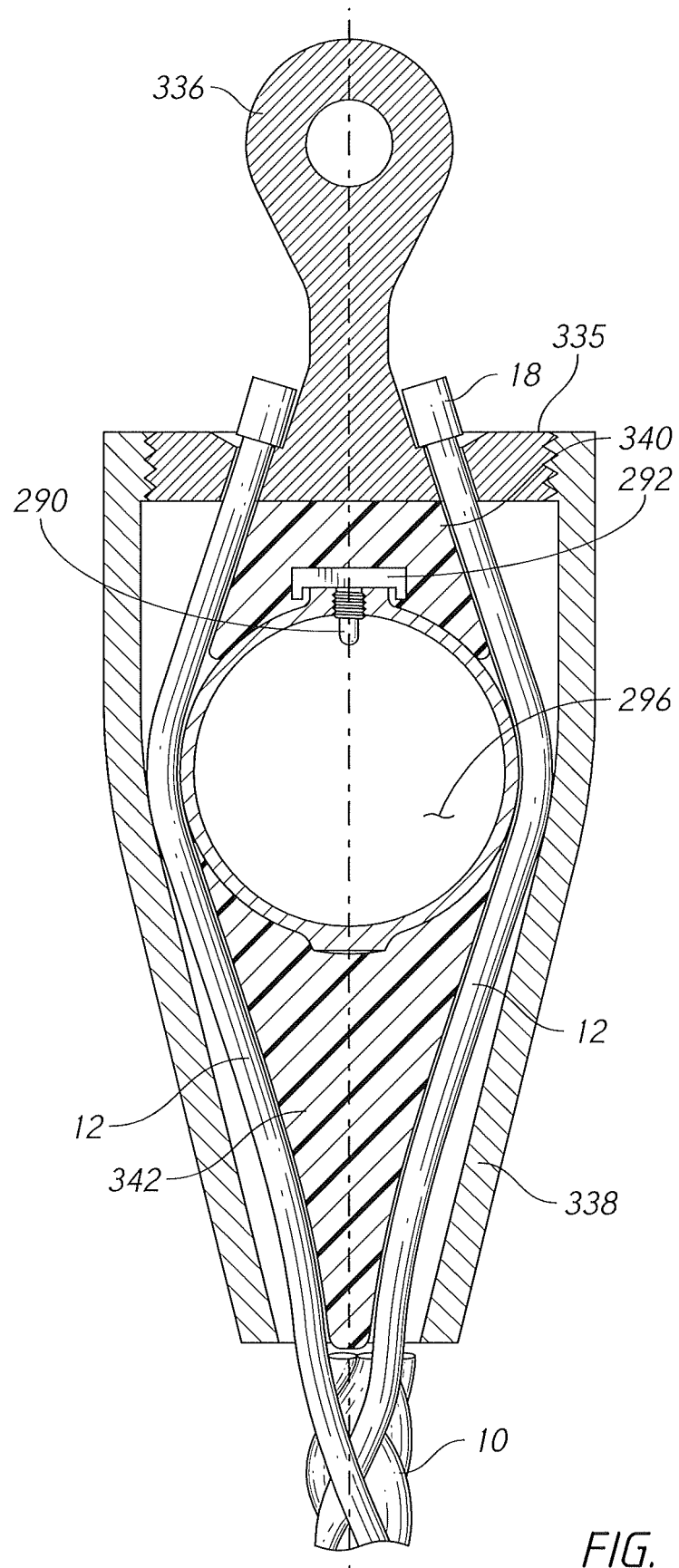
FIG. 44 is a sectional view, showing the addition of a pressure-based sensor near an end termination.

FIG. 44 illustrates an embodiment in which an integrated and intelligent cable module is provided near an end of a cable instead of in the middle. In this example each cable strand 12 is potted into an anchor 18. Collector 335 mounts all these anchors and provides an external loading feature—such as eye 336. Cable strands 12 must deflect outward to pass around pressure vessel 354. The pressure vessel is located by transition cap 340 and transition cap 342. Shroud 338 contains the strands. Pressure transducer 290 and instrument package 292 are provided as for the prior examples. Measured pressure is again calibrated against applied tension, after a proper cable bedding process. The reader should note for the example of FIG. 44 that it is also possible to provide individual strand modules such as depicted in FIG. 41, rather than a single large module.

The reader should note that for the examples of FIGS. 36-44 it is possible to fill the pressure vessel with a non-Newtonian fluid, such as a gas. The use of a gas allows more deflection of the pressure vessel and introduces greater sealing challenges. However, as long as the same gas is present during the calibration process, an accurate pressure versus tension correlated curve can be created and used (though temperature compensation may need to be added in some circumstances).

Figure 45:
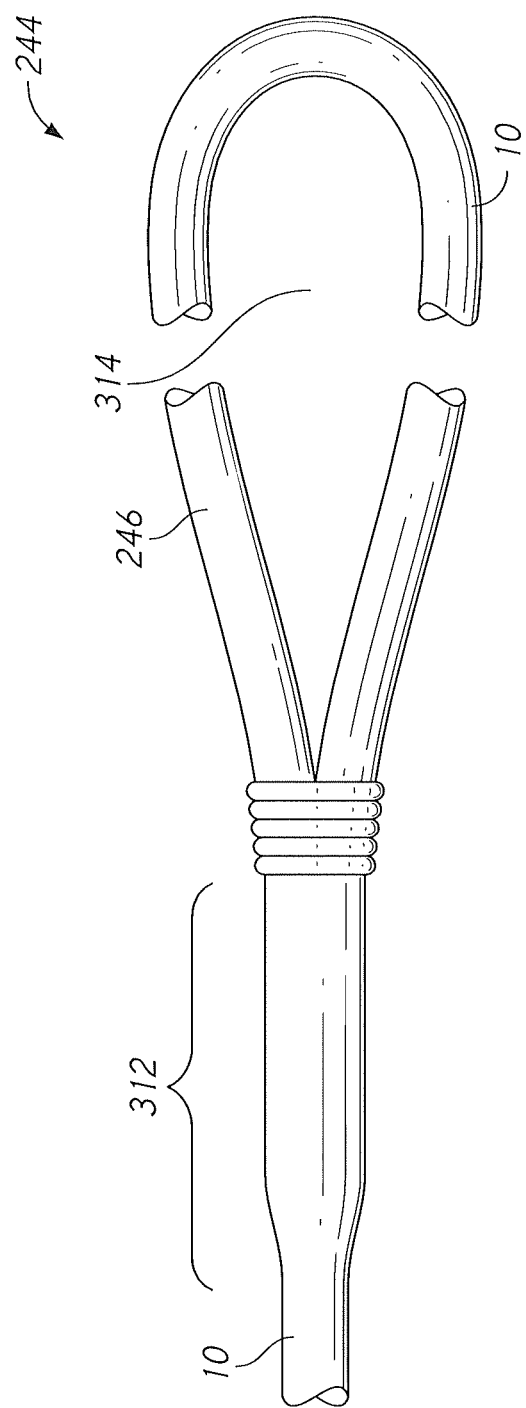
FIG. 45 is a plan view, showing a prior art mooring line.

FIGS. 45-49 illustrate an embodiment that is well suited to mooring lines. FIG. 45 shows a prior art mooring line 244. Loop 314 is formed near an end of cable 10. The cable has a multi-stranded construction. A length of strands proximate the end of the cable is woven back into the cable to form interwoven section 312. The method of interweaving is well known in the field of rigging and is beyond the scope of this disclosure.

Figure 46:
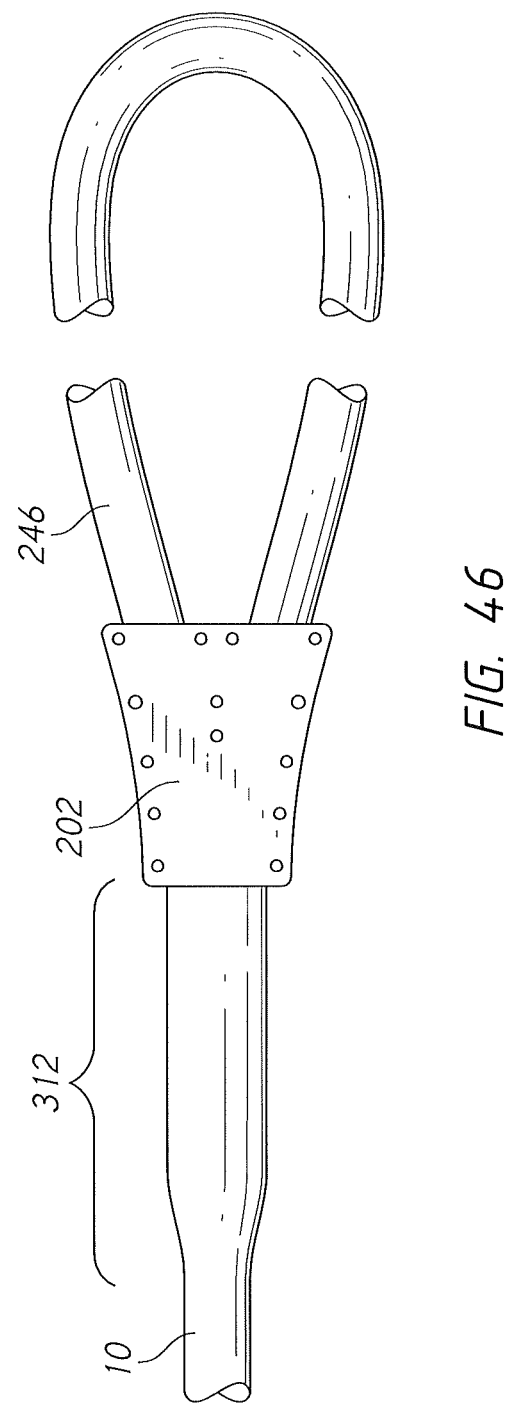
FIG. 46 is a plan view, showing an intelligent cable module configured for use in the mooring line of FIG. 45.

Sling 246 is a touch jacketing material that is placed around loop 314. It is typically secured with a binding proximate the interwoven section. The sling provides abrasion and cut resistance to the loop when the loop is passed around a mooring bollard. FIG. 46 shows an embodiment of integrated cable module 202 that is configured for use with the sling.

Figure 47:
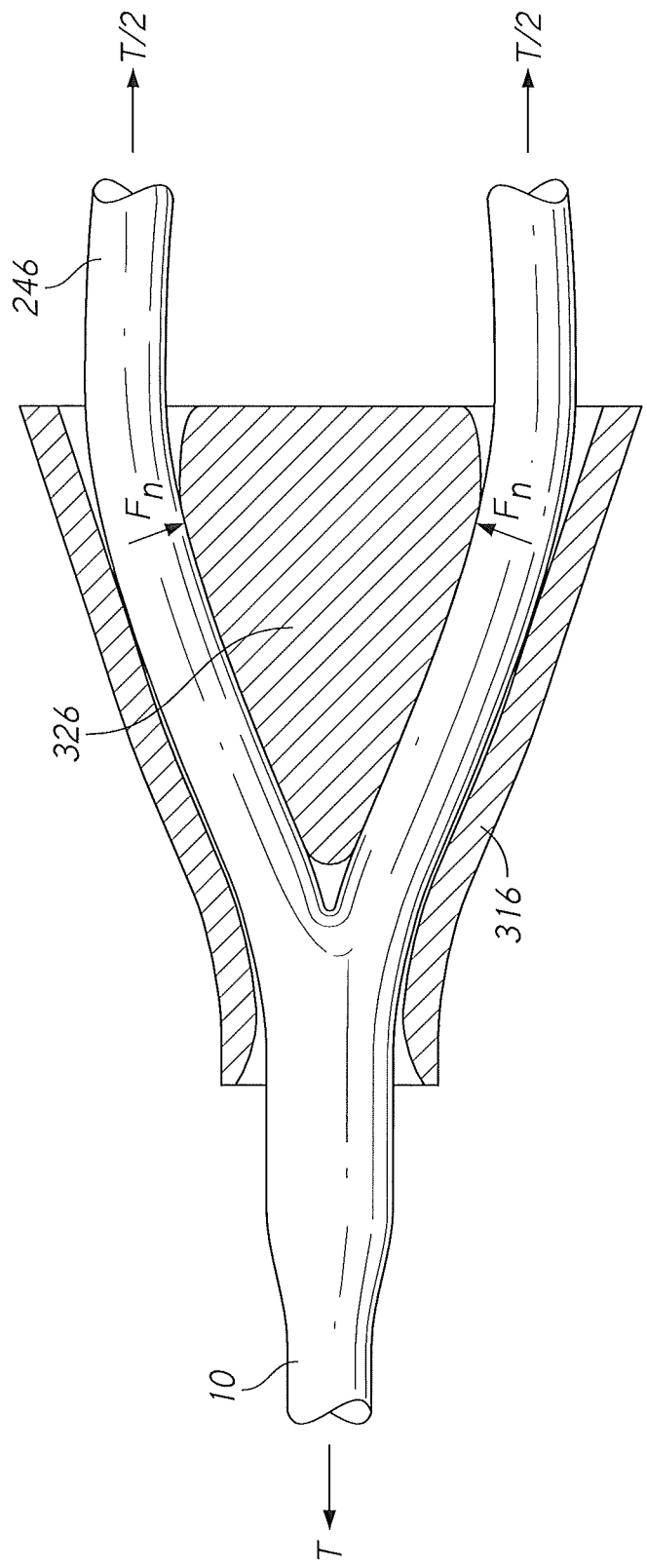
FIG. 47 is a section view, showing the embodiment of FIG. 46.
Figure 48:
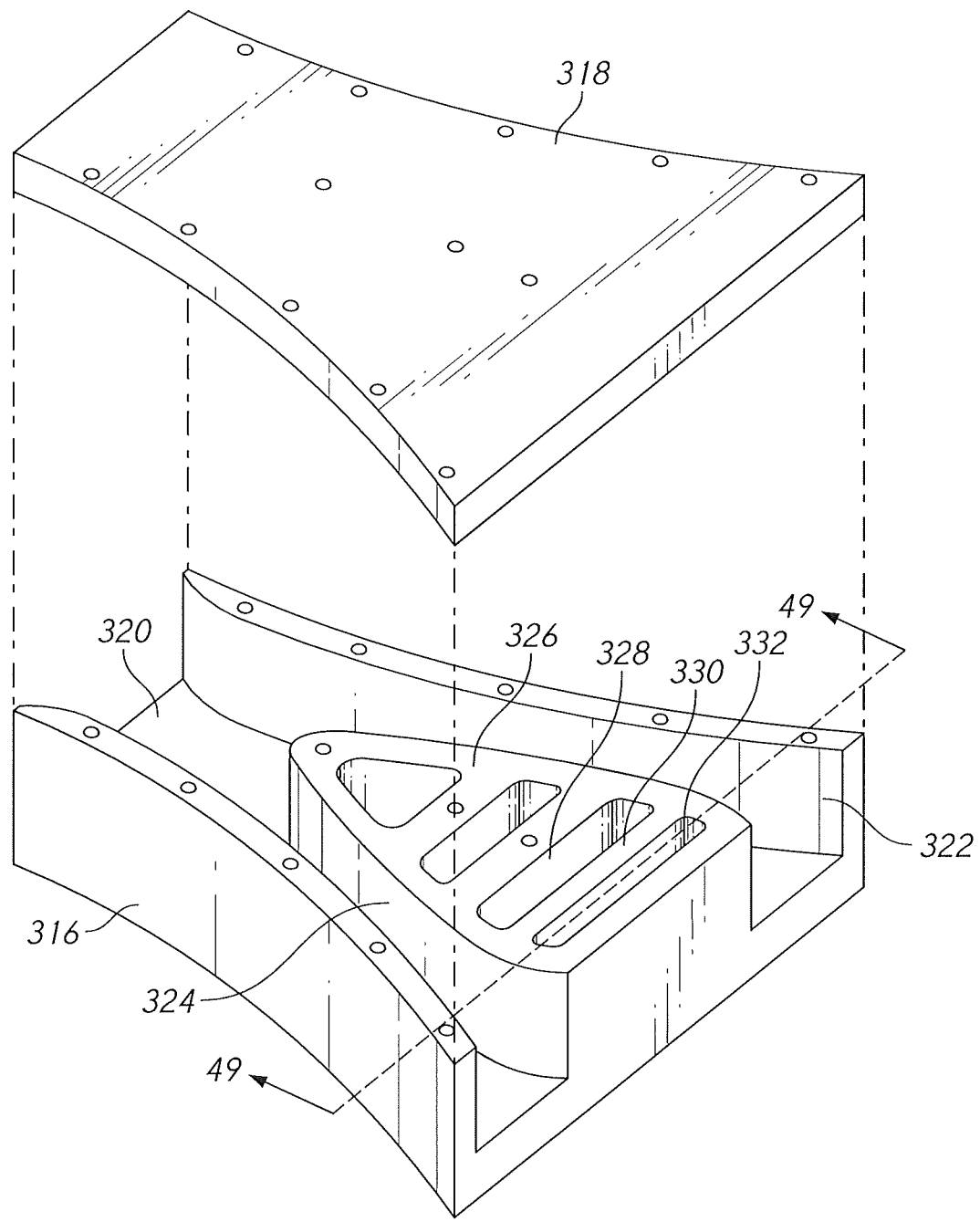
FIG. 48 is an exploded perspective view, showing additional details of the mooring line embodiment.

FIG. 47 provides a conceptual depiction of the operation of this embodiment. Separator 326 is provided within body 316. The separator splays apart the two legs of the loop found in the mooring line. Tension placed on the cable causes a "pinching" force (FN) on the separator. FIG. 48 shows an exemplary embodiment for carrying out this concept. Body 316 includes central separator 326. Inlet 320 divides into first channel 322 and second channel 324 (each housing one leg of the mooring loop). Cover 318 is bolted to body 316 to secure the device on the cable. Web 330 is provided between void 328 and void 332. Section "call outs" are provided for the location of the sectional view of FIG. 49.

Figure 49:
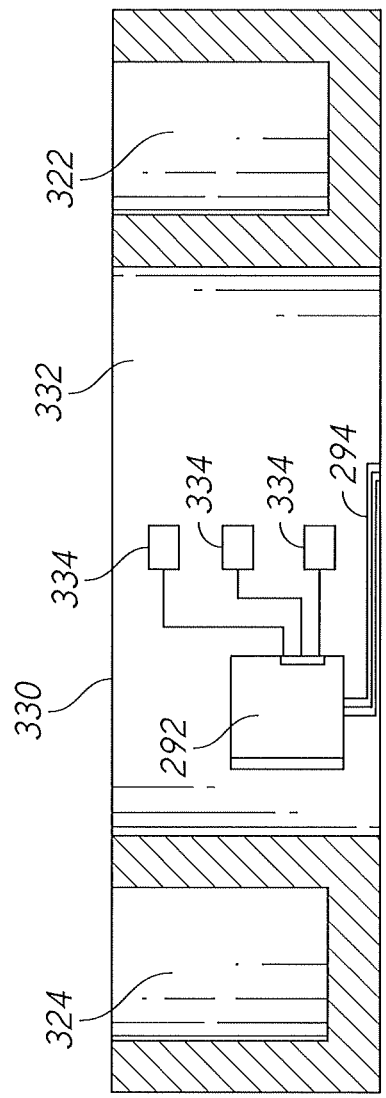
FIG. 49 is a sectional elevation view, showing additional details of the mooring line embodiment.

FIG. 49 provides an elevation view of web 330. One or more strain gauges 334 are placed on web 330. These strain gauges are monitored by instrument package 292. Antenna 294 allows for wireless external communications. As for the prior examples, the strain measured by the strain gauges can be correlated against the tension applied to the cable in a calibration step. This calibration curve can then be used to convert strain gauge measurements in the field to cable tension (The reader should bear in mind that the phrase "calibration curve" includes any convenient method of storing the calibration relationship, including the use of a look-up table and a higher-order polynomial).

Figure 50:
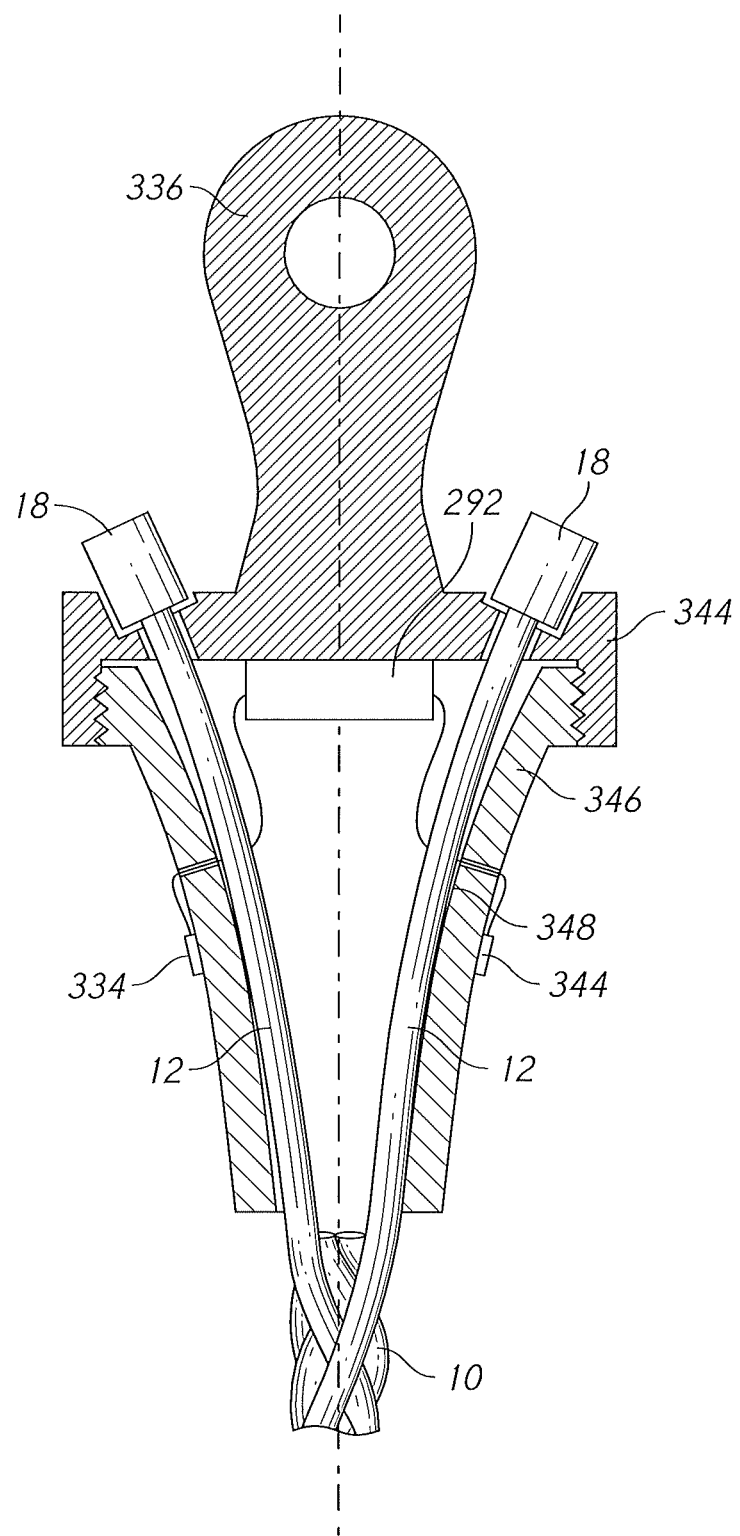
FIG. 50 is a section view, showing an intelligent cable module near an end termination that is configured to use strain measurements.

FIG. 50 shows yet another embodiment for the intelligent cable module. This embodiment is configured for attachment proximate an end of a cable. As for the example of FIG. 44, the individual strands 12 are provided with anchors 18. Collector 344 has a receiver for attaching each anchor 18.

Collar 346 is a strong structure that forces the strands inward along curved shoulder 348. Tension applied to the cable causes an outward force (hoop stress) for collar 346. One or more strain gauges 334 are positioned to measure strain produced by this outward force. Each strain gauge is connected to instrument package 292, which monitors the strain gauges. A calibration step can be performed to correlate the strain measured by the strain gauges against the applied cable tension. As for the prior examples, this calibration curve can then be used to convert strain gauge measurements in the field to cable tension.

Figure 51:
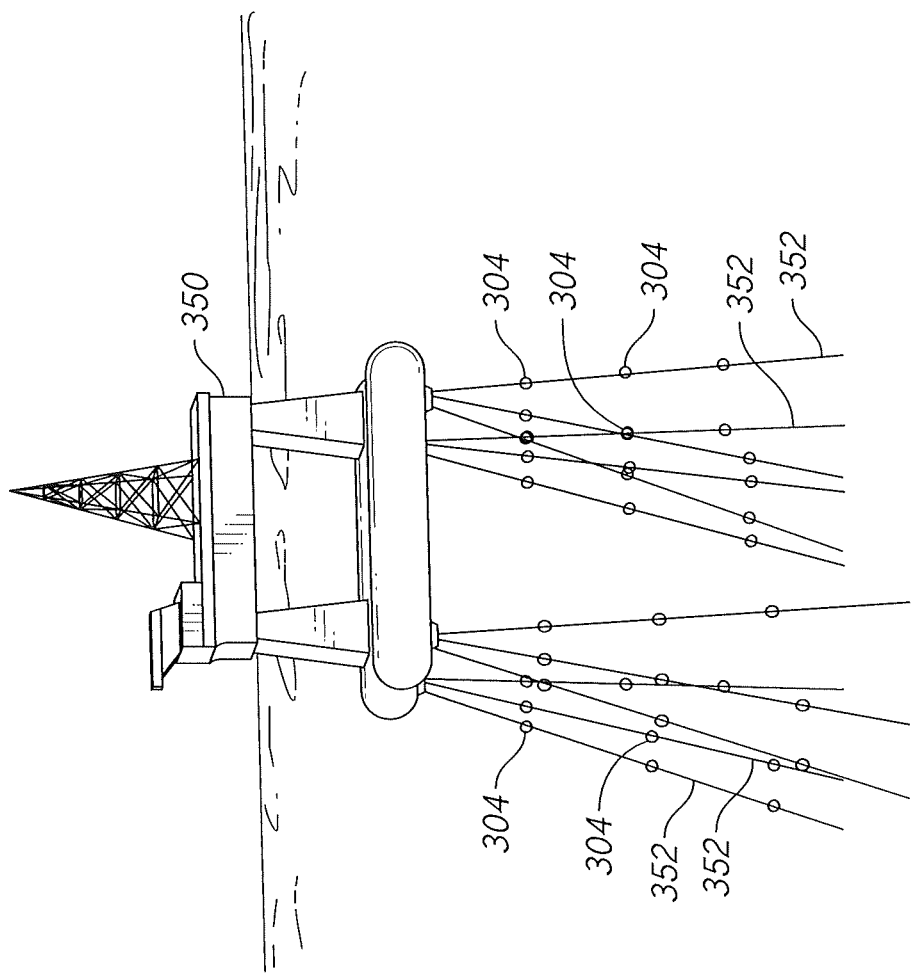
FIG. 51 is a perspective view, showing a communication network using intelligent cable modules.

The reader will recall from the prior network discussions relating to FIGS. 29 and 30 that multiple intelligent cable modules can organize themselves (or can be externally organized) into a useful network. FIG. 51 illustrates a useful application of this networking approach. In FIG. 51, oil platform 350 is secured to the sea floor by multiple anchor cables 352. Each cable includes multiple intelligent cable modules 304. These modules can form a network so that communication can pass through a first module on one cable to a second module on a completely different cable and so on.

Figure 52:
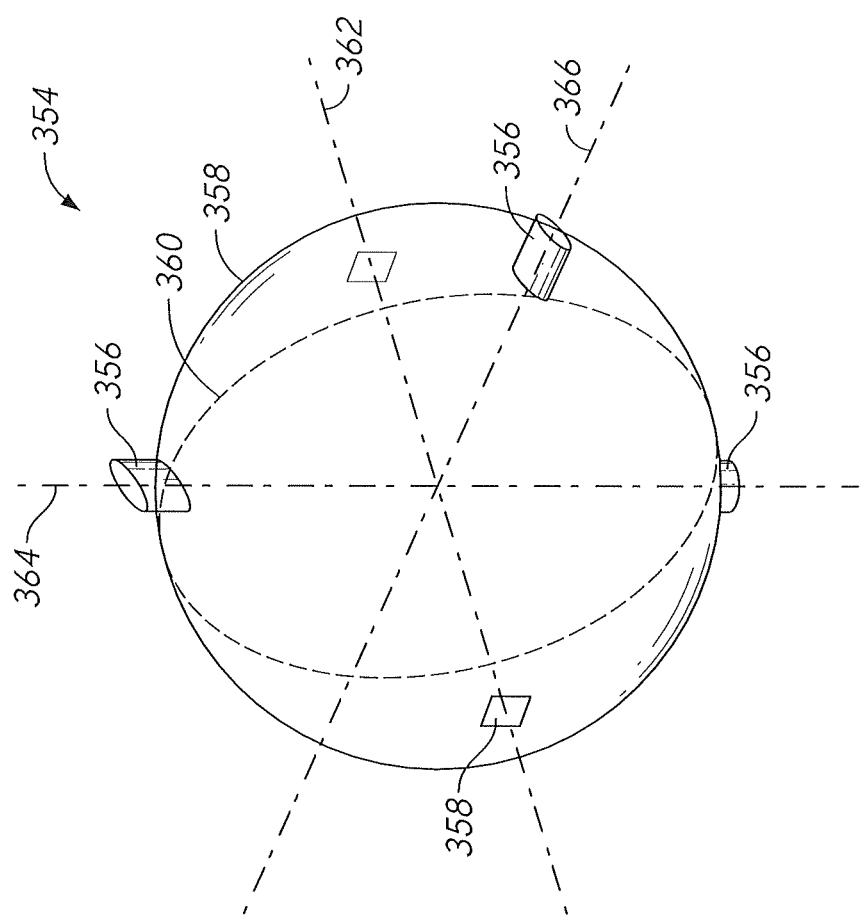
FIG. 52 is a perspective view, showing a strain-based measurement component.

FIGS. 52-56 illustrate additional embodiments using the pressure vessel concept. In FIG. 52, pressure vessel 354 is a hollow sphere containing a gas. Longitudinal axis 362 is intended to lie along the cable's central axis. Lateral axis 366 is perpendicular to the longitudinal axis. Vertical axis 364 is perpendicular to both the longitudinal axis and the lateral axis.

Two or more strain gauges 358 are placed on the sphere's exterior surface. In the example shown, the two strain gauges are placed on longitudinal axis 362. The operative concept is that the sphere is placed in the center of a multi-stranded cable. When tension is applied to the cable, the cable strands squeeze inward on the sphere. This squeezing force compresses the sphere and produces strain that is measured by strain gauges 358.

Those skilled in the art will appreciate that strain gauges 358 are placed in locations that are convenient for the measurement of cable tension-induced strain (along the cable's central axis). As for the prior examples, the strain gauge readings can be correlated against applied cable tension in a calibration process. However, the reader will also appreciate that the orientation of the sphere within the cable is important. If a calibration is completed and stored, a subsequent significant reorientation of pressure vessel 354 will likely invalidate the correlation. Thus, it is desirable for the orientation of pressure vessel 354 to remain constant within the cable. Locating vanes 356 are provided for this purpose.

Each locating vane 356 is a protrusion extending outward from the surface of the sphere. These locating vanes are positioned and oriented to lie within the interstices between the strands of the cable overlying the sphere when it is installed.

Figure 53:
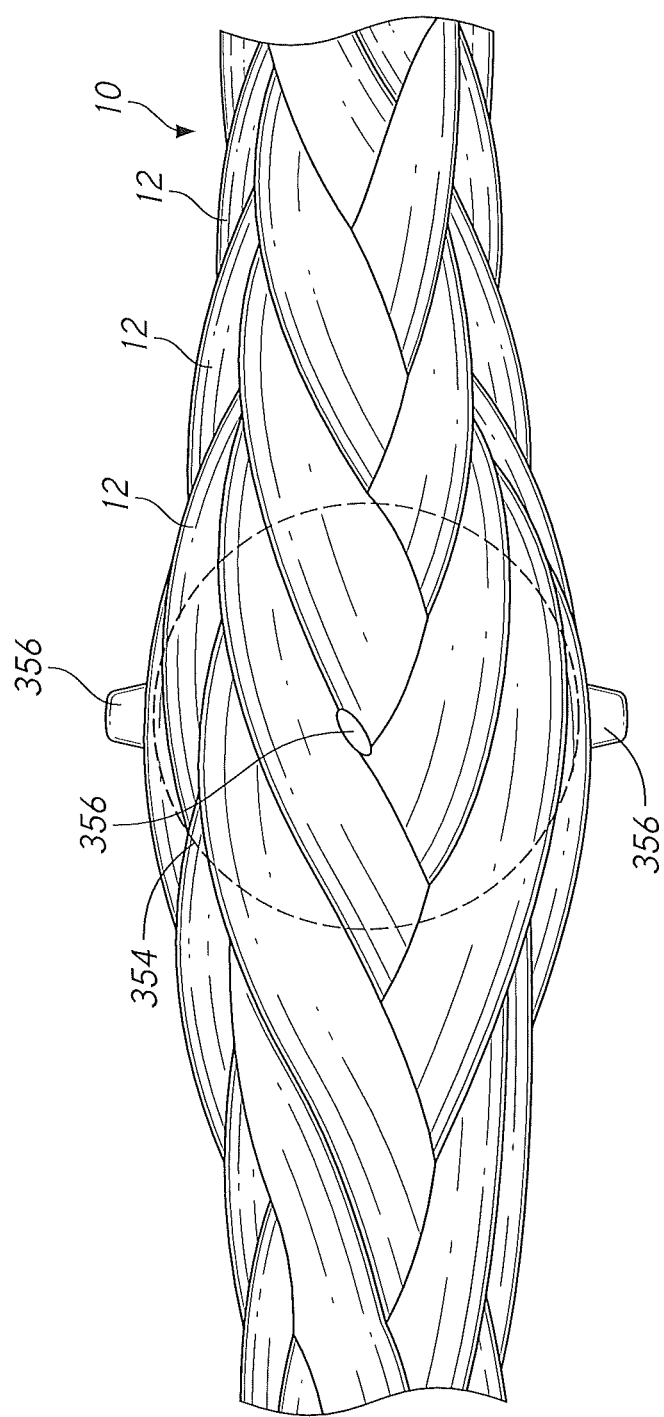
FIG. 53 is an elevation view, showing the component of FIG. 52 installed in a cable.

FIG. 53 shows pressure vessel 354 (denoted by dashed lines) lying within cable 10. The reader will observe how locating vanes 356 protrude into the interstices between the strands 12. Once tension is applied to the cable, pressure vessel 354 cannot rotate. The locating vanes in some examples will not be nearly as large as those shown in FIG. 53. In some instances they may be short pins or bump-like protrusions.

Figure 54:
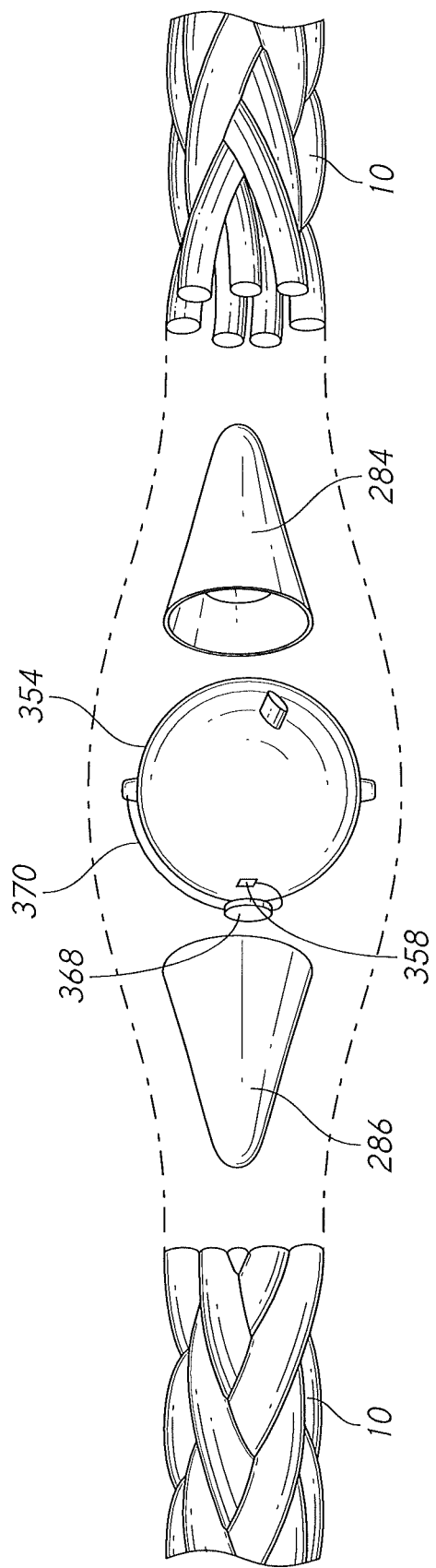
FIG. 54 is an exploded perspective view, showing the component of FIG. 52 installed in an intelligent cable module.
Figure 55:
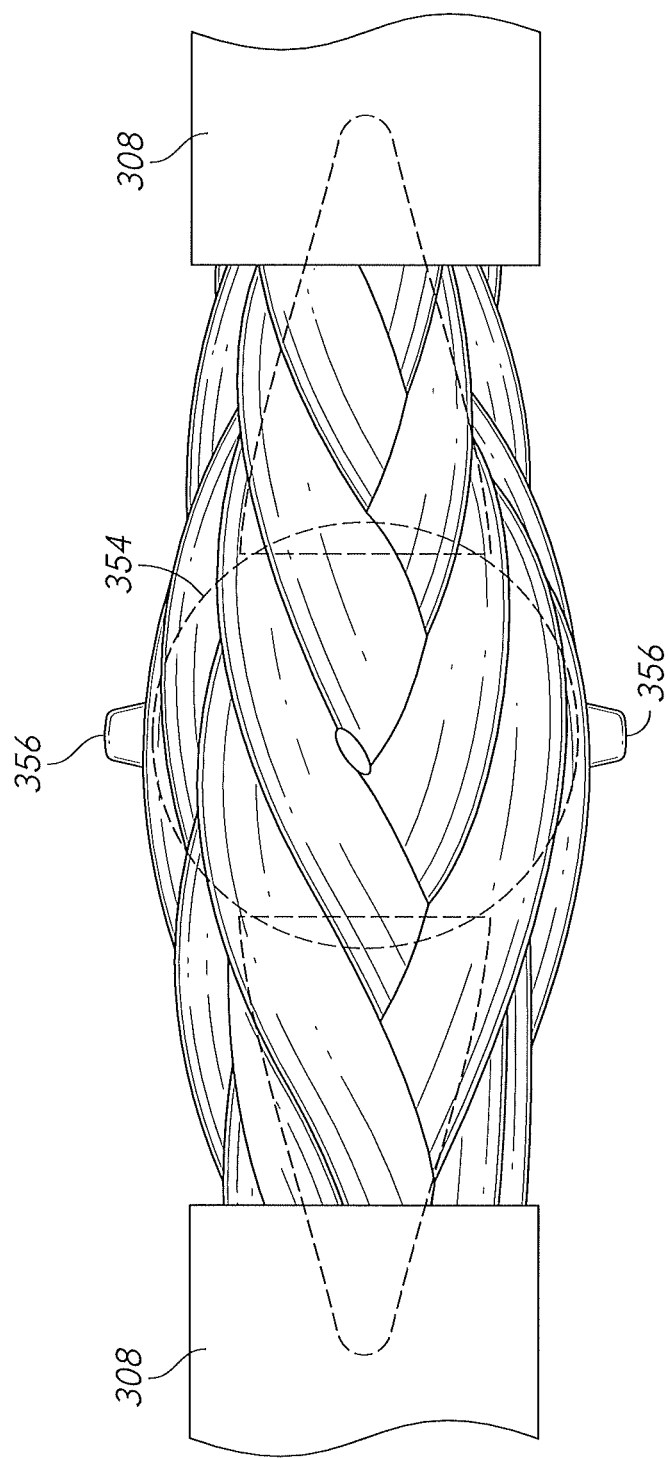
FIG. 55 is an elevation view, showing the component of FIG. 52 installed in an intelligent cable module.

The sphere of FIGS. 52 and 53 can be provided with transition caps and other external components if desired. FIG. 54 provides an exploded view of this embodiment. Instrument package 368 monitors the strain gauges and sends (and possibly receives) data via antenna 370. Separate transition caps 284, 286 can be provided as shown. Alternatively, an overmolded covering can be provided as described previously. FIG. 55 shows the assembly with the addition of a pair of clamped collars 308. These clamped collars tend to stabilize the cable so that pressure vessel 354 remains in a fixed position. It is also possible to provide a single clamped collar over the location of the pressure vessel itself.

Figure 62:
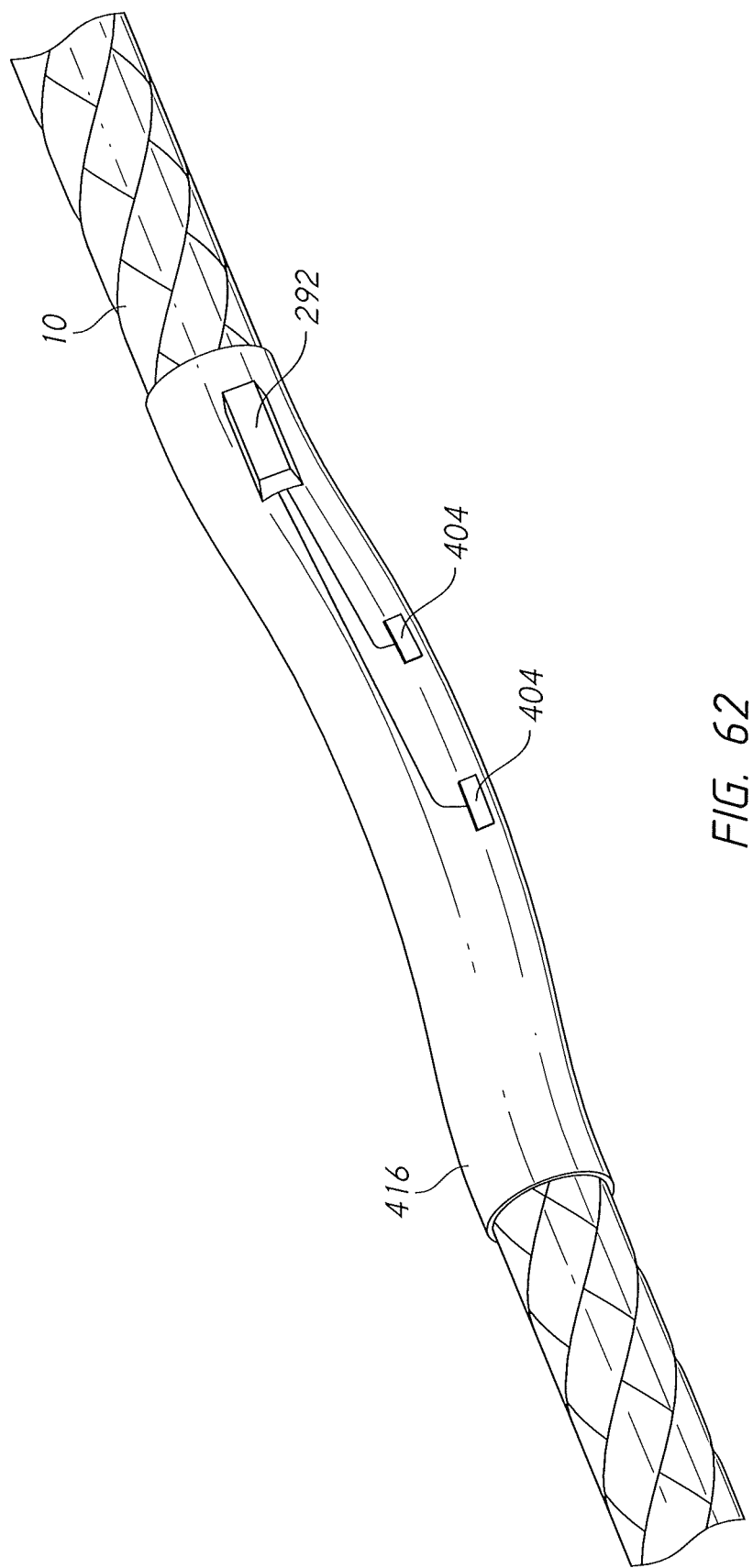
FIG. 62 is a perspective view, showing a measurement system using a deformed tube.
Figure 63:
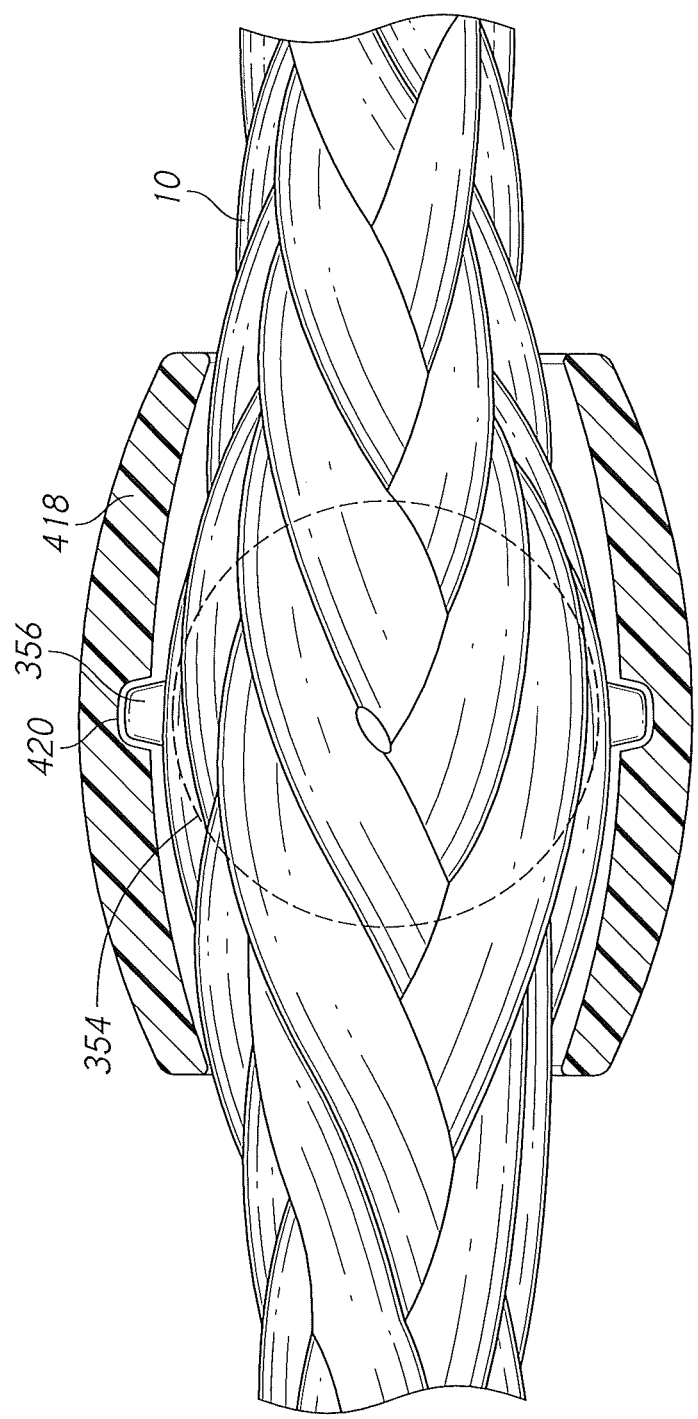
FIG. 63 is a sectional elevation view, showing a collar clamped over the exterior of the cable and connected to a pressure vessel on the interior of the cable.

FIGS. 62 and 63 show an alternate embodiment of the version of FIG. 53. In FIG. 62, pressure vessel 354 remains within the cable. However, it is held in place by an externally-mounted collar 418. The fixation in this example is a mechanical one, with locating vanes 356 resting within recesses 420 within collar 418. This need not always be the case.

FIG. 63 shows a non-sectional view of the same assembly. In the version shown collar 418 is split into two halves that are joined along joint 422. The reader will note how the joint "jogs" around locating vane 356 as necessary. In this example strain gauges are located on pressure vessel 354. Electrical conductors extend from these strain gauges out to instrument package 292. The instrument package is located in collar 418 and the electrical connections are made through one or more of the locating vanes 356.

Figure 56:
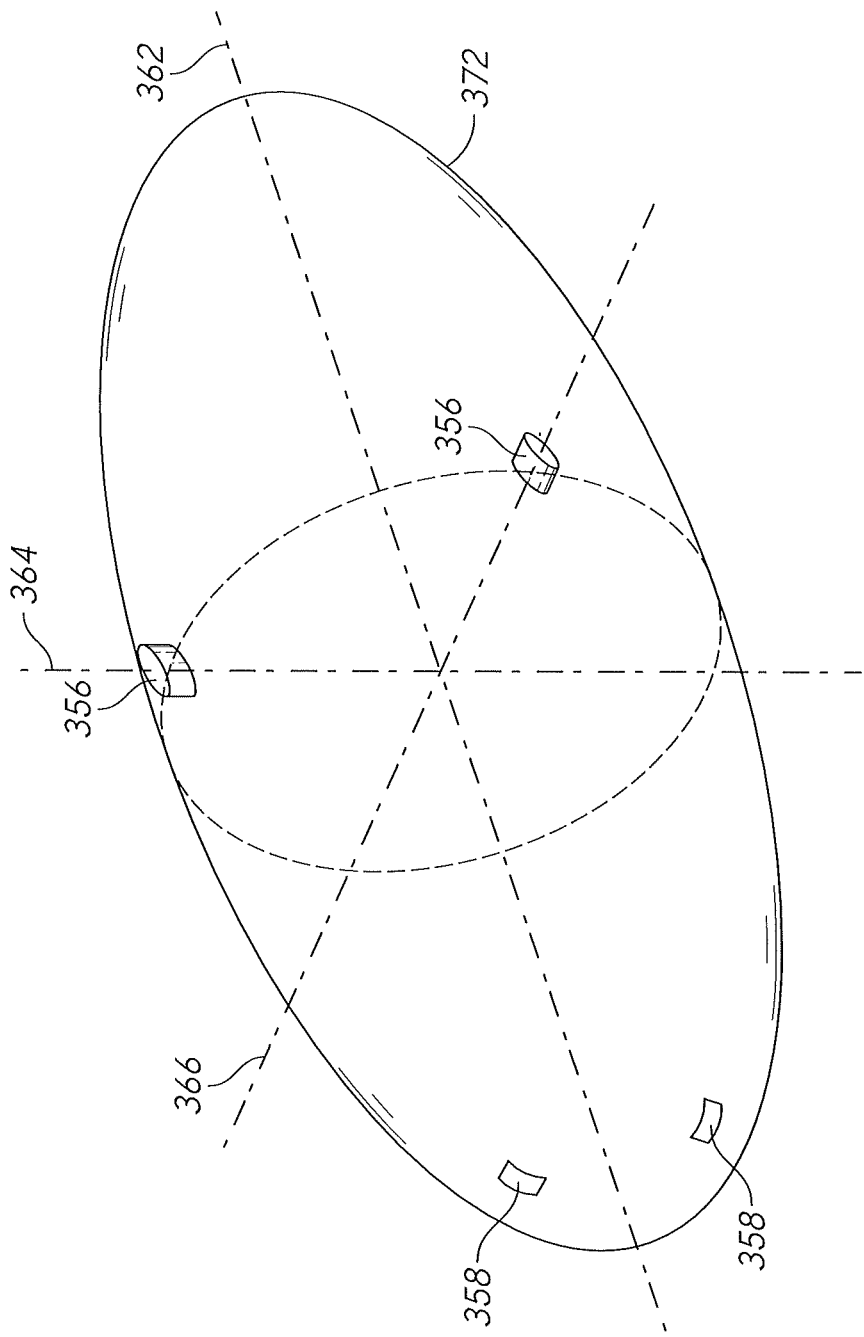
FIG. 56 is a perspective view, showing a strain-based measurement component having an oblong shape.

FIG. 56 shows an alternate shape for pressure vessel 372. An oblong shape is used, with the long axis lying along longitudinal axis 362. Strain gauges 358 are once again used to measure strain induced by the compression of the cable strands passing around the pressure vessel (while it is located in the center of the cable). Locating vanes 356 are optionally provided to retain a stable position. The elongated shape minimizes the need for transition caps. It also reduces the tendency of the pressure vessel to reorient during loading cycles.

A significantly different version using the same shape as depicted in FIG. 56 is also possible. In this alternate version a tough but pliable material is used for the wall of the pressure vessel. An example is a tough natural or synthetic rubber. The vessel is then filled with a Newtonian liquid (such as silicone oil) rather than a gas. A pressure sensor is employed rather than strain gauges. When this version is placed in the center of a cable, tension placed on the cable squeezes the strands inward and deforms the pressure vessel significantly. Measured pressure within the vessel is correlated to applied tension as explained previously. This design does not count on the natural stiffness of the wall material. Rather, it assumes that the relatively pliable wall material will allow the pressure vessel to deform significantly so that it fills the available space within the cable's central cavity. This approach can also be used with a gas, though this tends to increase the wear on the wall material.

Figure 57:
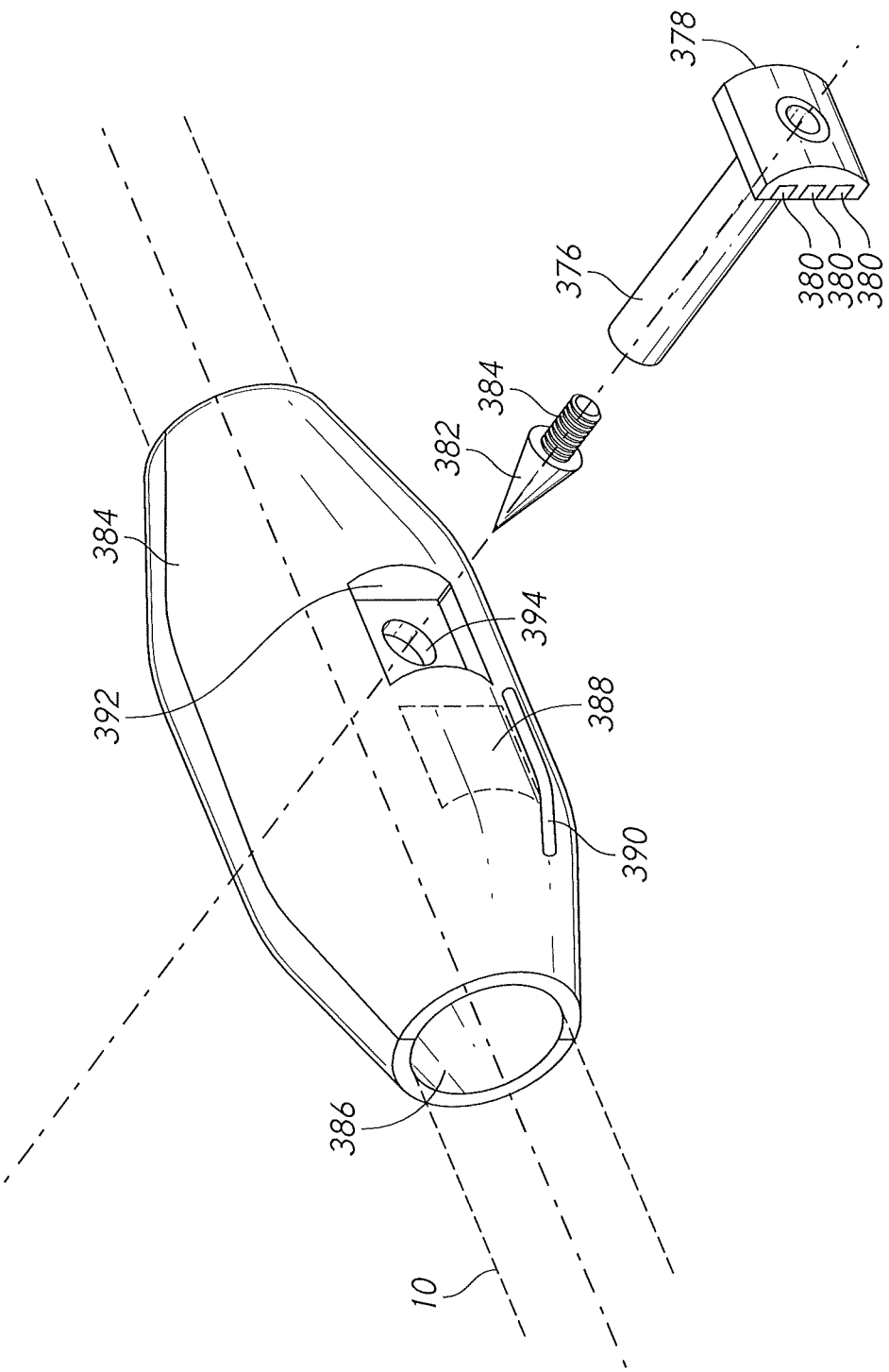
FIG. 57 is an exploded perspective view, showing a strain-based measurement component having strain gauges mounted in a transverse hollow tube.
Figure 58:
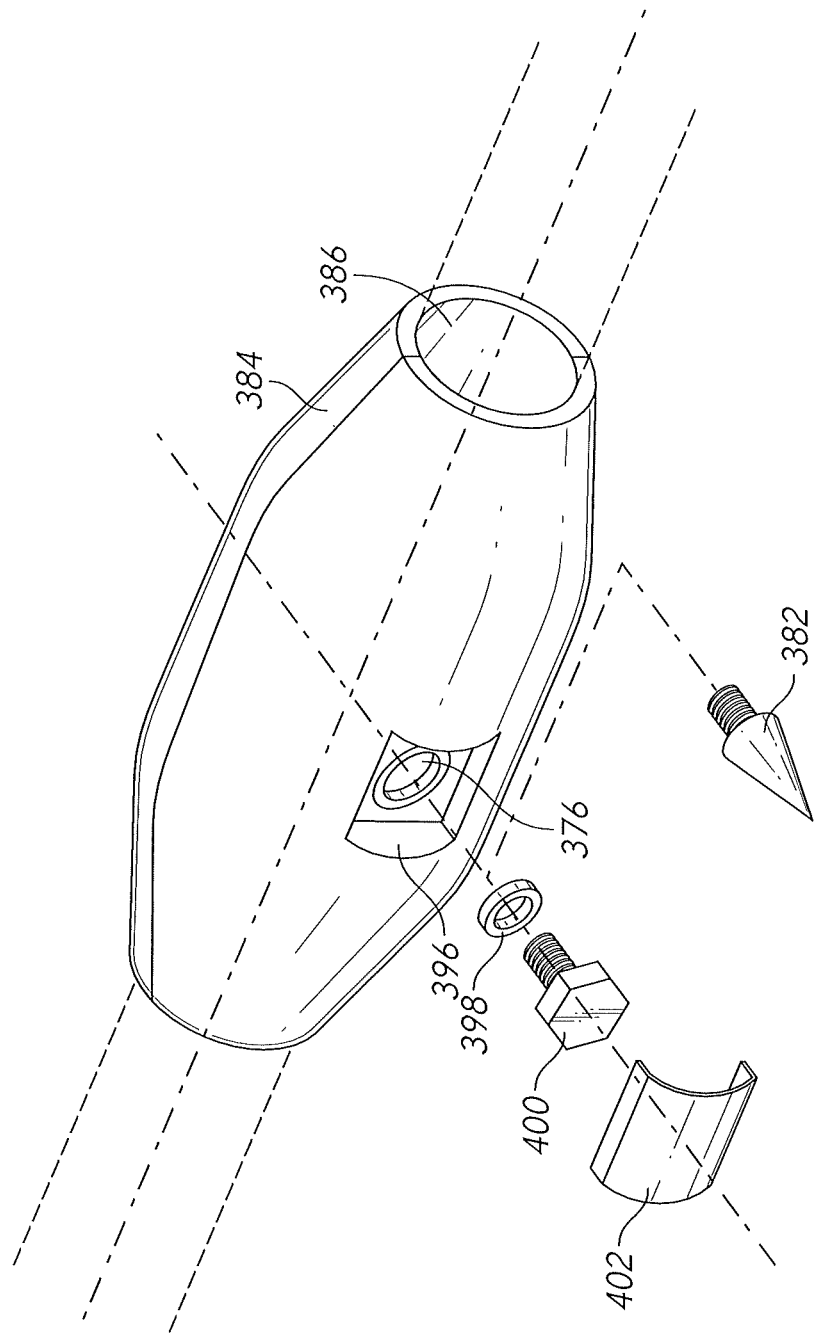
FIG. 58 is an exploded perspective view, showing the assembly of FIG. 57 from a different vantage point.
Figure 59:
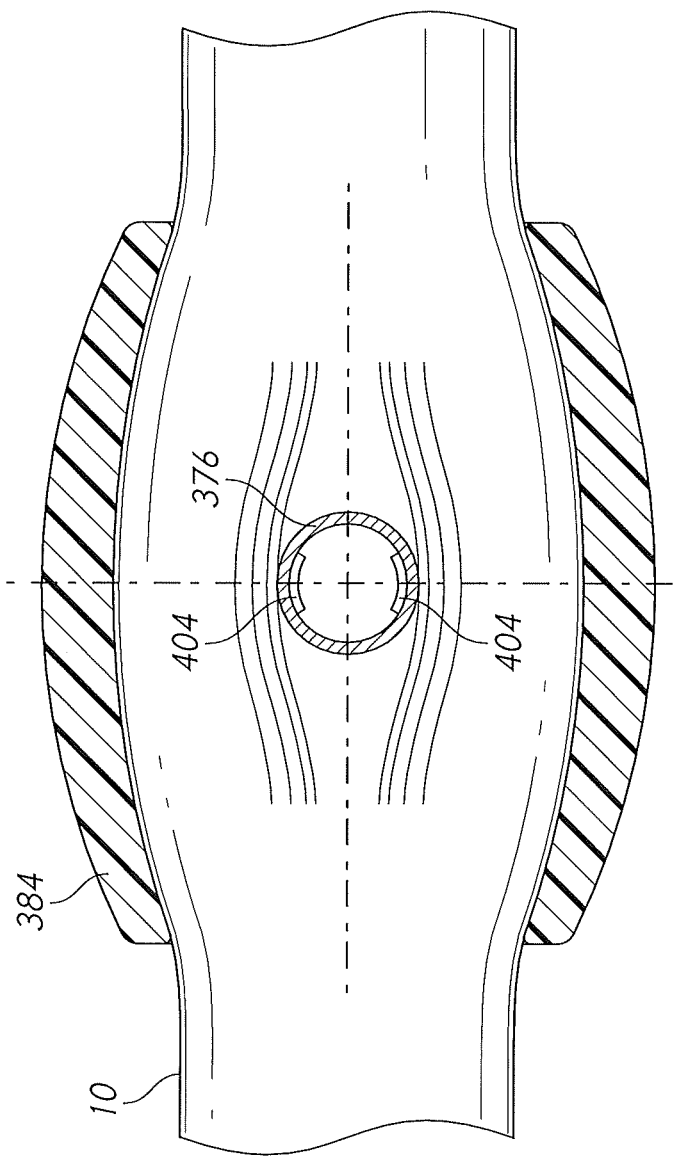
FIG. 59 is a sectional elevation view, showing the location of the transverse tube and the strain gauges within the transverse tube.

FIGS. 57-59 depict another type of intelligent cable module that can be added at a desired location along a cable, including the strand of a cable. FIG. 57 depicts the cable itself as a dashed line. The concept is to insert a transverse measurement element laterally through the cable strands. In the example shown a hollow transverse tube 376 is used as the transverse measurement element. The hollow tube is instrumented—such as by the inclusion of a pair of strain gauges on the inside or outside. When tension is applied to the cable, the strands squeeze the tube and the resulting change monitored by the instrumentation (such as an altered voltage drop across a strain gauge) can be correlated to the applied tension.

It is desirable to retain the transverse measurement element in a stable orientation to hold calibration and the assembly shown in FIG. 57 does this. Collar 384 is applied to the cable's exterior. A solid collar 384 can be added by sliding it over one end of the cable. If the intelligent cable module is to be added after terminations have been added to both of the cable's ends, a split collar is desirable. FIG. 57 shows an example with a split collar 384 (Note the parting seam for the two halves of the collar). The collar includes a hollow passage 386 for the cable. Hole 394 passes transversely through collar 384.

Transverse tube 376 includes a hollow passage in its interior. The portion of this passage that is most distant from the viewer in FIG. 57 includes a female thread. Piercer 382 includes threaded shaft 384, which is configured to thread into the female thread in transverse tube 376. Piercer is attached to the far end of transverse tube 376. With collar 384 in place, the transverse tube (and its attached piercer) are carefully pushed transversely through the cable strands and out the far side of collar 384. As those skilled in the art will realize, the presence of piercer 382 greatly assists this process if the cable strands are tight. If the cable strands are able to be opened this may not be a necessary component.

FIG. 58 shows the opposite side of collar 384. Piercer 382 is unscrewed from transverse tube 376, thereby exposing the female thread of the interior of the transverse tube. The end of the transverse tube at this point lies flush within clip receiver 396. Washer 398 is placed over the threaded shaft of bolt 400 and bolt 400 is then threaded into transverse tube 376 and tightened.

Returning to FIG. 57, the reader will observe that the tightening of bolt 400 pulls orientation cap 378 tightly into cap receiver 392. Orientation cap 378 is locked in place and cannot turn. Transverse tube 376 is locked to the orientation cap so it cannot rotate either.

Looking back at FIG. 58, once bolt 400 is suitably tightened retaining clip 402 is clipped in place over clip receiver 396. This produces a smooth exterior that will not tend to snag on other objects.

FIG. 59 shows a sectional view through the middle of the assembly. The cable's strands pass around transverse tube 376 (which is of course secured to collar 384). One or more strain gauges 404 are provided at suitable locations on the transverse tube. In the example shown, the strain gauges are located on the interior wall of the strain gauge.

Returning to FIG. 57, electrical leads connect the strain gauge(s) on the hollow tube to electrical contacts 380 on orientation cap 378. A corresponding set of electrical contacts is provided on the side wall of cap receiver 392 so that when orientation cap 378 is pulled into cap receiver 392, an electrical connection is made between strain gauges 404 and instrumentation package 388 located in collar 384. The instrumentation package monitors the strain measured by the strain gauges. It can communicate with external devices using antenna 390.

Although the transverse measurement element has been illustrated as having a circular cross section, many other shapes can be used. An oval or filleted diamond shape may be selected since it will tend to cause less disruption to the lay of the cable's strands. The transverse measurement element may also be solid rather than hollow. In some examples the measurement element will have varying geometry down the axis. It may be oval in the center for example, yet round or square at the two distal ends. Alternatively, it may be entirely ovular. It may be one or many pieces. Like that of the sphere designs, it may be a solid or a bladder-type structure made from pliable materials.

The transverse measurement element has been illustrated with strain-measuring devices installed (the strain gauges). It is also possible to provide a transverse measurement element that is a pressure vessel. As an example of this approach, a hollow tube can be provided with hemispherical end caps. A pressure sensor can then be used to measure a pressure variation when the hollow cylinder is compressed by cable tension. One can also use a pressure vessel with a strain gauge or gauges at some point on its interior or exterior surface. A strain gauge could be placed on a hemispherical end cap for instance. With a pressure-based system, soft bladder-type traversing elements may be desirable.

Figure 60:
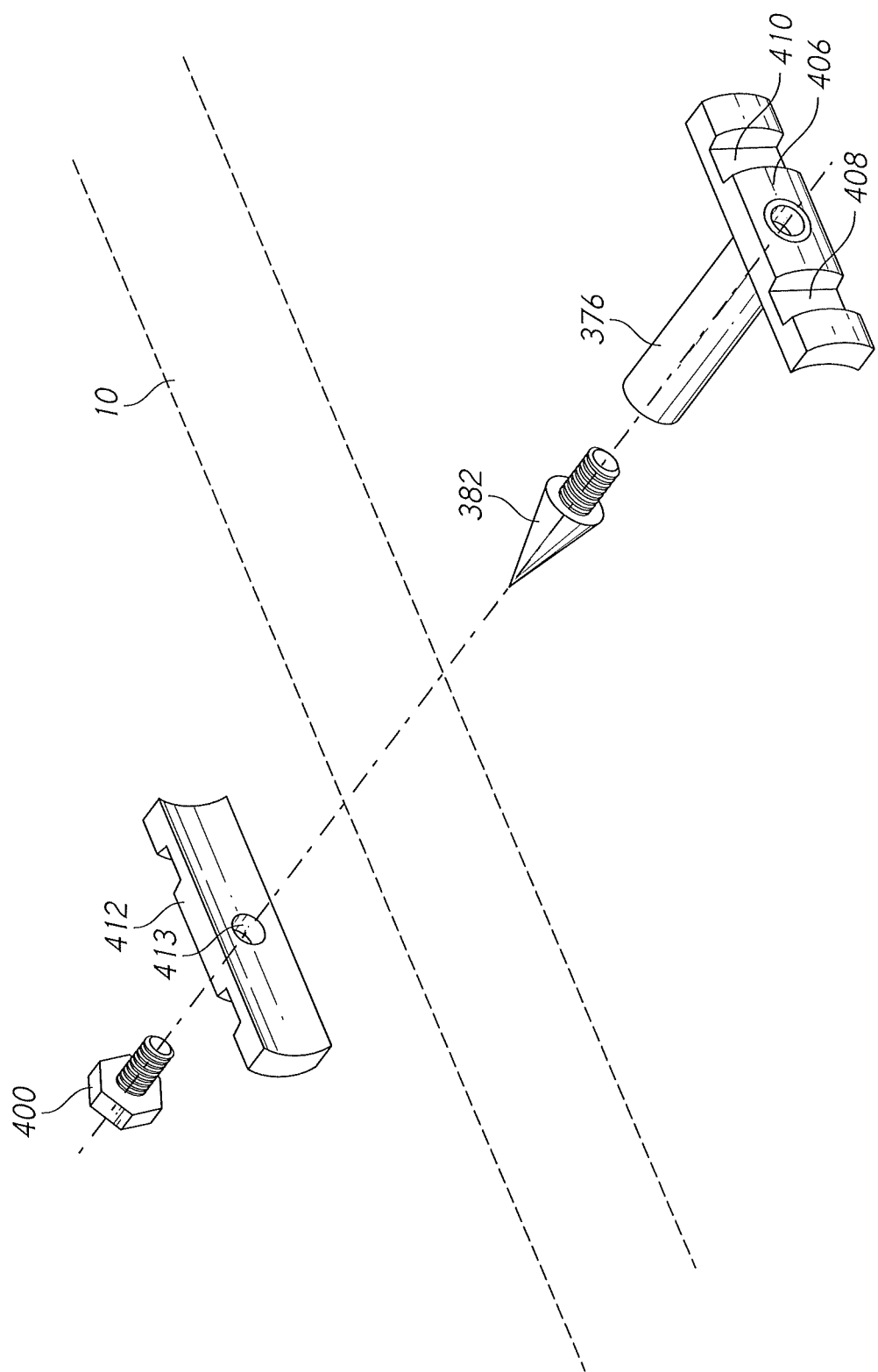
FIG. 60 is an exploded perspective view, showing an alternate approach to mounting the transverse tube in the cable.
Figure 61:
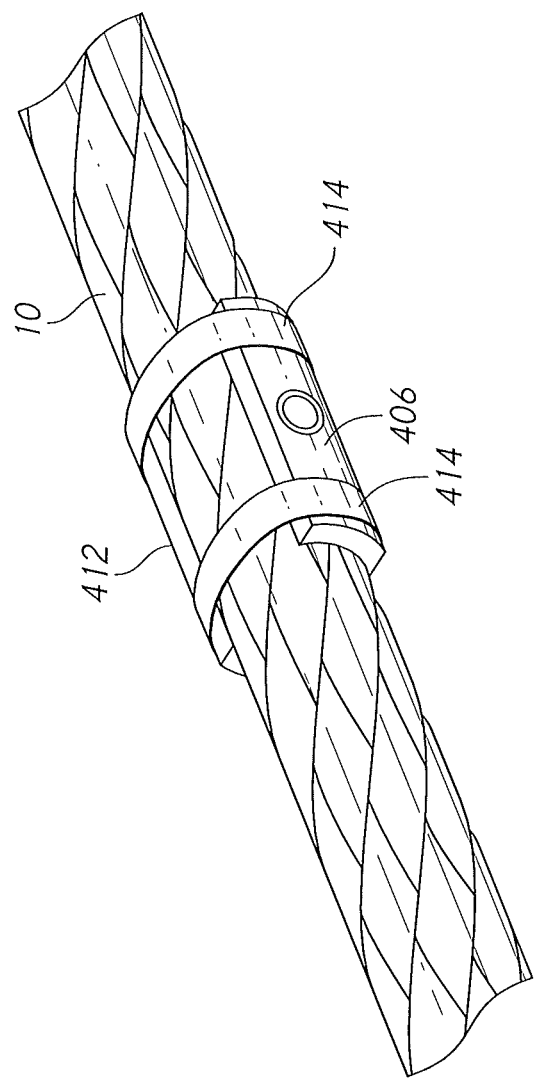
FIG. 61 is a perspective view, showing the embodiment of FIG. 60 in an assembled state.

FIGS. 60 and 61 illustrate another example using the transverse sensing element concept. Transverse tube 376 is again a hollow tube containing strain gauges. Instrument housing 406 contains the strain gauge monitoring instruments, a power supply, and communication hardware. The instrument housing is elongated as shown. Two transverse channels 408, 410 are provided in the instrument housing. Piercer 382 is threaded into place and described previously. Transverse tube 376 is then carefully pushed through the center of the strands of cable 10 (a removable fixture may be used to ensure the proper alignment). Piercer 382 is then removed. Bracket 412—which also includes a pair of channels—is attached to the far side of transverse tube 376 by threading bolt 400 through hole 413 and into the threaded receiver in transverse tube 376.

FIG. 61 shows the installed configuration. Bands 414 are passed around the assembly and tightened. The bands lie within channels 408, 410. Instrument housing 406 cannot turn and tube 376—which is locked to the instrument housing—cannot turn. A protective sheath can be applied over the assembly shown in FIG. 61. The result is an intelligent cable module that can be added in any desired position along a cable at any time.

Although the example of FIGS. 60-61 is shown being installed on the cable as a whole, this version is particular well-suited to installation on a cable sub-component such as an individual strand. Instrument housing 406 and bracket 412 can be made small and smooth so that these components blend into the cable's exterior. Some examples will not need the exterior bands and can instead use a smooth, encapsulating sleeve or jacket over housing 406 and bracket 412 (or no enclosure at all).

Figure 64:
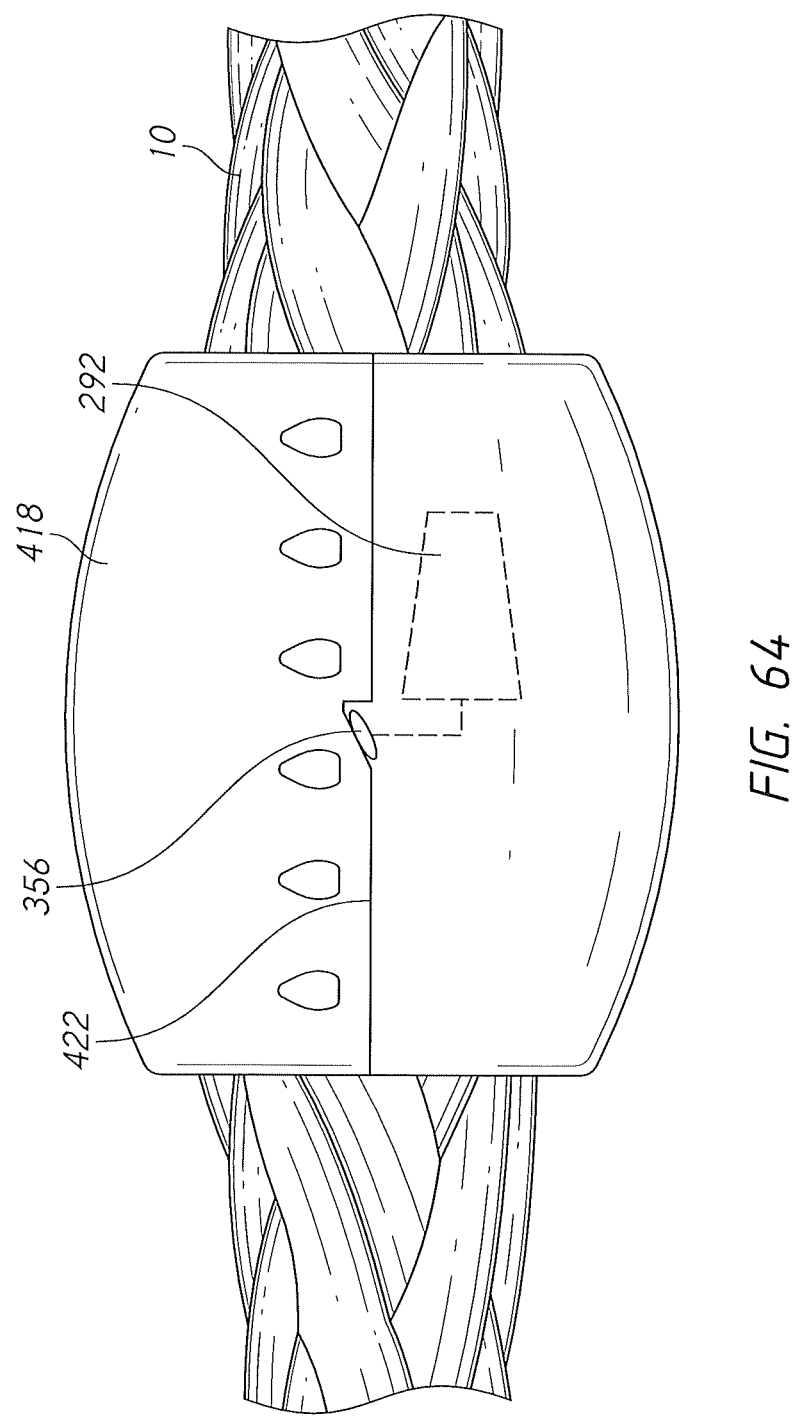
FIG. 64 is an elevation view, showing a two-piece version of the collar of FIG. 63.
Figure 65:
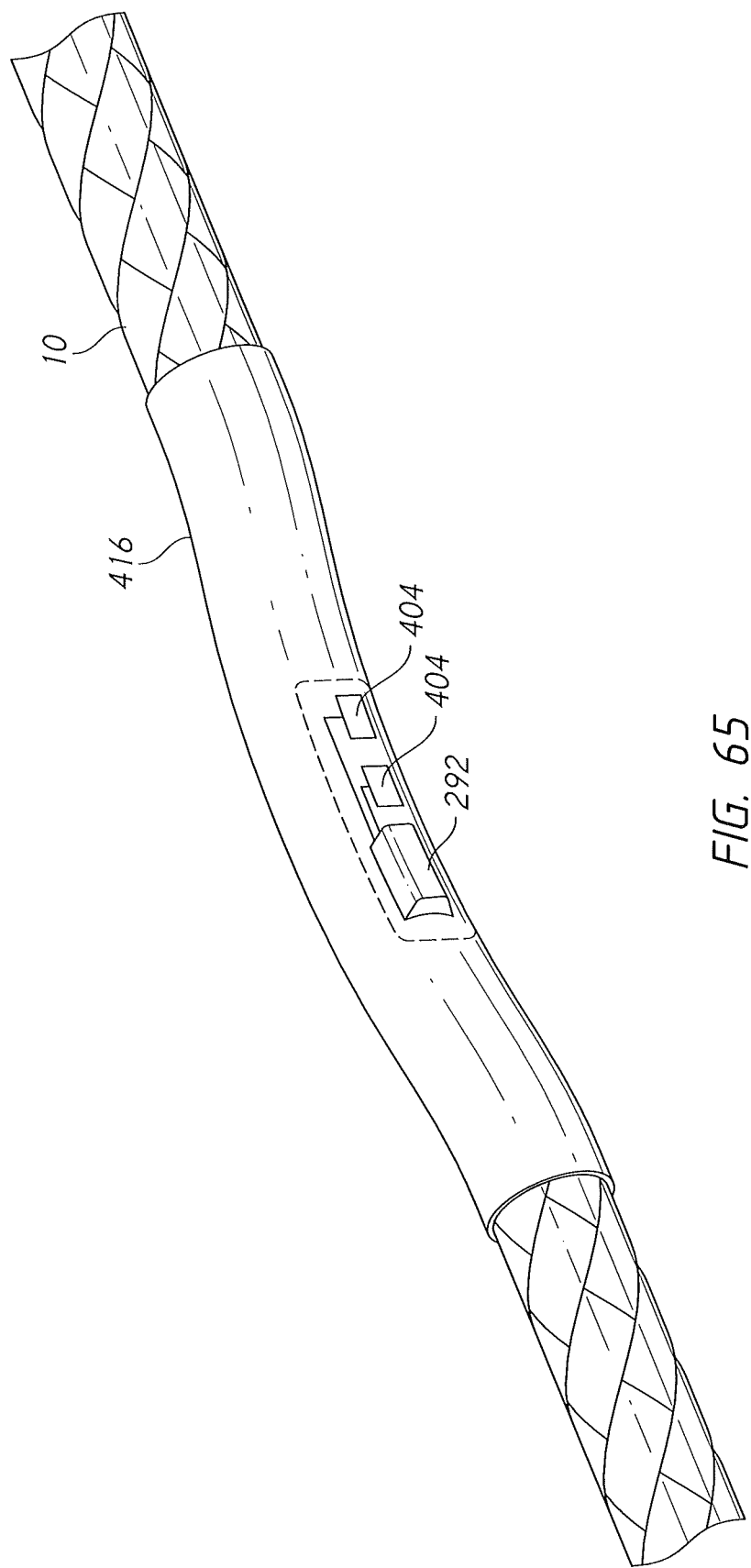
FIG. 65 is a perspective view, showing a measurement system using a deformed tube.

FIG. 64 shows yet another variation on the intelligent cable module concept. Deformed tube 416 is a stiff metallic tube that has a smoothly bent shape as shown. Cable 10 is passed through this tube. One or more strain gauges 404 are attached to the tube and these are monitored by instrumentation package 292. When tension is applied to the cable, the cable will naturally tend to straighten the deformed tube. This action will produce strain in the deformed tube that can be measured by the instrument packages and recorded and/or communicated elsewhere. The instrument package (and possibly the strain gauges) are preferably protected by a covering (shown in dashed lines in the view).

The term "deformed tube" should not be understood to mean that the component 416 must actually be plastically deformed after it is made. Rather, the term "deformed" in this example means that the centerline of the component 416 deviates from straight. It is entirely possible to create the component 416 with its deviation centerline without having to create any plastic deformation.

Those skilled in the art will also realize that the exemplary embodiment shown in FIG. 64 is a bit impractical, in that it must be installed on the cable before both end terminations are applied (since end terminations will be larger than the diameter of the cable itself). In a more practical embodiment, deformed tube 416 can be created as two halves that are joined together around the cable. The "parting plane" for the two halves would then deviate along with the desired deviation in the centerline of the cable. Transverse bolts or other fastening methods can be used to join the two halves together.

The use of a calibration step is significant in that the sensory readings taken in the various embodiments discussed are preferably calibrated to tension measured on the tensile strength member to which the intelligent cable module is attached. This calibration step can be done in a dedicated fixture (such as might be present in the manufacturing process itself). However, the reader should bear in mind that the calibration step can also be done in the field. As an example, a tension measurement and calibration module can be carried to the site of a cable installation. This tension measurement and calibration module can then be hooked in series with a cable containing an intelligent cable module. The tension measurement and calibration module may be configured to wirelessly link to the intelligent cable module.

Using this system, an intelligent cable module can be calibrated in the field using load cycles actually experienced in the field. A mooring line can be calibrated by using it to moor a ship to a quay. The tension measurement and calibration module is hooked up in series with the mooring line and linked to the intelligent cable module(s) in the mooring line. Tension cycles will naturally occur on the mooring line as the ship moves. The intelligent cable module records measurements (such as strain gauge reading for the embodiment of FIG. 56). The tension measurement and calibration module includes an accurate tension-sensing element, such as a calibrated load cell. The tension measurement and calibration module collects load cell readings, converts them to actual tension, and transmits them to the intelligent cable module(s) in the mooring line. Each intelligent cable module then correlates its internal measurements to the accurate tension measurements taken by the tension measurement and calibration module.

The tension measurement and calibration module may be an expensive device, as it only needs to be used in the initial calibration for an intelligent cable module. A single tension measurement and calibration module can be used to calibrate hundreds, if not thousands of "smart cable" assemblies.

Although the preceding description contains significant detail, it should not be construed as limiting the scope of the invention but rather as providing illustrations of the preferred embodiments of the invention. As an example, any of the embodiments described for use on a full cable can be adapted for use on a single strand of a larger cable, and vice-versa. Those skilled in the art will be able to devise many other embodiments that carry out the present invention. Thus, the language used in the claims shall define the invention rather than the specific embodiments provided.

The invention claimed is:

1. An intelligent module for attachment to a fiber strength member, comprising:
   (a) a collar mounted on an exterior of said fiber strength member, said collar including a passage accommodating said fiber strength member passing longitudinally therethrough;
   (b) a measurement element, with at least a portion of said measurement element lying within said multi-stranded fiber strength member;
   (c) said measurement element being held in position by said collar; and
   (d) an instrument package configured to monitor a squeezing force placed on said measurement element by said fiber strength member.

2. The intelligent module as recited in claim 1, wherein said measurement element is mounted transversely to a longitudinal axis of said fiber strength member.

3. The intelligent module as recited in claim 2, further comprising a detachable piercer configured to attach to said transverse measurement element and thereby aid said transverse measurement element's lateral passage through said fiber strength member.

4. The intelligent module as recited in claim 1, wherein said collar is split so that it can be added to said fiber strength member in multiple pieces.

5. The intelligent module as recited in claim 1, wherein said instrument package includes a processor and a memory configured to store strain information measured by said instrument package.

6. The intelligent module as recited in claim 5, wherein said instrument Package includes a radio transmitter for transmitting information to an external device.

7. The intelligent module as recited in claim 1, wherein said instrument package includes an externally visible indicator panel for indicating a status of said fiber strength member.

8. An intelligent module for attachment to a fiber strength member, comprising:
   (a) a collar mounted on an exterior of a strand of said fiber strength member;
   (b) a measurement element, with at least a portion of said measurement element lying within said strand;
   (c) said measurement element being connected to said collar; and
   (d) an instrument package configured to monitor a strain placed on said measurement element by a squeezing force applied by said strand.

9. The intelligent module as recited in claim 8, wherein said measurement element is placed transversely through said strand.

10. The intelligent module as recited in claim 9, further comprising a detachable piercer configured to attach to said measurement element and thereby aid said measurement element's lateral passage through said strand.

11. The intelligent module as recited in claim 8, wherein said collar is split so that it can be added to said strand in multiple pieces.

12. The intelligent module as recited in claim 8, wherein said instrument package includes a processor and a memory configured to store strain information measured by said instrument package.

13. The intelligent module as recited in claim 12, wherein said instrument package includes a radio transmitter for transmitting information to an external device.

14. The intelligent module as recited in claim 8, wherein said instrument package includes an externally visible indicator panel for indicating a status of said strand.

15. An intelligent module for attachment to a fiber strength member, comprising:
   (a) a measurement element passing transversely through said fiber strength member, said measurement element having a first end and a second end;
   (b) an instrument housing attached to said first end of said measurement element;
   (c) a strain gauge mounted on said measurement element, said strain gauge configured to measure a strain of said measurement element resulting from a squeezing force applied by said fiber strength element;
   (d) an instrument package mounted in said instrument housing, said instrument package configured to monitor said strain gauge; and
   (e) a bracket attached to said second end of said measurement element.

16. The intelligent module as recited in claim 15, wherein said instrument housing and said bracket lie outside of said fiber strength member.

17. The intelligent module as recited in claim 16, wherein said instrument bracket and said housing are secured to said fiber strength member by a plurality of bands.

18. The intelligent module as recited in claim 15, further comprising a detachable piercer configured to attach to said measurement element and thereby aid said measurement element's lateral passage through said fiber strength member.

19. The intelligent module as recited in claim 15, wherein said instrument package includes a processor and a memory configured to store strain information measured by said instrument package.

20. The intelligent module as recited in claim 15, wherein said instrument package includes a radio transmitter for transmitting information to an external device.

* * * * *